(12) United States Patent
Nagpal et al.

(10) Patent No.: US 10,449,530 B2
(45) Date of Patent: Oct. 22, 2019

(54) NANOSTRUCTURED PHOTOCATALYSTS AND DOPED WIDE-BANDGAP SEMICONDUCTORS

(71) Applicant: The Regents of the University of Colorado, a body corporate, Denver, CO (US)

(72) Inventors: Prashant Nagpal, Lafayette, CO (US); Vivek Singh, Boulder, CO (US); Ignacio Castellanos Beltran, Boulder, CO (US); Yahya Alivov, Boulder, CO (US); Yuchen Ding, Boulder, CO (US); Logan Jerome Cerkovnik, Highlands Ranch, CO (US)

(73) Assignee: THE REGENTS OF THE UNIVERSITY OF COLORADO, A BODY CORPORATE, Denver, CO (US)

(*) Notice: Subject to any disclaimer, the term of this patent is extended or adjusted under 35 U.S.C. 154(b) by 0 days.

(21) Appl. No.: 15/827,278

(22) Filed: Nov. 30, 2017

(65) Prior Publication Data

US 2018/0117577 A1    May 3, 2018

Related U.S. Application Data

(63) Continuation of application No. 14/902,725, filed as application No. PCT/US2014/045041 on Jul. 1, 2014, now Pat. No. 9,873,115.

(Continued)

(51) Int. Cl.
*B01J 35/00* (2006.01)
*C25B 3/04* (2006.01)
(Continued)

(52) U.S. Cl.
CPC ............. *B01J 35/004* (2013.01); *B01J 23/72* (2013.01); *B01J 27/04* (2013.01); *B01J 27/047* (2013.01);
(Continued)

(58) Field of Classification Search
CPC . B01J 35/004; B01J 23/72; B01J 27/04; B01J 27/047; B01J 27/051; B01J 27/0573;
(Continued)

(56) References Cited

U.S. PATENT DOCUMENTS 6,027,775 A    2/2000  Kasuga
7,521,394 B2 *  4/2009  Xie .................... B01J 21/063
                                                    423/610

(Continued)

FOREIGN PATENT DOCUMENTS

WO    2011050345 A1    4/2011

OTHER PUBLICATIONS

Zhou et al., CuInS2 quantum dot-sensitized TiO2 nanorod array photoelectrodes: synthesis and performance opitimization, Nanoscale Research Letters 7(652): 1-8, 2012 (retrieved on Nov. 24, 2014), http://www.nanoscalereslett.com.

(Continued)

*Primary Examiner* — Patricia L. Hailey
(74) *Attorney, Agent, or Firm* — William A. Ziehler; Shumaker, Loop & Kendrick, LLP

(57) ABSTRACT

Photocatalysts for reduction of carbon dioxide and water are provided that can be tuned to produce certain reaction products, including hydrogen, alcohol, aldehyde, and/or hydrocarbon products. These photocatalysts can form artificial photosystems and can be incorporated into devices that reduce carbon dioxide and water for production of various fuels. Doped wide-bandgap semiconductor nanotubes are provided along with synthesis methods. A variety of optical, electronic and magnetic dopants (substitutional and interstitial, energetically shallow and deep) are incorporated into hollow nanotubes, ranging from a few dopants to heavily-doped semiconductors. The resulting wide-bandgap nanotubes, with desired electronic (p- or n-doped), optical (ultraviolet bandgap to infrared absorption in co-doped nanotubes), and magnetic (from paramagnetic to ferromagnetic) properties, can be used in photovoltaics, display technologies, photocatalysis, and spintronic applications.

27 Claims, 65 Drawing Sheets

Related U.S. Application Data

(60) Provisional application No. 61/841,510, filed on Jul. 1, 2013, provisional application No. 61/879,168, filed on Sep. 18, 2013.

(51) Int. Cl.

| | | |
|---|---|---|
| *C25B 11/04* | (2006.01) | |
| *C25B 1/04* | (2006.01) | |
| *B01J 23/72* | (2006.01) | |
| *B01J 27/04* | (2006.01) | |
| *B01J 27/047* | (2006.01) | |
| *B01J 27/051* | (2006.01) | |
| *B01J 27/057* | (2006.01) | |
| *B01J 35/02* | (2006.01) | |
| *C01G 11/02* | (2006.01) | |

(52) U.S. Cl.
CPC ......... *B01J 27/051* (2013.01); *B01J 27/0573* (2013.01); *B01J 35/0013* (2013.01); *B01J 35/023* (2013.01); *C01G 11/02* (2013.01); *C25B 1/04* (2013.01); *C25B 3/04* (2013.01); *C25B 11/0478* (2013.01); *C01P 2004/16* (2013.01); *C01P 2004/51* (2013.01); *Y02E 60/366* (2013.01); *Y02P 20/133* (2015.11)

(58) Field of Classification Search
CPC ..... B01J 35/0013; B01J 35/023; C01G 11/02; C25B 1/04; C25B 3/04; C25B 11/0478; Y02P 20/133; C01P 2004/16; C01P 2004/51; Y02E 60/366
USPC .............. 502/215, 216, 220; 977/811, 813; 257/43; 438/85, 478, 495, 499, 501, 505, 438/508, 510
See application file for complete search history.

(56) References Cited

U.S. PATENT DOCUMENTS

| | | | |
|---|---|---|---|
| 7,687,431 | B2 | 3/2010 | Grimes |
| 8,143,144 | B2* | 3/2012 | Kawashima ........... B82Y 10/00 |
| | | | 257/14 |
| 8,362,455 | B2 | 1/2013 | Choi et al. |
| 2001/0056037 | A1 | 12/2001 | Sakatani |
| 2006/0102468 | A1 | 5/2006 | Monzyk |
| 2010/0004495 | A1 | 1/2010 | Fareid et al. |
| 2010/0044630 | A1* | 2/2010 | Kang ..................... B82Y 30/00 |
| | | | 252/182.33 |
| 2010/0180950 | A1* | 7/2010 | Gao ........................ B82Y 10/00 |
| | | | 136/265 |
| 2010/0187172 | A1* | 7/2010 | Paulose .................. B82Y 30/00 |
| | | | 210/506 |
| 2010/0213046 | A1 | 8/2010 | Grimes et al. |
| 2011/0155971 | A1 | 6/2011 | Subramanian et al. |
| 2011/0214723 | A1* | 9/2011 | Kang .................. H01L 31/1884 |
| | | | 136/255 |
| 2011/0240996 | A1* | 10/2011 | Lin ..................... H01L 51/5048 |
| | | | 257/43 |
| 2013/0256124 | A1 | 10/2013 | Rahman et al. |
| 2014/0196658 | A1 | 7/2014 | Nakayama |
| 2015/0050494 | A1* | 2/2015 | Yeung ....................... C30B 7/10 |
| | | | 428/376 |
| 2016/0045908 | A1* | 2/2016 | Kumari ................... B01J 23/72 |
| | | | 204/157.44 |

OTHER PUBLICATIONS

Liu et al., Highly stable CdS-modified short TiO2 nanotube array electrode for efficient visible-light hydrogen generation, International Journal of Hydrogen Energy 36: 167-174, 2011, (retrieved on Nov. 18, 2014), http://www.canli.dicp.ac.cn.

O'Connor et el. The Effect of the Charge-Separating Interface on Exciton Dynamics in Photocalaytic Colloidal Heteronanocrystals, ACS Nano 6(9), 8156-8165, 2012 (retrieved on Nov. 18, 2014), http://canil.dicp.ac.cn.

* cited by examiner

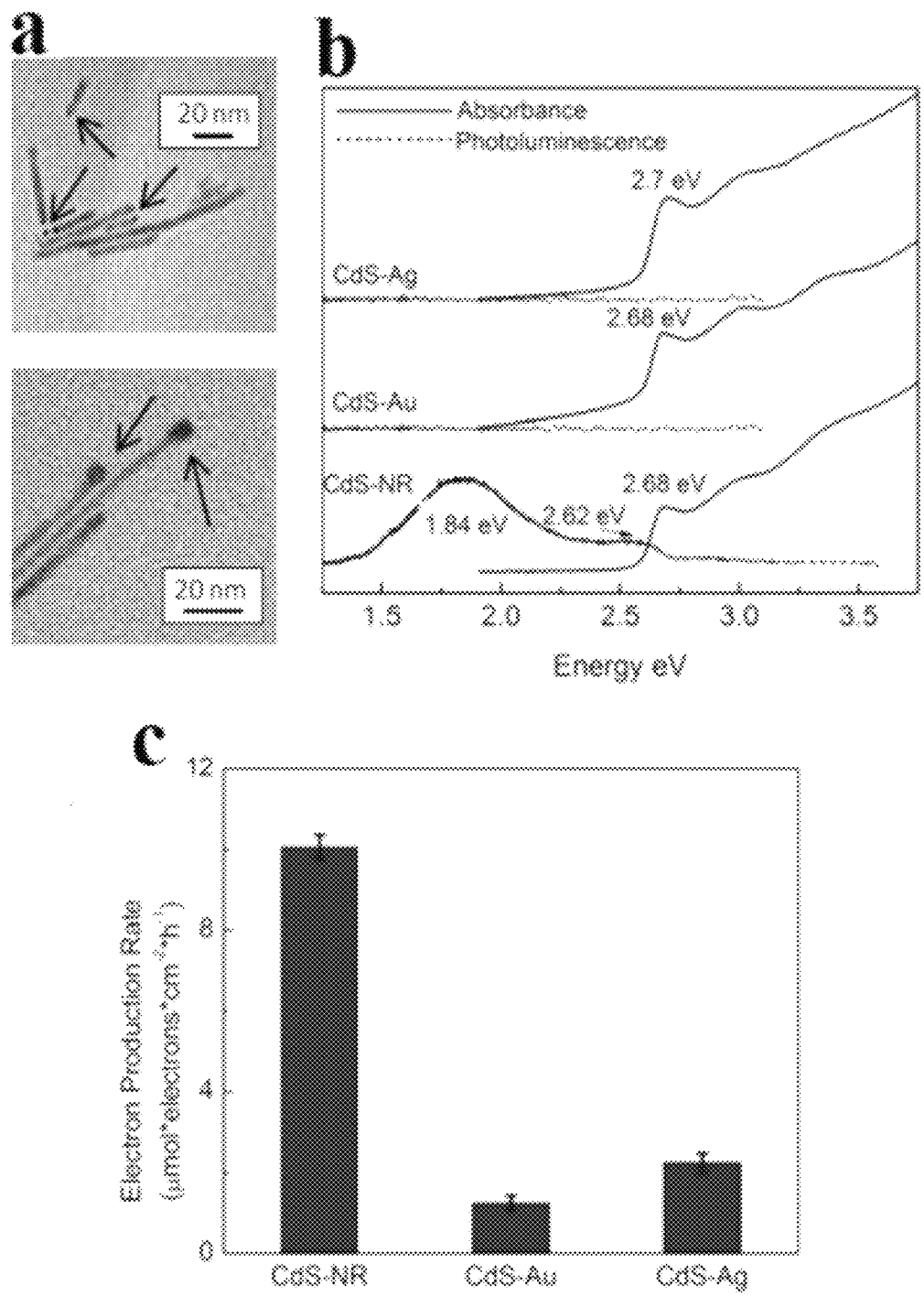
FIG. 13A-C

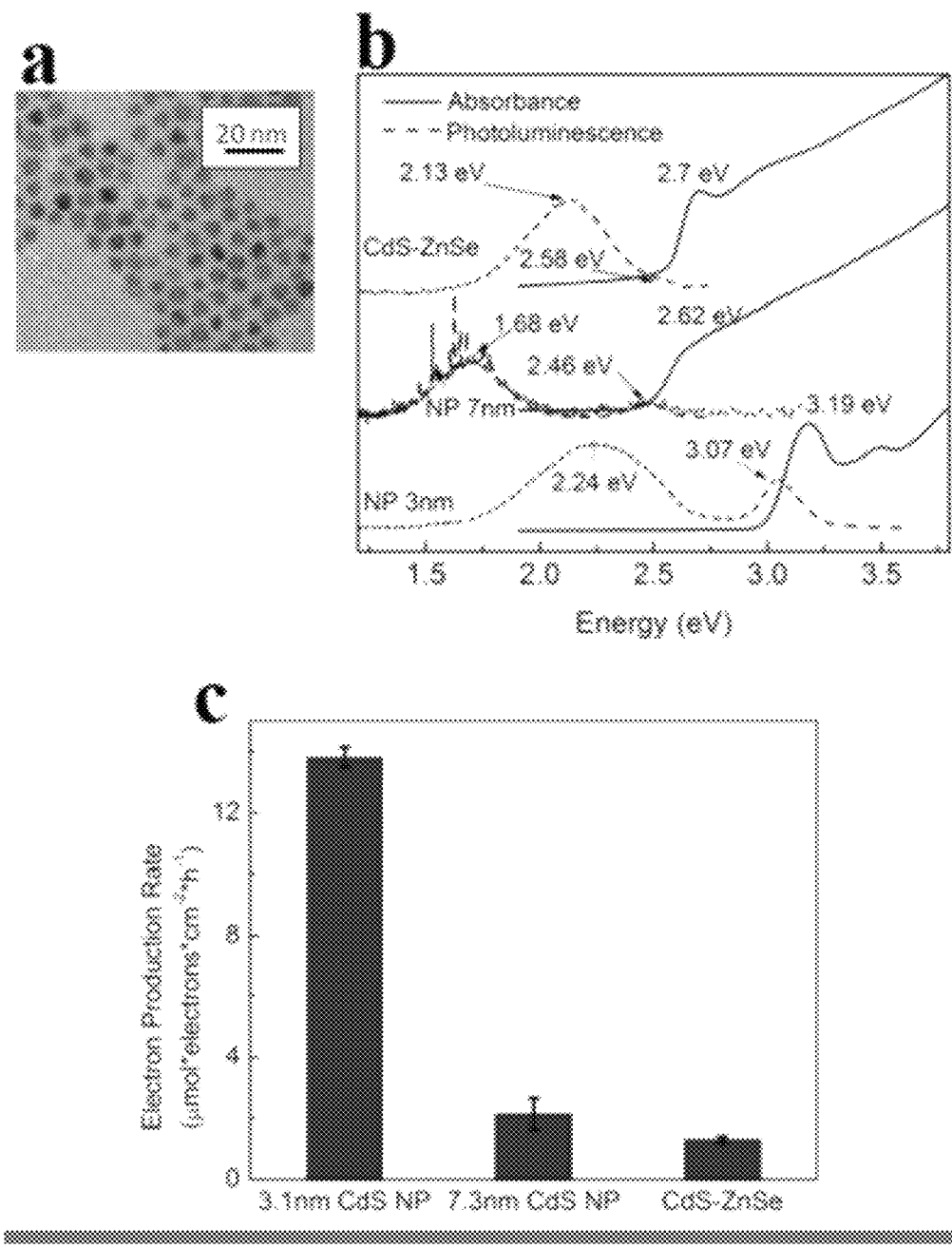
FIG. 14A-C

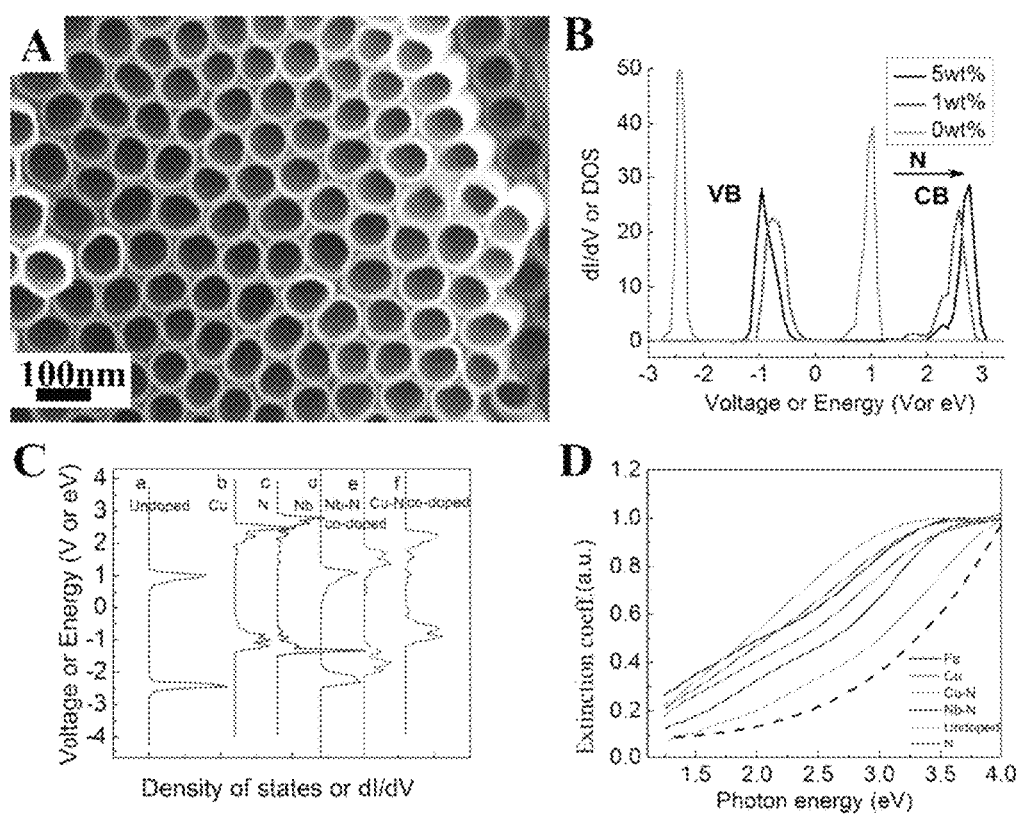
FIG. 16A-D

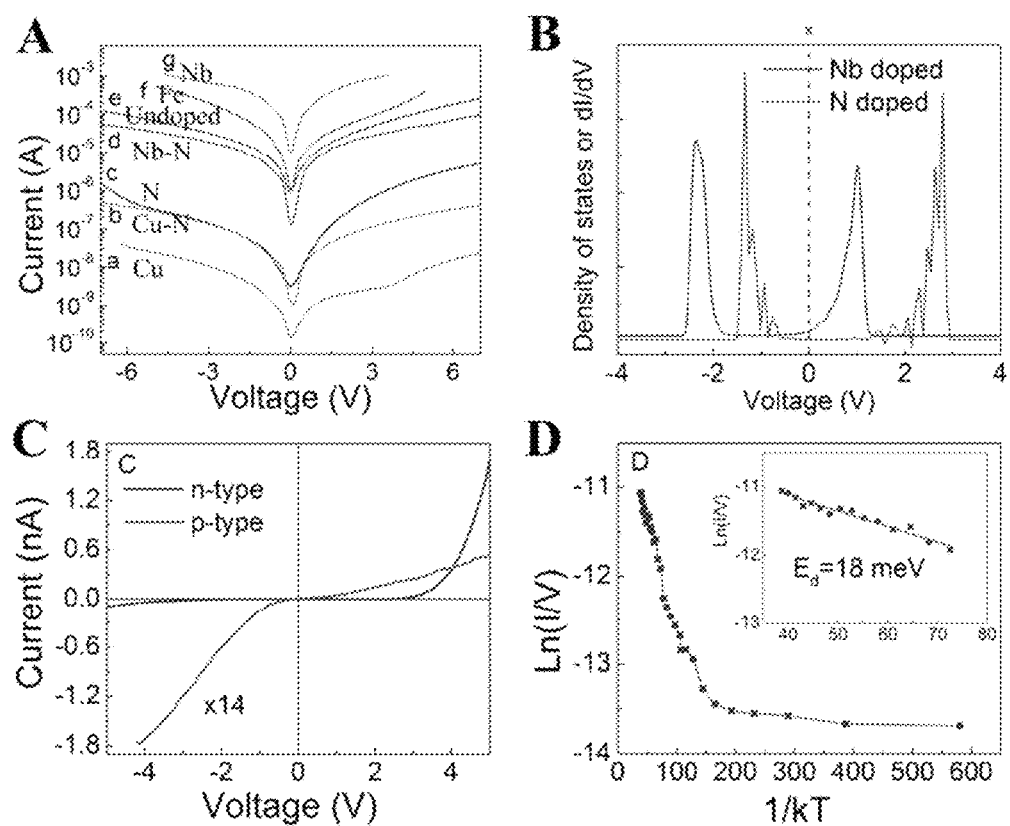
FIG. 17A-D

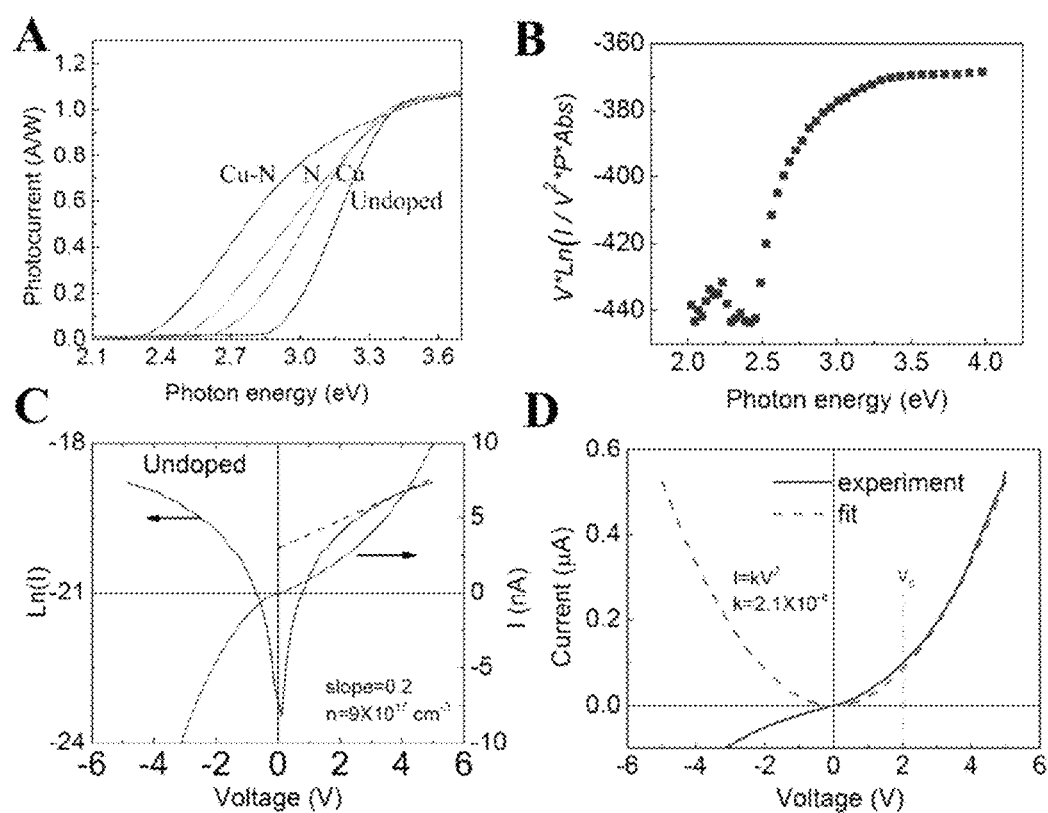
FIG. 18A-D

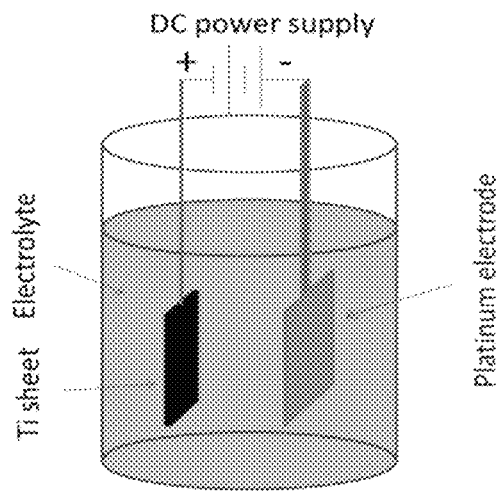
FIG. 20
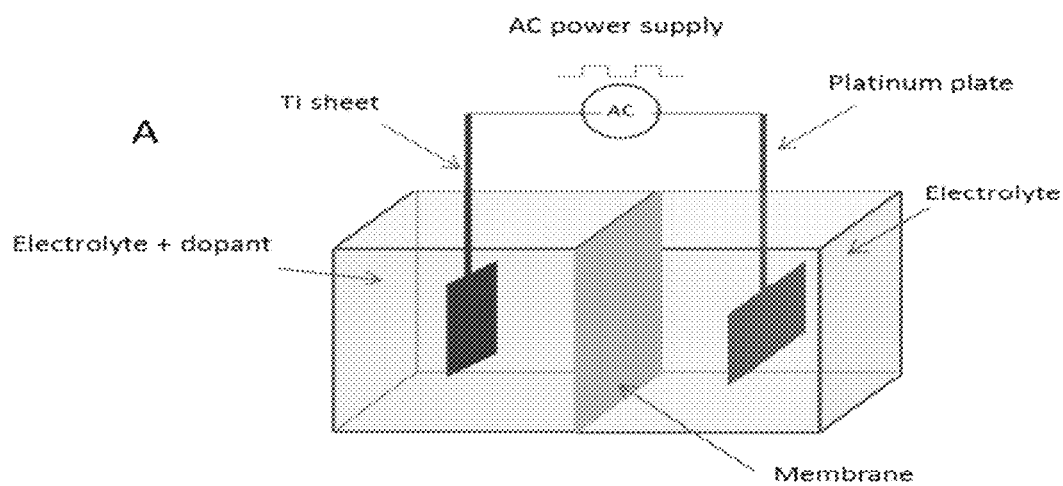
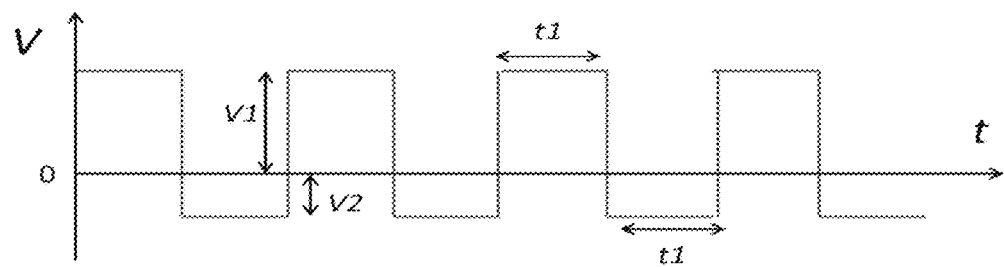
FIG. 21

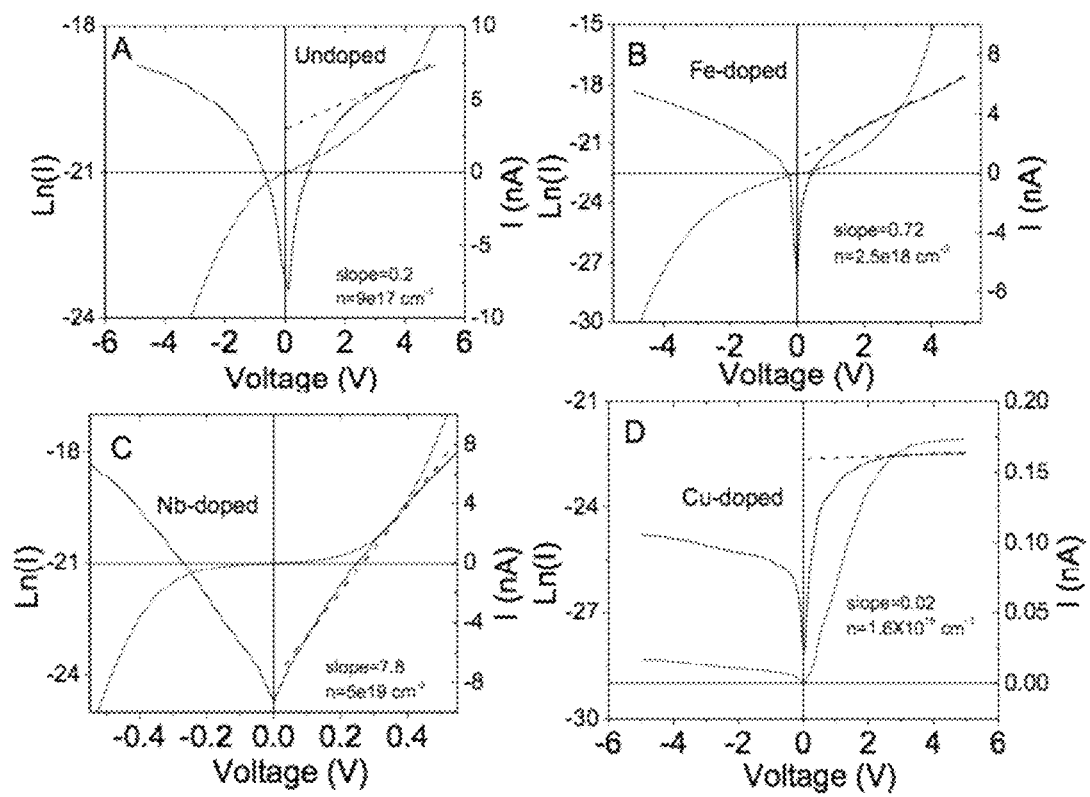
FIG. 35A-D

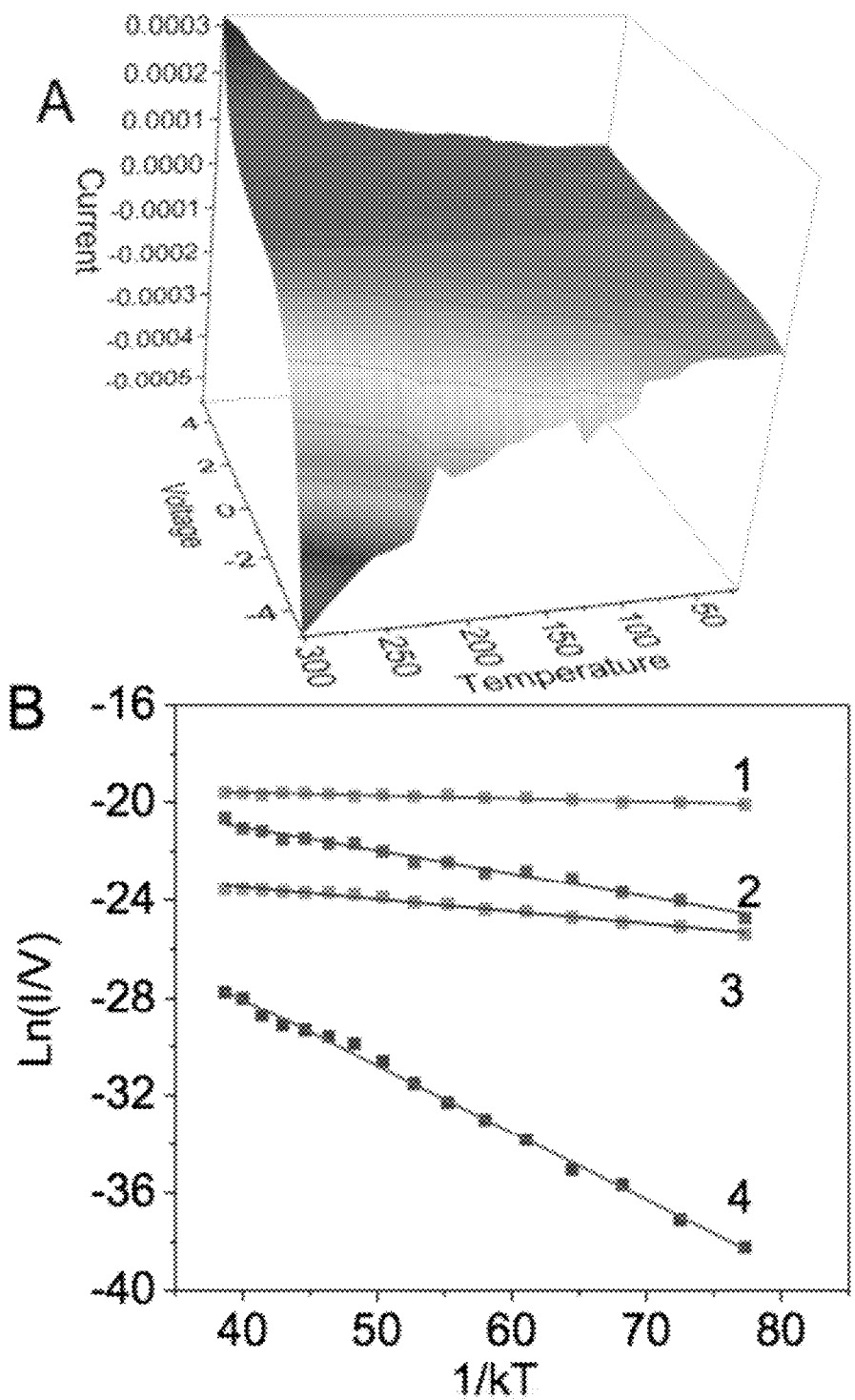
FIG. 36A-B

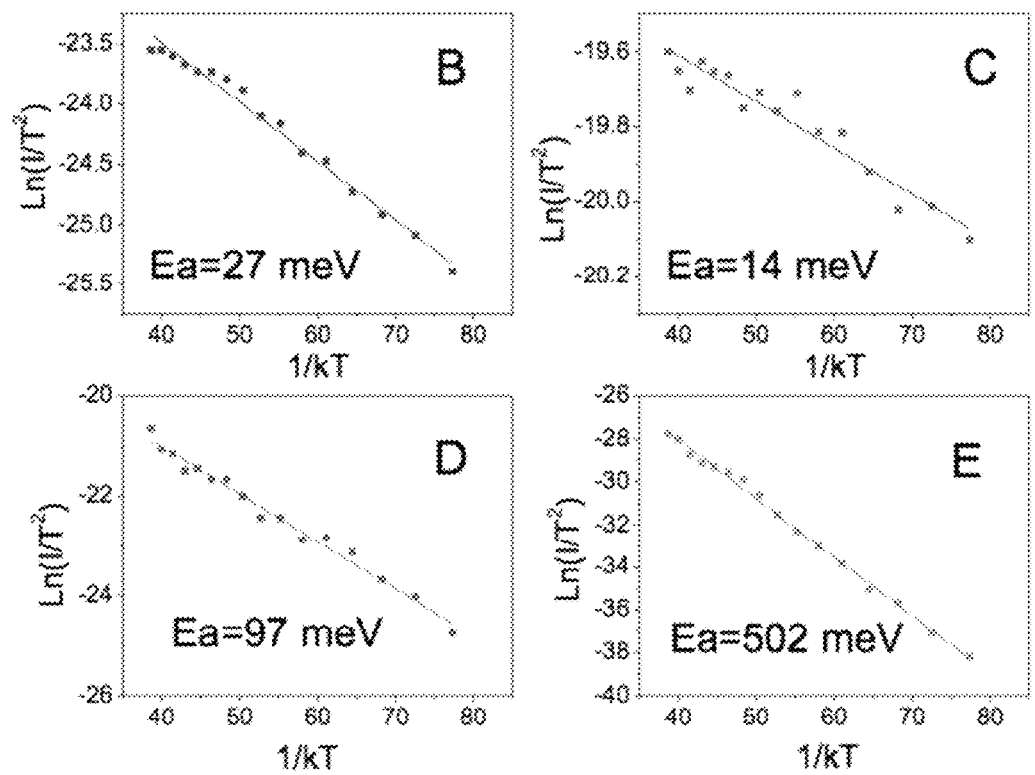
FIG. 37B-E

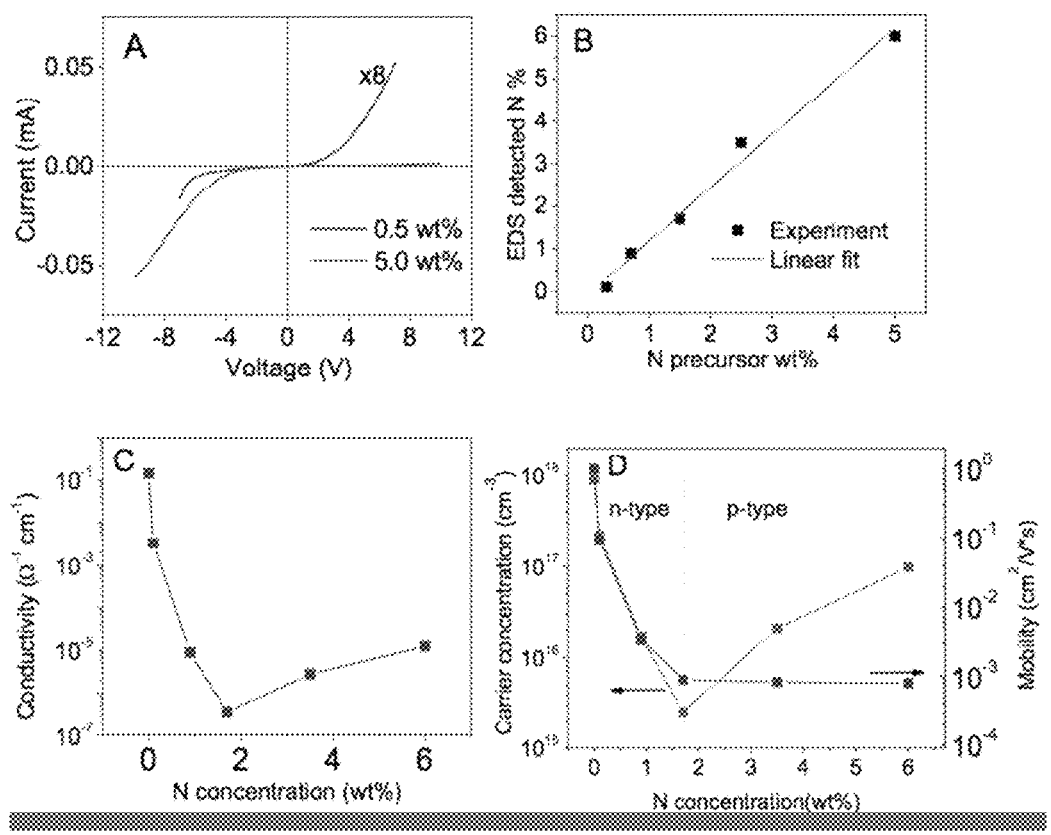
FIG. 38A-D

FIG. 41A-B

An XPS spectrum obtained for $TiO_2$

NANOSTRUCTURED PHOTOCATALYSTS AND DOPED WIDE-BANDGAP SEMICONDUCTORS

CROSS-REFERENCE TO RELATED APPLICATIONS

This application is a continuation of U.S. patent application Ser. No. 14/902,725, filed on Jan. 4, 2016, which is a National Stage Entry of PCT No. PCT/US14/45041, filed on Jul. 1, 2014, which claims the benefit of U.S. Provisional Application No. 61/841,510, filed on Jul. 1, 2013, and the benefit of U.S. Provisional Application No. 61/879,168, filed on Sep. 18, 2013. The entire disclosures of the above applications are incorporated herein by reference.

GOVERNMENT RIGHTS

This invention was made with U.S. Government support under CAREER CBET 1351281 awarded by the National Science Foundation (NSF). The U.S. Government has certain rights in the invention.

FIELD

The present technology relates to nanostructured photocatalysts and semiconductors, including photosynthetic devices and doped wide-bandgap semiconductor nanotubes that are mono-doped or co-doped.

INTRODUCTION

This section provides background information related to the present disclosure which is not necessarily prior art.

Simultaneous reduction of $CO_2$ and water using sunlight has been an important step in the life cycle on Earth. This single reaction performed by plants in an energetically frugal, albeit inefficient process, allows simultaneous balance of $CO_2$ gas and energy harvesting from the primary source of energy on Earth, the Sun. Several strategies are being currently investigated for converting sunlight into a viable renewable source of energy for the burgeoning human population in order to address the growing emissions of greenhouse gases and the depletion of sources of cheap energy. Developing an efficient artificial photocatalyst to carry out simultaneous reduction of $CO_2$ and water can address the rising level of greenhouse gas emissions and provide an alternative source of renewable energy (FIG. 1A). While modified $TiO_2$-based photocatalysts can be used for water splitting or $CO_2$-water reduction, the effect of chemical modification on the electronic structure of $TiO_2$ semiconductor is largely unexplored. Moreover, lack of insight into photophysics governing recombination pathways, defect mediated photocatalytic reduction, and energetic levels participating in electronic reduction of $CO_2$ following photogeneration of electron-hole pair has also prevented rational design of new photocatalysts with higher efficiency and/or selectivity.

Artificial photosynthesis, using $CO_2$, water, and sunlight to produce selective solar fuels (e.g., hydrocarbons, alcohols or aldehydes), can provide an important alternative to rising emission of greenhouse gases and a source of renewable energy. However, lack of suitable energetic states, charge conduction pathways, light harvesting, or interfacial charge trapping/recombination impedes observation of high photocatalytic activity and selectivity in multielectron reduction of $CO_2$ and $H_2O$.

Wide-bandgap semiconductors are used in a wide variety of optoelectronics, power electronics, ceramic coatings, and spin transport devices. Most applications are focused on bulk semiconductor films, since doping semiconductor nanostructures has proven challenging. Although several semiconductor nanostructures, notably titanium dioxide ($TiO_2$), are key components of devices like solar cells, photocatalysis etc., n-type doping in these nominally "undoped" oxides (due to oxygen vacancies) is utilized. This can severely limit their applications and device architectures, like fabricating p-type oxide films or changing the doping level of n-type dopant for optimized configuration. Interest in utilizing doped semiconductors for low-loss plasmonics has also generated interest in heavy-doping of these $TiO_2$ nanostructures, already used in thin film solar-cells, for enhanced light harvesting. Moreover, addition of desired dopants, like shallow or deep donors, can also lead to formation of heavily-doped transparent oxide nanostructures, or co-doped photocatalysts which can absorb infrared light. Therefore, desired doping of these wide-bandgap nanostructured films can provide important materials for a variety of applications in renewable energy, artificial displays, and other optoelectronic and magnetic processes. Semiconductor nanostructures of different shapes (e.g., nanocrystals, nanorods, nanotubes) and sizes have been fabricated from these wide-bandgap materials. While nanocrystals offer high surface area-to-volume ratio, nanorods and nanowires additionally offer enhanced transport in one-dimension.

As noted, plants are the primary solar energy harvesters on our planet. As a source of energy, plants convert incident sunlight into chemical fuels using photocatalyzed redox reactions. Evolution over thousands of years has led to an energetically frugal photosynthetic process where different products are generated using separation of reduction and oxidation steps as photosystem I and II, respectively. The separation of these two processes offers several benefits, some of which can be utilized for design of similar biomimetic artificial photosystems. One important design advantage is use of two energetically aligned semiconductors, which catalyze the reduction and oxidation process using incident sunlight, with individual bandgaps smaller than the a single bandgap required for redox reaction (FIG. 44A). This enhances the total incident light absorbed, and hence the efficiency of conversion to solar fuels. Second, separation of photogenerated charge carriers into two different semiconductors reduces their overlap and hence recombination which can help in enhancing photochemical conversion efficiency. Moreover, this strategy allows use of different materials (with varying bandgaps and/or energetic states) which can selectively catalyze different redox products, without risk of chemical degradation. Utilizing molecule-like energy levels of quantum-confined nanoscale semiconductors can offer additional advantage of selective redox reactions, based on their alignment with reduction potentials of respective reactants. Therefore, design of charge separated photocatalyzed redox reaction in nanoscaled semiconductors as photosystems I and II can lead to design of efficient photochemical conversion of incident electromagnetic radiation into chemical fuels.

SUMMARY

The present technology includes systems, processes, articles of manufacture, and compositions that relate to nanostructured photocatalysts and semiconductors.

Rapid increase in anthropogenic emissions of greenhouse gases, mainly carbon dioxide, has been a growing cause for concern. While photocatalytic reduction of carbon dioxide ($CO_2$) into solar fuels can provide an alternative, lack of insight into energetic pathways governing photocatalysis has impeded study. The present technology provides measurements of electronic density of states (DOS) of titanium dioxide ($TiO_2$) nanoparticles, using Scanning Tunneling Microscopy (STM), to identify energy levels responsible for reduction of $CO_2$ and water. Desired energy levels are introduced in $TiO_2$ nanoparticles, using metal dopants or semiconductor nanocrystals, and the designed catalysts are used for photocatalytic reduction of $CO_2$ into hydrocarbons, alcohols, and aldehydes using simulated solar irradiation. Insights obtained in photophysics governing the catalytic reduction are used to demonstrate a new composite photocatalyst, based on overlapping energy states of $TiO_2$ and copper indium sulfide (CIS) nanocrystals, to produce the highest selectivity (>70%) of ethane gas reported. The photocatalyst has superlinear dependence of solar fuel production rate with light intensity, and hence demonstrates higher efficiency of converting ultraviolet radiation into fuels (4.3%) at 4 Sun illumination, compared with platinum-doped $TiO_2$ nanoparticles (2.1%). The present technology provides new inexpensive photocatalysts with tuned activity and selectivity.

Cadmium Sulfide (CdS) nanostructures (e.g., different-sized nanoparticles, nanorods, metal-hybrid nanostructures, and core-shell nanostructures) are designed herein to improve various photophysical steps leading to formation of desired solar fuels. In particular, CdS nanoparticles with 3.07 eV bandgap, well matched with the reduction potential of aldehydes, show an increased photocatalytic activity (~40% external quantum yield) and selectivity (>99%) for acetaldehyde production.

Doping semiconductors can be an important step in their technological application. While easy incorporation of dopants can be achieved in bulk semiconductors, doping semiconductor nanostructures has proven difficult. The present technology provides a facile synthesis method for fabricating doped wide-bandgap semiconductor nanotubes. A variety of optical, electronic and magnetic dopants (substitutional and interstitial, energetically shallow and deep) are incorporated into hollow nanotubes, ranging from a few dopants to heavily-doped semiconductors. These technologically important wide-bandgap nanotubes, with desired electronic (p- or n-doped), optical (ultraviolet bandgap to infrared absorption in co-doped nanotubes), and magnetic (from paramagnetic to ferromagnetic) properties, are useful for a variety of applications in photovoltaics, display technologies, photocatalysis, and spintronic applications.

Photocatalyzed redox reactions in a plant leaf leads to conversion of incident solar energy as chemical fuels. Separation of reduction and oxidation steps as photosystem I and II offers several advantages like smaller bandgap (more light absorption) compared to a single photocatalyst, reduced recombination due to separation of photogenerated electron-hole pair, etc. The present technology provides artificial photosystems I and II using nanoscaled semiconductors for photocatalyzed redox reactions. Quantum-confined states in these semiconductors are aligned with reduction potentials of different reaction products for selective photocatalysis. Using doped wide-bandgap oxide semiconductor (e.g., titanium dioxide) nanotube membranes as photosystem II, the bandgaps and the energy levels of different semiconductor nanostructures (e.g., copper-indium sulfide, molybdenum sulfide, and cadmium sulfide) are tailored to selectively produce ethane, ethanol and acetaldehyde, respectively, from $CO_2$—$H_2O$ reduction using simulated AM1.5 solar radiation. These results can be used to utilize well-aligned energy levels in nanoscaled semiconductors to catalyze different redox reactions as charge separated photosystems.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-E depict energy levels responsible for photocatalysis in unmodified $TiO_2$ nanoparticles. (A) Schematic of the proposed artificial photosynthesis in $TiO_2$-QD based catalysts for selectively producing alkanes, alcohols, and aldehydes. (B) $CO_2$-water photocatalytic reduction data, for unmodified $TiO_2$ nanoparticles, under different intensities of simulated solar irradiation (AM1.5 spectrum=1 Sun). The chemical composition of different catalytic products (hydrogen $H_2$, methane $CH_4$, ethane $C_2H_6$, acetaldehyde $CH_3CHO$, and higher hydrocarbons including propane, butane and paraffins $C_xH_y$) is indicated using color coded bar graphs, on per electron mole basis. The colored asterisk sign indicates the highest yields for respective products obtained in our measurements. (C) Internal quantum efficiency and selectivity of solar fuels (for ethane production) under different intensities of solar irradiance. The internal quantum efficiency (QE) is computed based on the fraction of sunlight above the energy bandgap of $TiO_2$ nanoparticles and the total catalytic yield of different products obtained, per electron mole basis (since different products require different number of electrons in the multielectron reduction process). Unmodified $TiO_2$ exhibits low activity and selectivity for $CO_2$-water reduction. The symbols represent the average internal QE over several experiments, and the lines represent the highest and lowest yields measured. (D) STS data showing defect levels (~0.5-1 eV below conduction band) in $TiO_2$ nanoparticles, likely responsible for photocatalytic activity. The solid line shows first derivative of current with voltage (dI/dV) or density of electronic states, the dashed line represents the current-voltage spectrum, and levels indicated on the right represent the relative reduction potential values for different fuel products formed from $CO_2$-water reduction (15). The work function of the Pt—Ir tip was used to represent the data on an absolute energy level, with respect to vacuum. Standard hydrogen electrode potential was used to represent NHE and energetic levels (w.r.t. vacuum) on the same scale. (E) Cross-section and 3D map of STS data collected on 15 nm unmodified $TiO_2$ nanoparticles. The current-voltage spectrum (I-V) shown here is used to obtain the density of electronic states (dI/dV) based on tunneling probability (or current) from the Pt—Ir tip. The work function of the tip and the electron affinity of $TiO_2$ semiconductor was used to obtain energy values with respect to vacuum level (0 eV).

FIGS. 2A-D depict the effect of platinum metal doping on $TiO_2$ energy levels and photocatalytic rates. (A) $CO_2$-water photocatalytic reduction products obtained using doped $TiO_2$—Pt (1 wt %) catalyst illuminated with different intensities of AM1.5 simulated solar irradiation. The solar irradiance was increased from half up to 4.6 times the incident radiation. Increase in sunlight illumination results in change in product yields due to filling up of lower energy levels and likely slower cooling of hot carriers, resulting in products with higher reduction potentials. (B) Internal quantum efficiency and selectivity (for ethane hydrocarbon fuel) obtained using $TiO_2$—Pt (1 wt %) photocatalyst. (C) STS spectrum collected with 0.5 wt % Pt metal dopant in $TiO_2$ nanoparticles and (D) 1 wt % Pt doped $TiO_2$ semiconductor nanoparticle. While the 0.5 wt % Pt metal dopant does not cause significant changes in the electronic DOS of the $TiO_2$ semiconductor, 1 wt % platinum clearly shows increased DOS between the bandgap, extending all the way through the bandgap. This caused likely trapping, and eventually recombination, of the photogenerated electron and hole excited in the doped semiconductor (as shown by arrows in 2D). This enhanced recombination on platinum sites is responsible for reduced photocatalytic yields on increasing the light intensity (as shown in 2B).

FIGS. 3A-C depict characterization of a $TiO_2$—$Cu_{2-x}O$ composite photocatalyst. (A) Chemical analysis of photocatalytic products obtained using $TiO_2$—$Cu_{2-x}O$ (0<x<1) composite catalyst, for $CO_2$-water reduction, on illuminating with simulated solar radiation. (B) $TiO_2$—$Cu_{2-x}O$ photocatalyst shows higher yields (internal quantum efficiency (QE)) for $CO_2$-water reduction than unmodified $TiO_2$, but variation in oxidation state of copper results in change in semiconductor bandgap (see FIG. 7) and traps on the surface, leading to enhanced recombination, lower yields and unselective product formation. Due to the large number of defect states present on the surface, highest catalytic yields are obtained under low light intensities (here 0.5 Sun illumination). On increasing the photogeneration rate (or solar irradiance), while the yields decreases (explained using our photophysical model, FIG. 5C), filling of low energy electron states (FIG. 3C) leads to more products with higher reduction potential (acetaldehyde and higher hydrocarbons $C_xH_y$), thereby increasing the observed selectivity. (C) STS data of the composite photocatalyst showing overlapping energy levels of $Cu_{2-x}O$ and $TiO_2$ semiconductor.

FIGS. 4A-C depict the characterization of our new photocatalyst $TiO_2$—CIS. (A) Chemical composition and (B) photocatalytic yields and selectivity for $CO_2$-water reduction obtained using our designed $TiO_2$—CIS photocatalyst. The new $TiO_2$—CIS catalyst combines high selectivity (>70% selectivity for ethane production) with high yield (>5% for 5 Sun illumination) and represents an important step towards rational design of new catalyst using energy level tuning, as shown in this photocatalysis data. (C) Electronic DOS tuning can be easily achieved by tuning the energy levels of the quantum confined CIS nanoparticle, as shown in STS data of the composite nanoparticle. 1.7 eV bandgap CIS nanocrystals (<3 nm in size) were attached to $TiO_2$ nanoparticles resulting in desired energy levels below the conduction band of $TiO_2$ semiconductor, and possible tuning the products formed from photocatalytic reduction of $CO_2$-water.

FIGS. 5A-D depict the photophysics in the $TiO_2$—CIS nanoparticle catalyst. (A) Current sensing atomic force microscope (CS-AFM) spectrum of a single $TiO_2$—CIS nanoparticle in two regions marked "1" (red curve, showing hole injection) and "2" (black curve, showing electron injection). The inset shows comparable current spectrum of unmodified $TiO_2$ nanoparticle demonstrating possible electron and hole injection by gold coated current sensing AFM tip. (B) CS-AFM image of a single photocatalyst nanoparticle. The image is acquired by applying a small bias between the gold coated AFM tip, and the nanoparticles dispersed on conductive indium-tin-oxide (ITO) substrate. Cross-sections slices of the 3D spectrum obtained clearly shows spatial separation of injected electrons and holes in the composite $TiO_2$—CIS photocatalyst. (C) Schematic of the proposed model explaining the photophysics of the multielectron reduction on photocatalyst, where "n" and "p" represent photogenerated electron and hole concentration per nanoparticle, on illumination with photons above the $TiO_2$ bandgap, "$N_d$" represents the total number of defects/dopants per nanoparticle, and the dashed line represents recombination pathways for photogenerated (with rate constant α) and trapped electrons (with rate constant α) with band edge photogenerated holes in the photocatalyst. (D) Relationship between photocatalytic rate of solar fuel produced by $CO_2$-water reduction and the rate of photogeneration (expressed as comparable solar irradiance). The decrease in photocatalytic rate of $TiO_2$—Pt doped nanoparticles and the superlinear increase in $TiO_2$—CIS solar fuel production rate is explained well using our theoretical model.

Figure 9A:
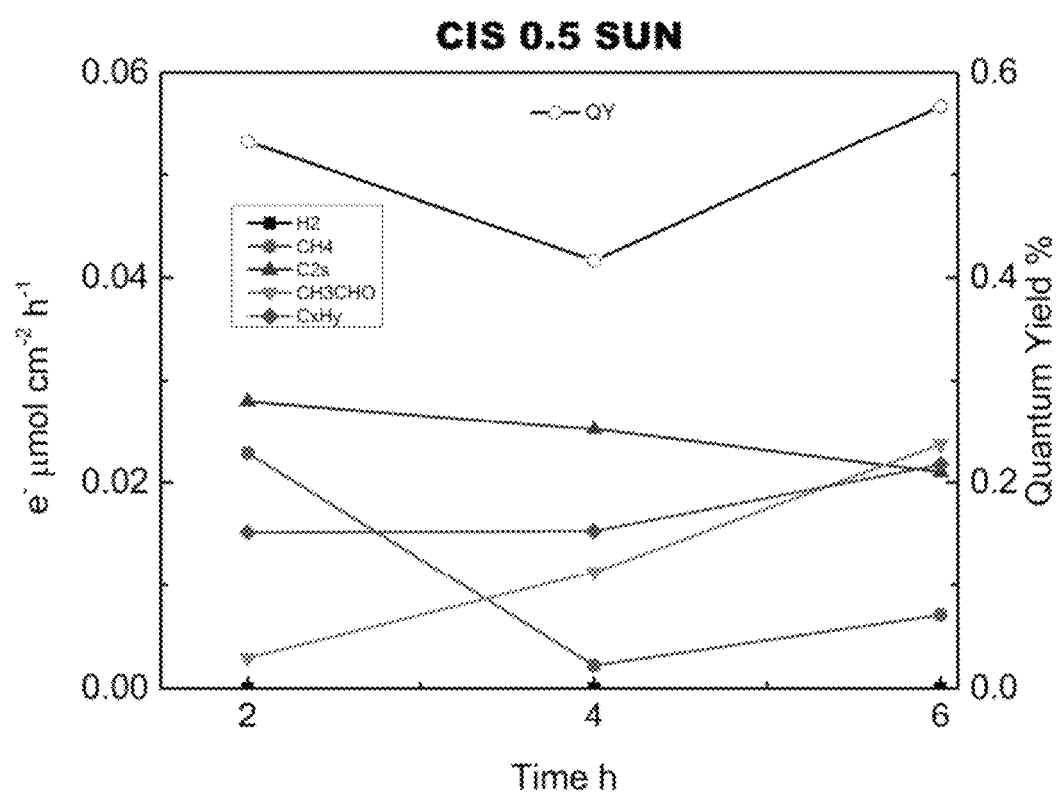
Figure 9B:
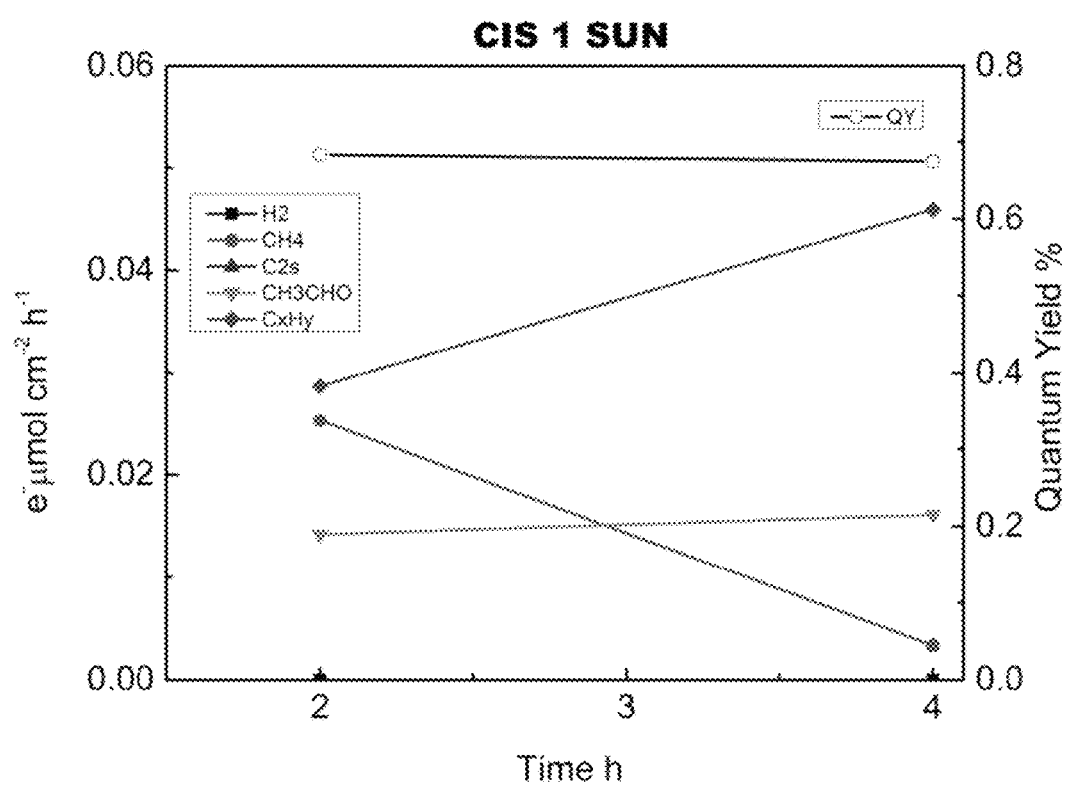
Figure 9C:
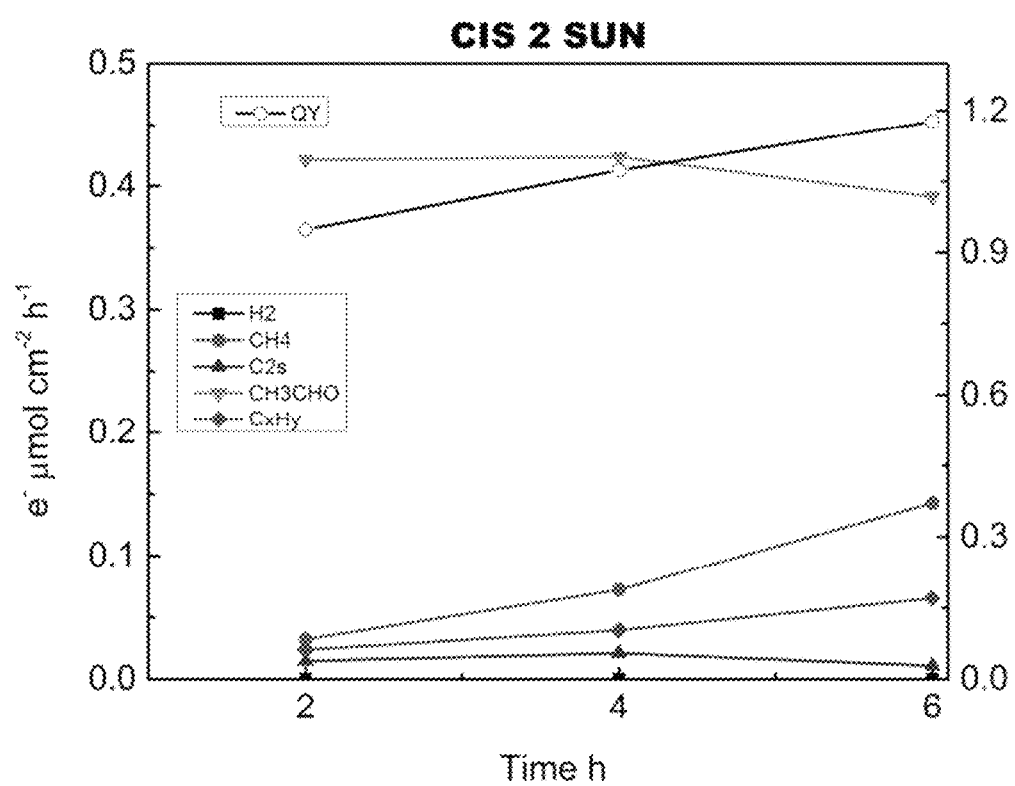
Figure 10A:
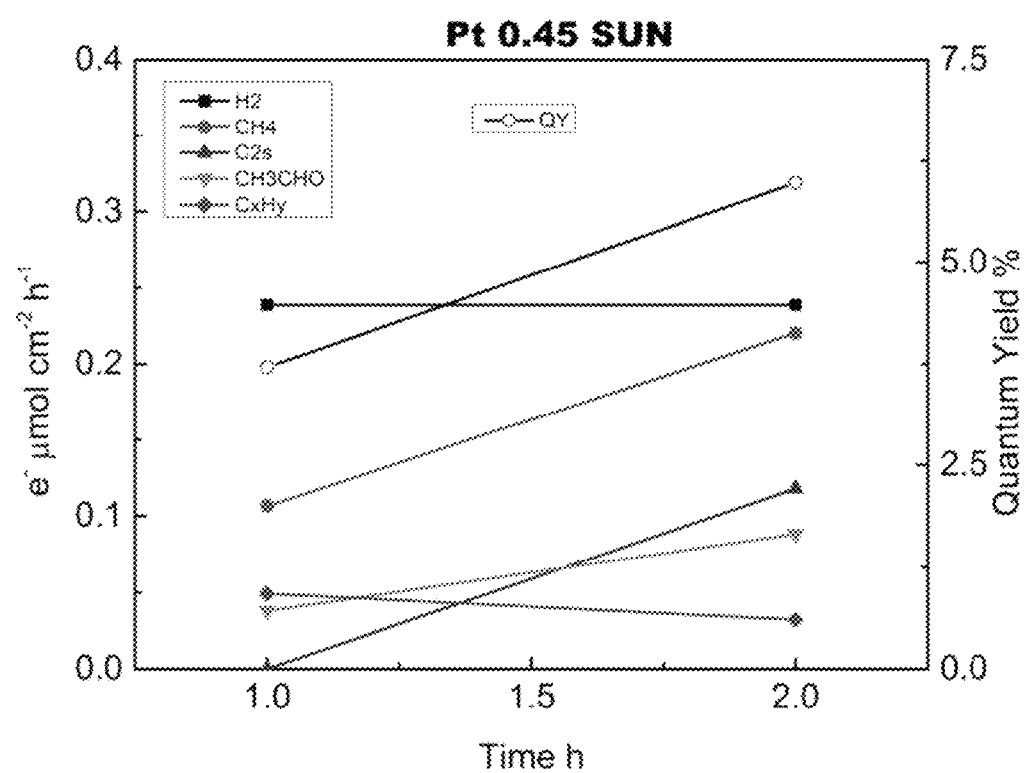
Figure 10B:
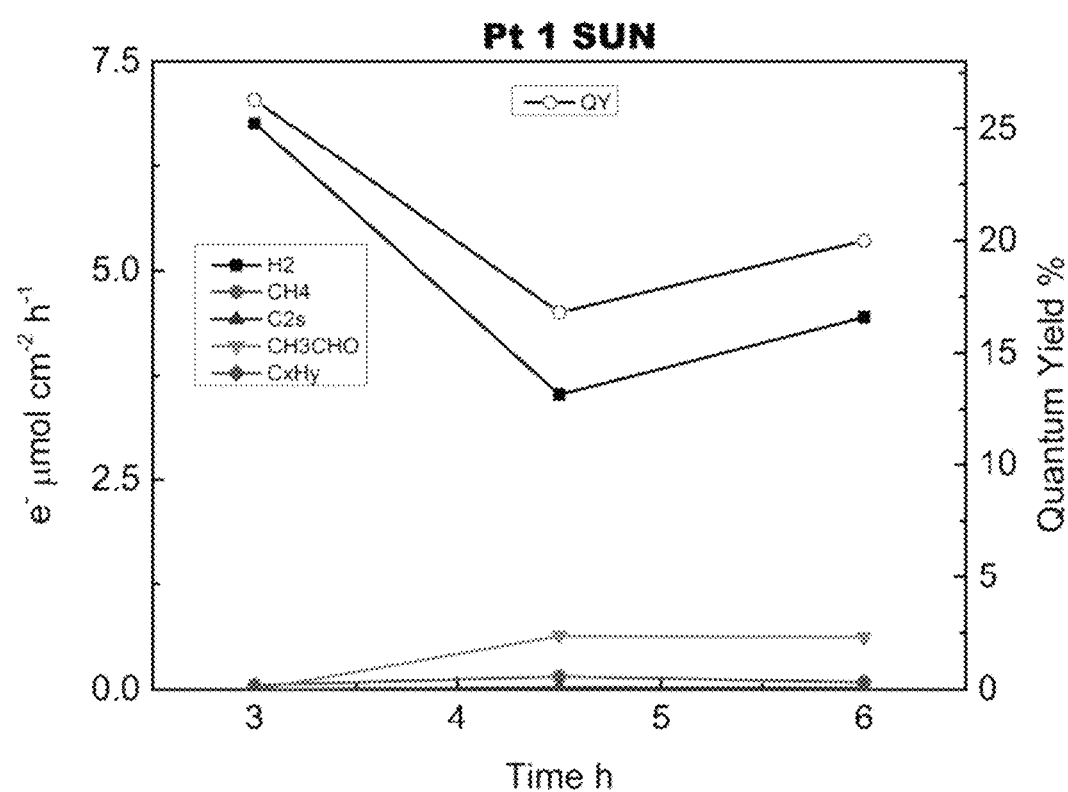
Figure 10C:
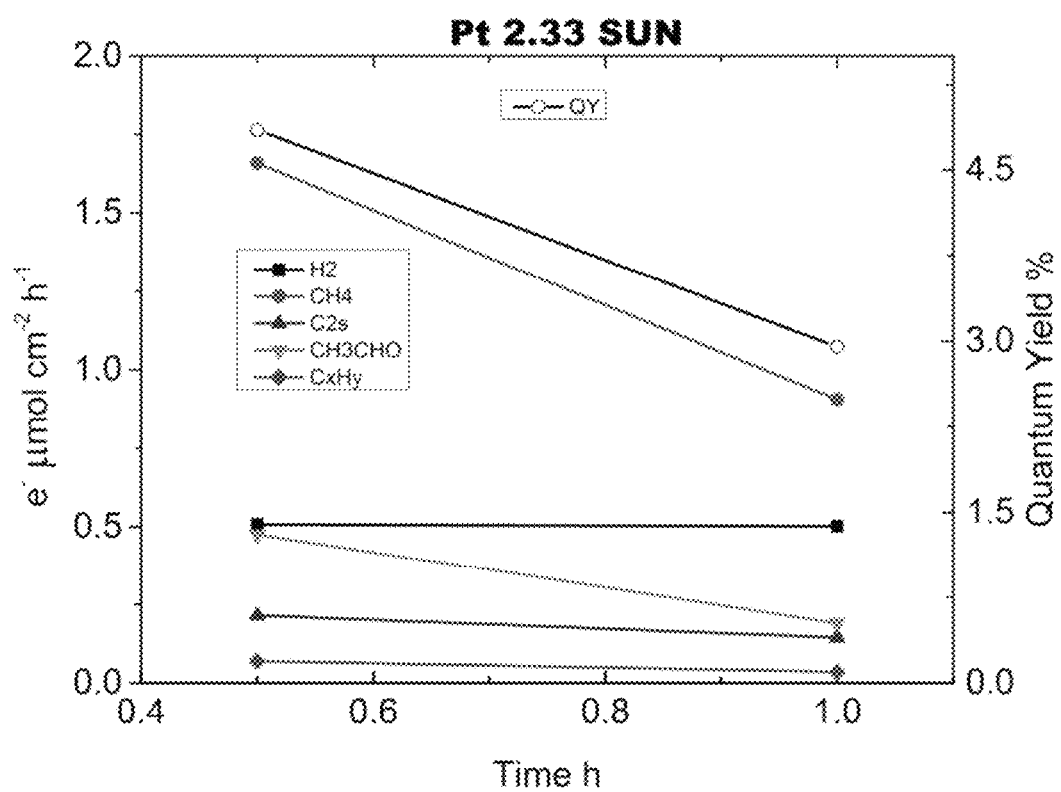
Figure 10D:
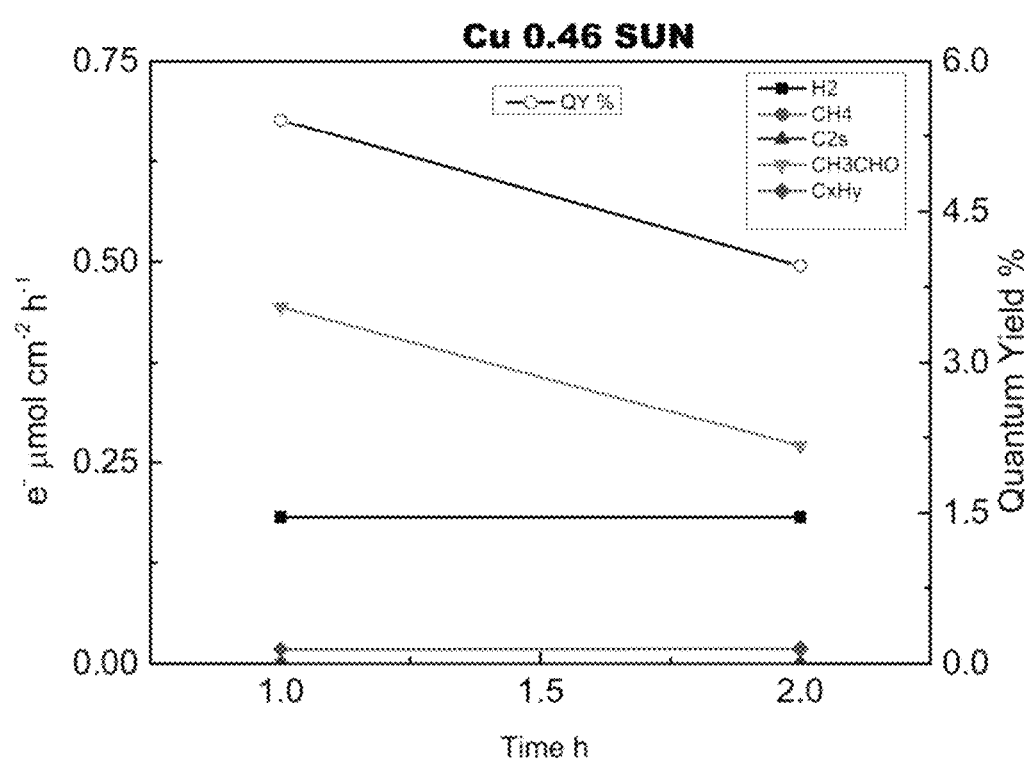
Figure 10E:
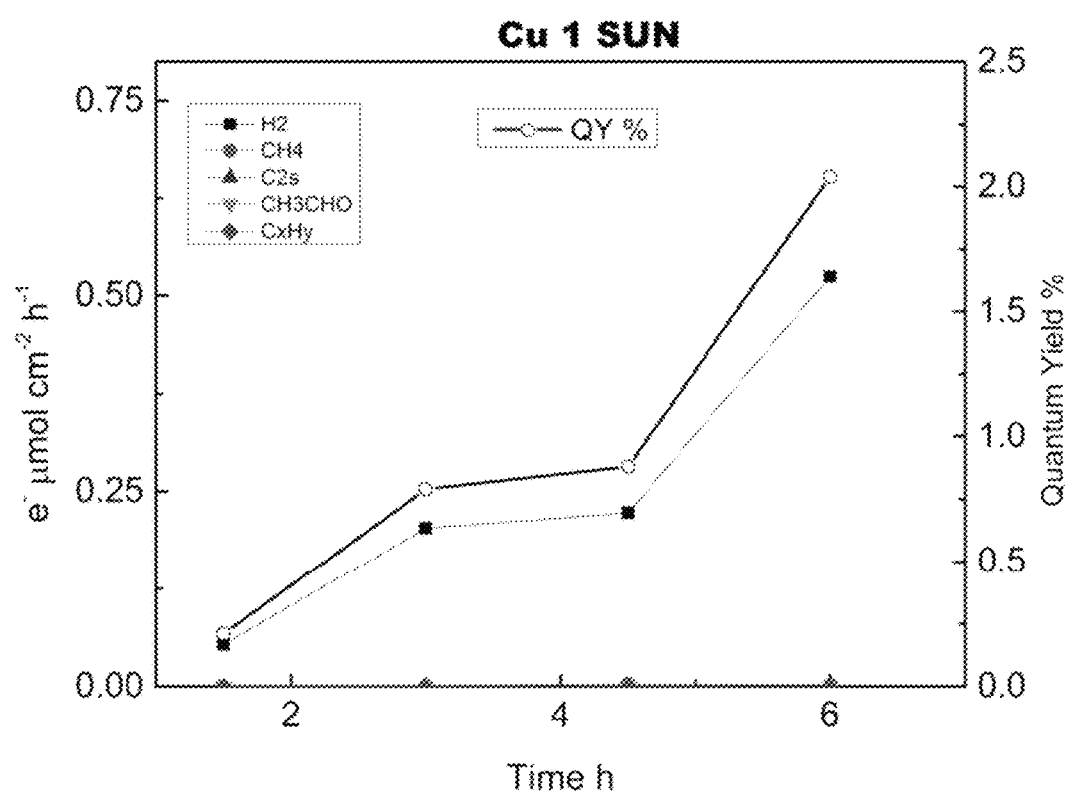
Figure 10F:
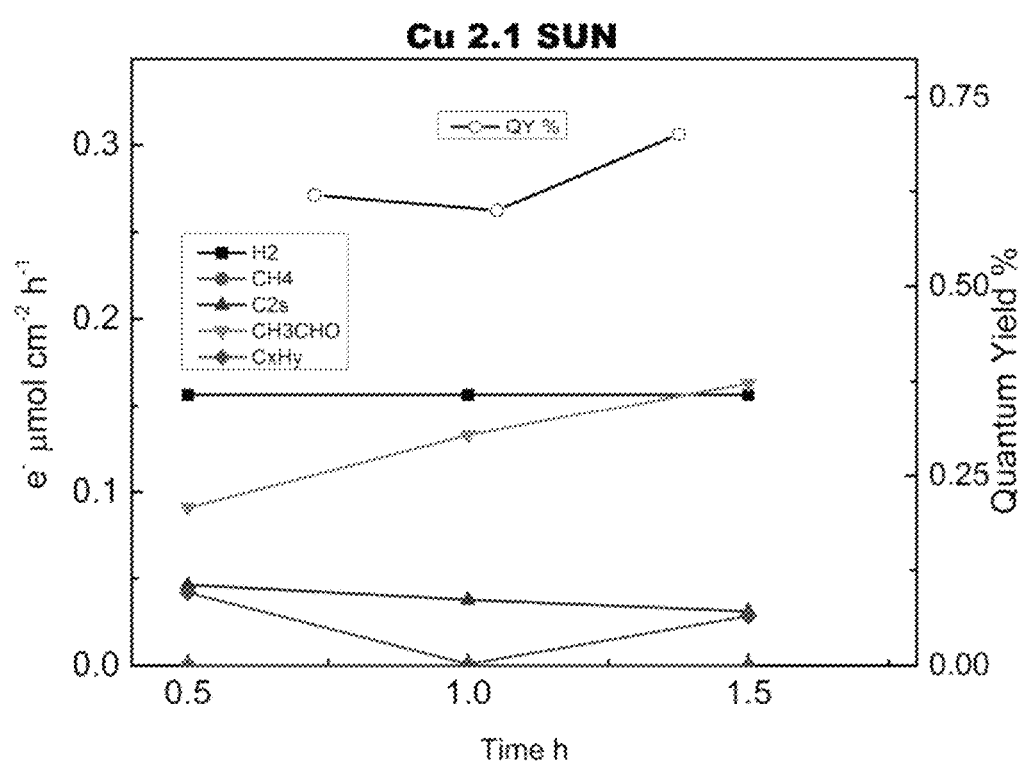

FIGS. 9A-C depict the results of photocorrosion studies of the $TiO_2$—CIS catalyst.

FIGS. 10A-F depict the stability assessment of $TiO_2$—Pt and $TiO_2$—$Cu_{2-x}O$ nanoparticles.

Figure 1A:
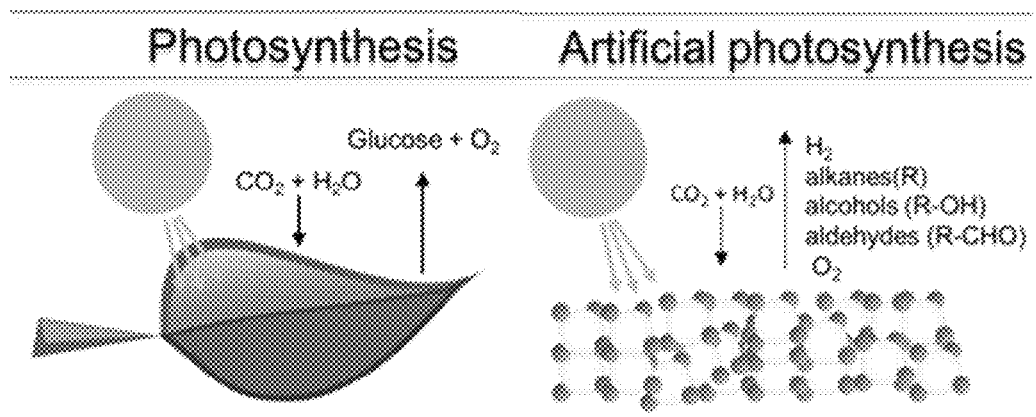
Figure 1B:
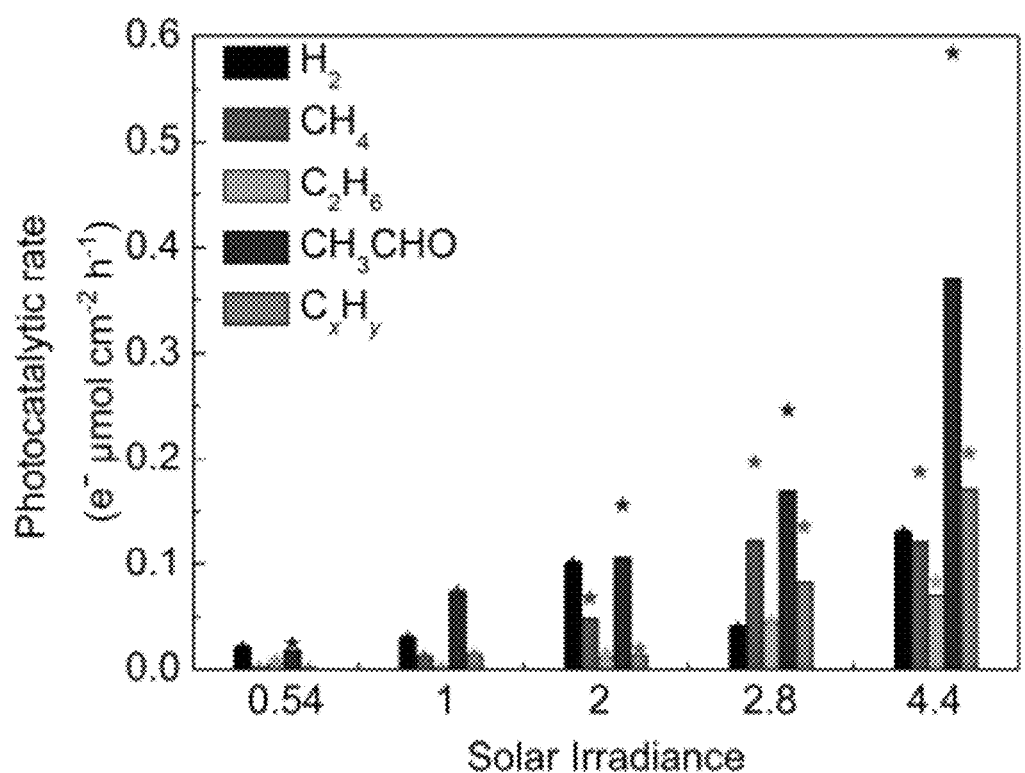
Figure 11:
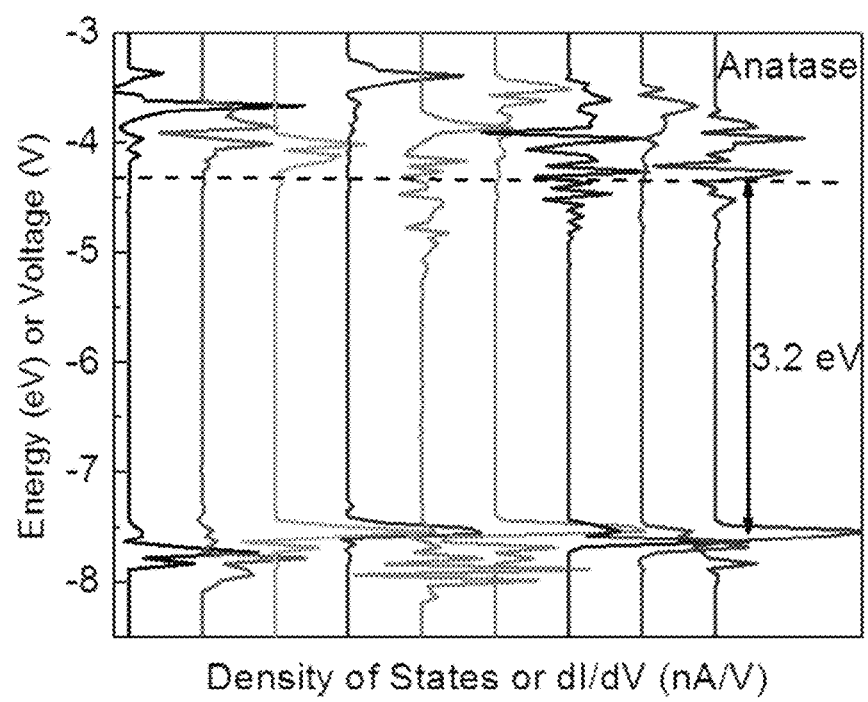

FIG. 11 depicts the defect density in treated $TiO_2$ nanoparticles. Compilation of representative STS spectrum obtained from several treated $TiO_2$ nanoparticles exhibiting high photocatalytic yields for $CO_2$—$H_2O$ reduction, as shown in FIG. 1B. The presence of defect levels ~0.5-1 eV below the $TiO_2$ conduction band was identified as an important step in photocatalysis.

Figure 12:
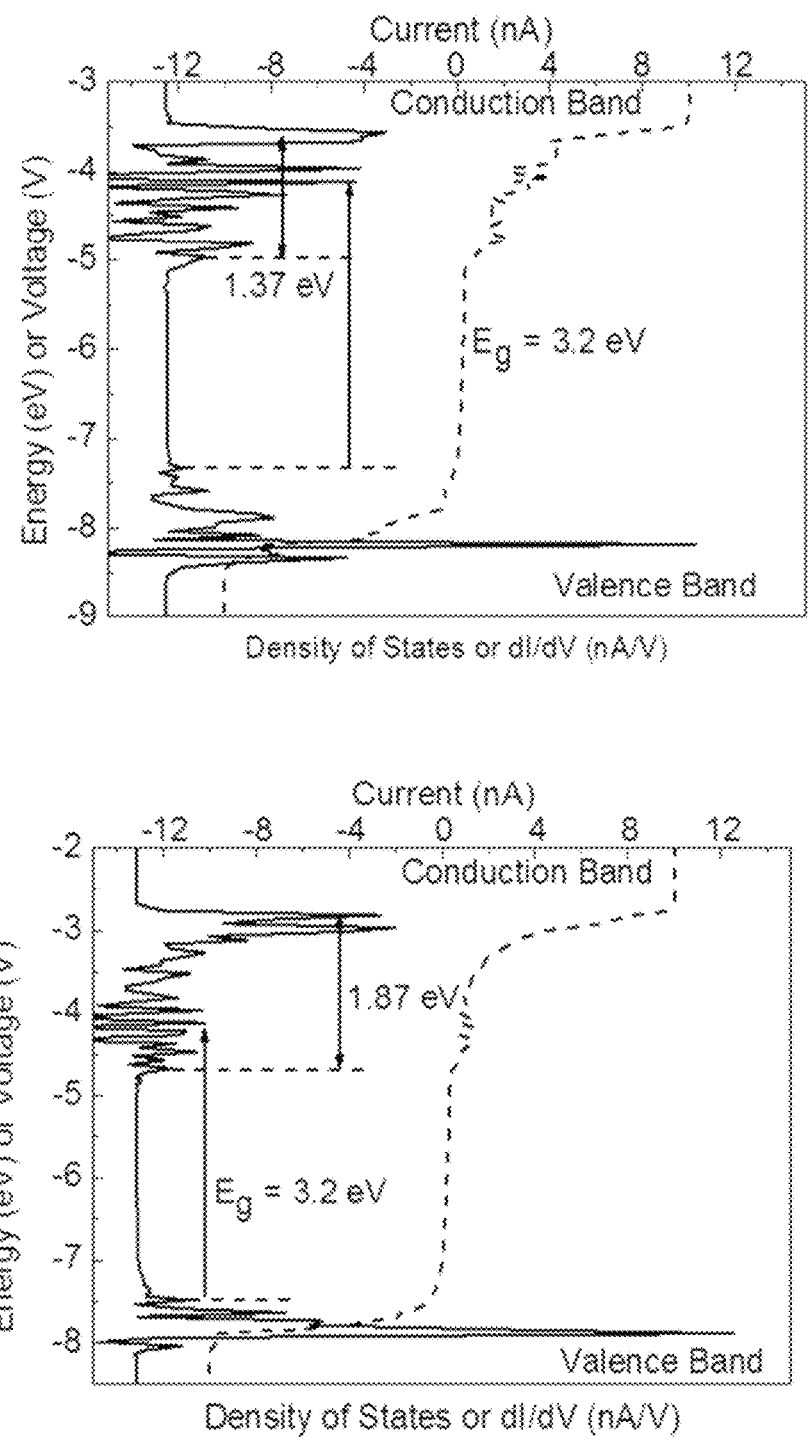

FIG. 12 depicts the effect of variable copper oxidation states on $TiO_2$—$Cu_{2-x}O$ composite photocatalyst. Copper exhibits two different oxidation states (1 and 2) resulting in change of $Cu_{2-x}O$ (0<x<1) valency and resulting electron traps in the photocatalyst. The results shown in FIG. 3 and here shows large variation in $Cu_{2-x}O$ energy levels (1.87-1.37 eV), due to differences in oxidation state and hence semiconductor bandgap ranging from $Cu_2O$ (2.1 eV) to CuO (1.2 eV). The solid line shows first derivative of current with voltage (dI/dV) or density of electronic states, the dashed line represents the current voltage spectrum, and can be related to relative reduction potential values for different fuel products formed from $CO_2$-water reduction (15). The work function of the Pt—Ir tip was used to represent the data on an absolute energy level, with respect to vacuum. Standard hydrogen electrode potential was used to represent NEE and energetic levels (w.r.t. vacuum) on the same scale.

FIGS. 13A-C. (a) Transmission electron micrographs of CdS NR-metal hybrids with Au (top) and Ag (bottom). The metal grows at the NR ends, as highlighted by the arrows. (b) Absorbance and photoluminescence of CdS—NRs, CdS NR—Au and CdS NR—Ag nanostructures. The absorbance spectrum indicates identical CdS bandedge absorption (2.68 eV), but long bandtail states in metal-hybrids (Au and Ag) possibly due to formation of intragap states. The NR PL shows two peaks: bandedge PL (2.62 eV) and defect mediated radiative recombination (1.84 eV), whereas PL is completely quenched in metal hybrids indicating non-radiative recombination pathways. (c) Electron production rate for CdS NRs, CdS NR—Au and CdS NR—Ag metal hybrids.

FIGS. 14A-C. (a) Transmission electron micrograph of 7.3 nm CdS NP. (b) Absorbance and PL for 3.1 nm CdS NP, 7.3 nm CdS NP, and CdS—ZnSe core-shell nanostructures. Small (3 nm) CdS NPs are well passivated and demonstrate strong bandedge PL at 3.07 eV, along with defect mediated PL at 2.24 eV, whereas large NPs (7.3 nm) have poor surface passivation, strongly quenched PL (due to non-radiative recombination), and negligible bandedge PL at 2.46 eV. Passivation of CdS nanostructures with ZnSe (CdS core-ZnSe shell) results in a stronger PL emission and bandedge PL (at 2.58 eV). (c) Electron production rate for different sized CdS NPs (3.1 and 7.3 nm), and core-shell nanostructures (CdS/ZnSe).

Figure 15A:
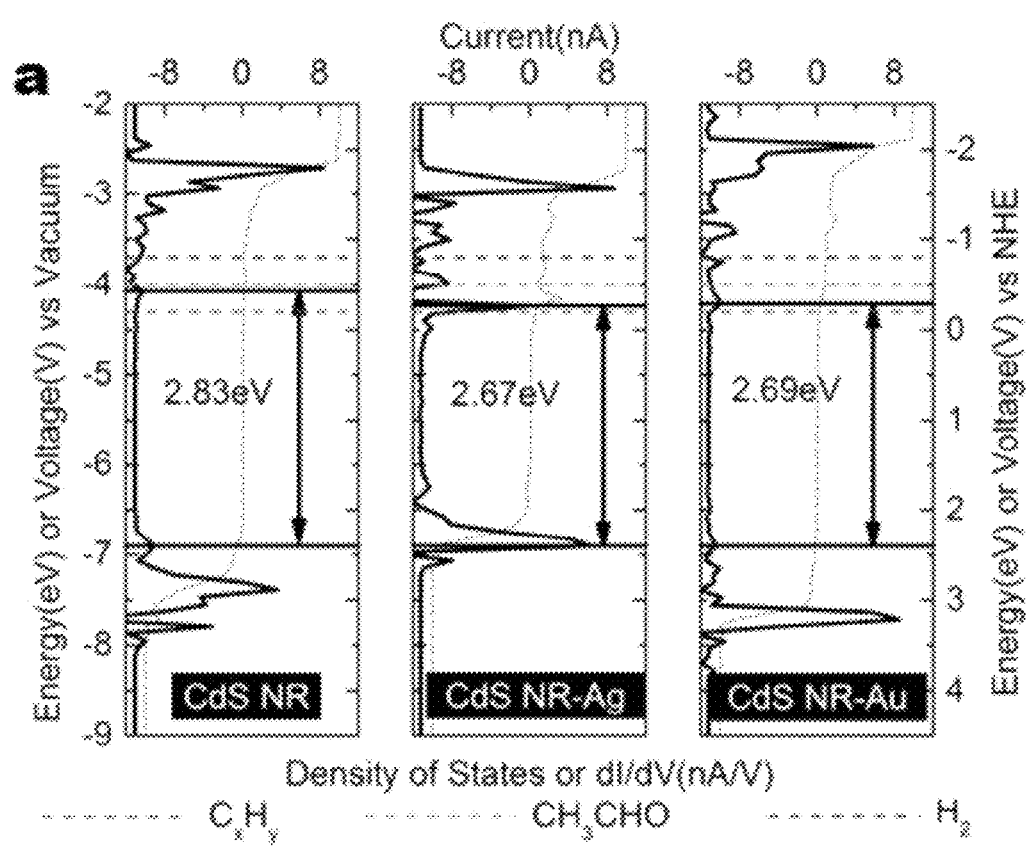
Figure 15B:
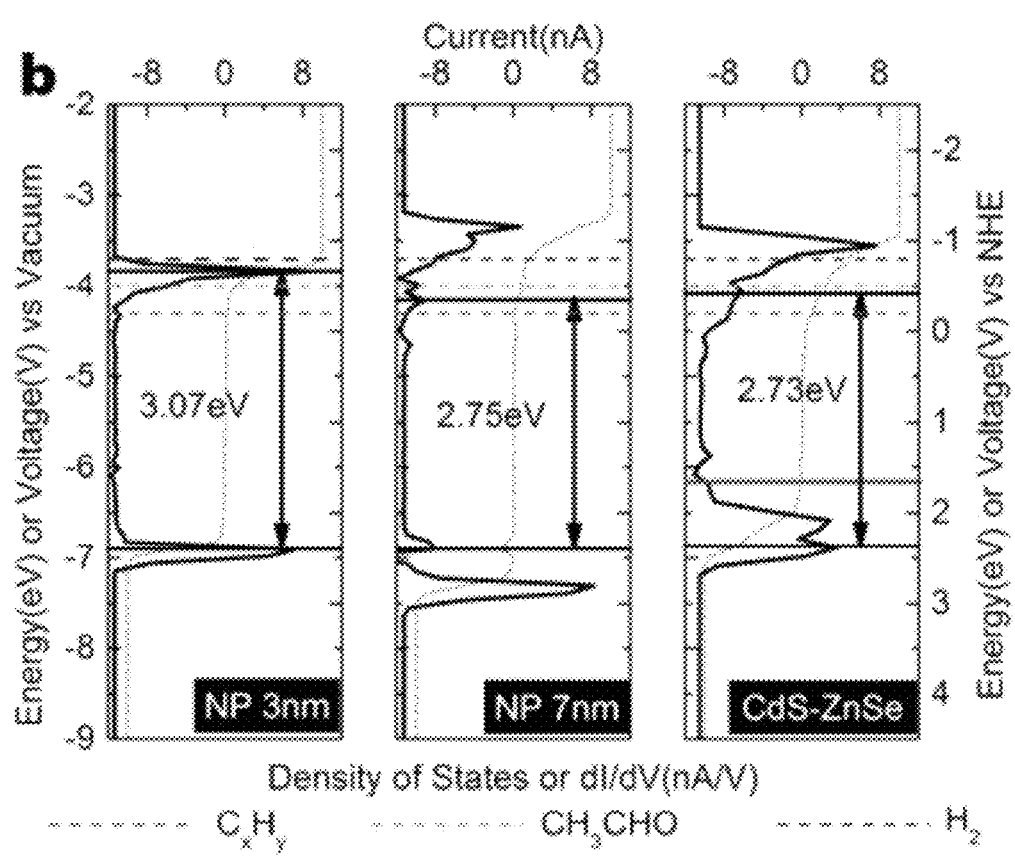
Figure 15C:
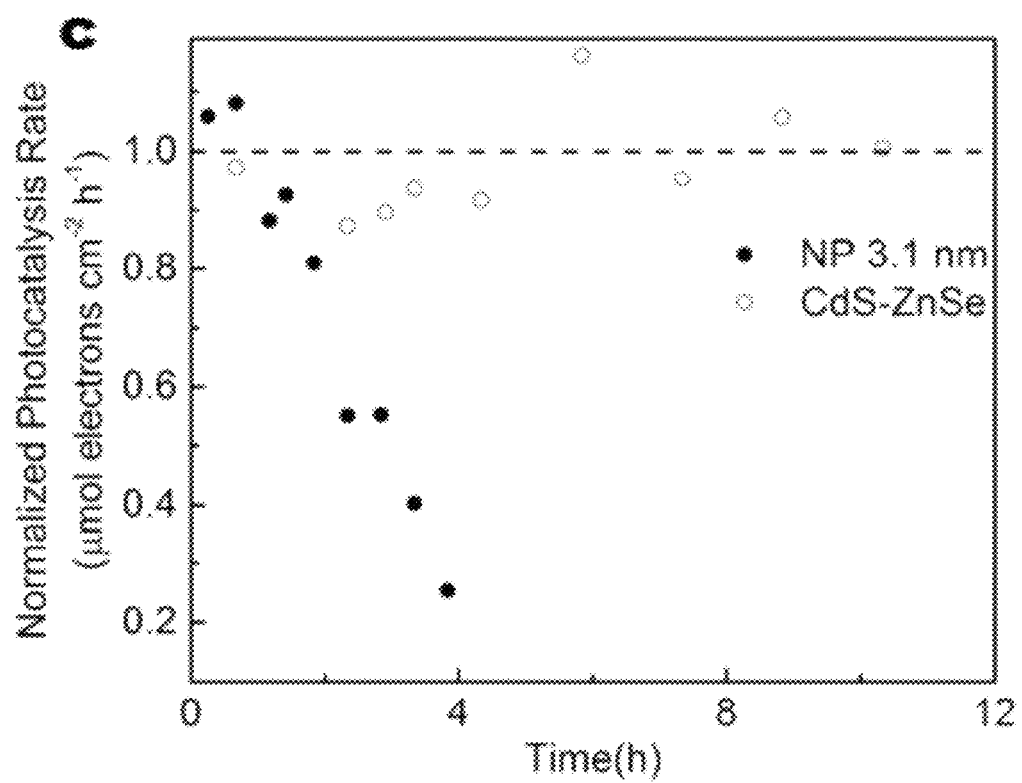

FIGS. 15A-C. (a) Measurements of electronic density of states (DOS), using scanning tunneling spectroscopy (STS), for CdS NRs, CdS—Au, and CdS—Ag metal hybrids. Identical bandgap and location of valence and conduction band states (highlighted with horizontal black lines) was observed in these measurements, along with small bandtails near valence band (~−7 eV) for metal hybrid CdS nanostructures. The respective reduction potentials for different photocatalytic products like alkanes (dashed red line), aldehydes (dashed green line), and hydrogen (dashed blue line) shows alignment of energetic states for photocatalysis. All CdS nanostructures shown here have valence band above the H2O oxidation potential to complete the redox reaction in a single nanoparticle photocatalytic device. (b) STS measurements of electronic DOS for different sized CdS NPs (3.1 and 7.3 nm) and core-shell nanorods (CdS/ZnSe). The core-shell nanostructure DOS show staggered CdS bandedge states (marked with horizontal black lines) and ZnSe valence band state (shown as red line), leading to separation of photogenerated electron (in CdS) and hole (in ZnSe). (c) Photocatalytic activity with time compared between 3.1 nm CdS NPs (solid circles) and CdS—ZnSe core-shell nanostructures (open circles).

FIGS. 16A-D. Wide-bandgap semiconductor nanotubes with tunable bandgap using doping. (A) Representative scanning electron microscope (SEM) image of $TiO_2$ nanotubes grown by electrochemical oxidation, which shows well-defined hollow tubes. Changing the anode voltage and growth time results in easily tunable diameter and nanotube thickness, as shown in FIGS. 22, 23A-F, 24. (B) Scanning tunneling spectroscopy (STS) data for nitrogen-doped $TiO_2$ nanotubes, showing clear shift of Fermi-level (at 0 eV) towards valence band (p-type doping). Nominally undoped nanotubes have impurity donors (FIG. 34) and therefore behave as n-doped semiconductors. Doping with p-type dopants (like nitrogen) first compensates these impurities, and then p-type dopes the nanotubes (FIGS. 38A-D). This phenomena can be easily observed by shifts in Fermi-level of the semiconductor with increasing dopant concentration, monitored by the tunneling spectra using Pt—Ir STM tips (the tip Fermi-level is fixed). (C) STS spectrum of (a) undoped, (b) Cu-doped, (c) N-doped, (d) Nb-doped, (e) Nb—N co-doped, and (f) Cu—N co-doped samples. (D) Extinction spectra of undoped, monodoped and co-doped $TiO_2$ samples. Clear change in bandgap can be seen using the STS and the optical spectrum of these doped wide-bandgap semiconductor nanotubes. The dashed-black line represents the large Rayleigh scattering observed in these nanotubes, which makes exact determination of bandgaps difficult in these indirect bandgap semiconductors, using optical spectroscopy.

FIGS. 17A-D. Electronic n- and p-type doping of $TiO_2$ nanotubes. (A) Room-temperature current-voltage (I-V) spectrum of $TiO_2$ nanotubes doped with 1 wt % of (a) Copper (Cu), (b) Copper-Nitrogen (Cu—N) co-dopant, (c) Nitrogen (N), (d) Niobium-Nitrogen (Nb—N) co-dopant, (e) undoped, (f) Iron (Fe), and (g) Niobium (Nb). While the amount of dopant incorporated in $TiO_2$ nanotubes was kept constant (1 wt %, determined using EDS), the change in nanotube conductivity can be explained using impurity doping (n-doping) of nominally undoped nanotubes and different ionization energies of the added dopants. The addition of increasing amount of p-type dopants in nanotubes first results in a decrease in n-type conductivity (FIG. 38A-D), followed by conversion to p-type and an increase in p-type conduction. Therefore, all p-type dopants (Cu, N—Cu—N) show a lower conductivity. These nanotubes likely form an ohmic contact with our metal probe, therefore no Schottky-type behavior was observed (as seen in CS-AFM and ensemble measurements of heavily-doped nanotubes, FIG. 17C, 18A-D). (B) STS spectra for Nb-doped and N-doped $TiO_2$ nanotube; dashed line guides to the Fermi-level (constant for our Pt—Ir tip) which is located near the bottom of conduction band for Nb-doped sample (n-type) and near the top of valence band for N-doped sample (p-type). (C) Current sensing atomic force microscopy (CS-AFM) I-V characteristics of n-type (Nb doped) and p-type (N-doped) $TiO_2$ nanotubes. The formation of a Schottky junction between gold-coated tip and the nanotubes (shown in FIGS. 32, 33) allows clear observation of n- and p-type forward and reverse-biased spectrum. (D) Conductance (I/V) of Nb-doped nanotubes as a function of temperature (1/kT). The slope (or activation energy) for shallow Nb dopant was measured as 18 meV. This explains the high ionization, and resulting high-conductivity, of Nb doped $TiO_2$ nanotubes. This shallow donor was subsequently used for making transparent (high bandgap) conducting nanotubes (FIGS. 19A, 19B, 38A-D).

Figure 19A:
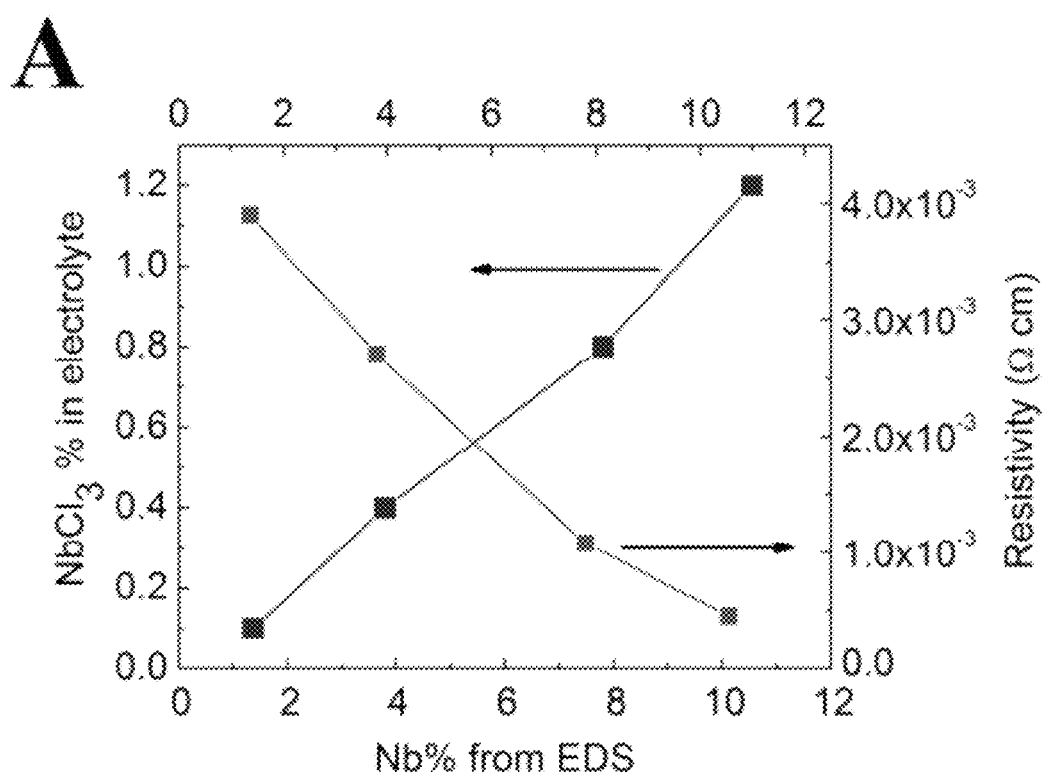

FIGS. 18A-D. Optoelectronic properties of doped $TiO_2$ nanotubes. (A) Spectrally resolved photoresponse (photocurrent normalized by incident light intensity) for undoped (blue), Cu-doped (pink), N-doped (green), and Cu—N co-doped (red) $TiO_2$ nanotubes. While Rayleigh scattering makes optical extinction indeterminate, we utilized this optoelectronic behavior to obtain accurate bandgaps for different doped nanotubes. Presence of impurity donor states ~0.4 eV below the $TiO_2$ bandgap (3.2 eV) can be easily seen for undoped nanotubes (confirmed by STS in FIG. 34), whereas donor states of Cu (~0.6 eV), N (~0.7 eV) and Cu—N (~0.8 eV) below bandgap were observed here. (B) Modified Fowler-Nordheim plot (explained in the text) for photogenerated electrons in Cu-doped $TiO_2$ nanotubes. A distinct drop in conduction ~0.6 eV below the $TiO_2$ bandgap correlates well with the activation energy of Cu-doped nanotubes (I-V-T in FIGS. 36A-B, 37A-E). (C) I-V characteristics (red curve) and corresponding ln(I) vs V plot (blue curve) of undoped $TiO_2$ nanotubes. Dashed lines show the slope of the ln(I) vs V plot, used to extract electrical characteristics of these nanotubes (Tables I, II). (D) I-V characteristics of low conductivity Cu-doped (1 wt %) $TiO_2$ nanotubes are well described by typical space charge limited current (SCLC) model ($I \sim V^2$ at higher bias). Highly conducting Nb-doped nanotubes exhibit ohmic conduction (FIGS. 19A-B).

Figure 19B:
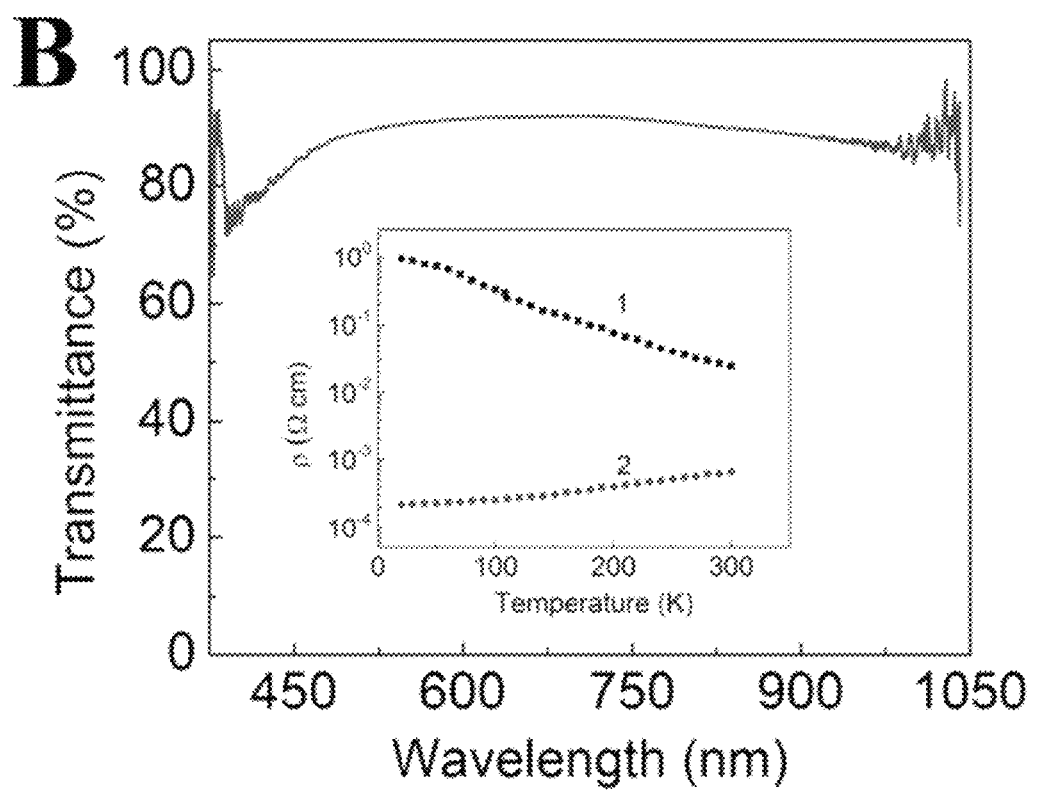
Figure 19C:
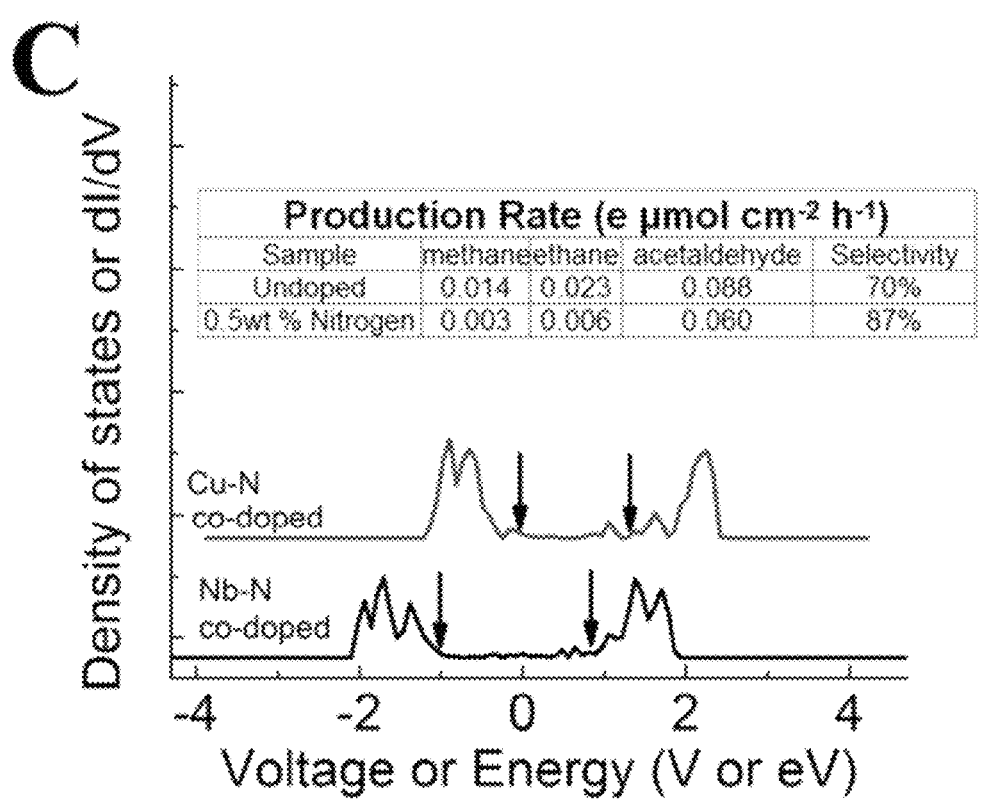

FIGS. 19A-D. Optoelectronic, photocatalytic and magnetic applications of selectively-doped nanotubes. (A) Nb concentration in doped $TiO_2$ nanotubes, as a function of $NbCl_3$ concentration in the electrolyte (blue curve), and the resistivity of the samples (red curve). Increasing the Nb dopant concentration results in a linear increase in conductivity (1/Resistivity), which can be used to produce "metal-like" conductivity in heavily-doped semiconductors (FIG. 19B inset). (B) Shallow Nb donors were used to make highly transparent oxide nanotubes. The high transmittance of these nanotubes (>90% above the bandgap, 10 wt % Nb dopant) allows first demonstration of TCO nanotubes. The transmittance η was estimated from reflectivity measurements using the equation:

$$\eta = \left(1 - \frac{R_b - R_d}{R_s - R_d}\right) \times 100\%,$$

where Rb, measured signals from blank Ti sheet, Rs—signal from the sample, and Rd—background signal. The temperature dependence of resistivity for Nb-doped $TiO_2$ samples with two Nb concentrations –1% (curve 1, inset), and 10% (curve 2, inset). 1% doped sample ($Ti_{0.99}Nb_{0.01}O_2$) shows increase in resistivity with temperature, as a typical semiconductor (due to reduced carrier concentration). However, heavily doped $Ti_{0.9}Nb_{0.1}O_2$ sample (10% Nb-doped $TiO_2$), shows a reduced resistance to electron transport, typical for metals (due to reduced electron scattering). (C) Co-doped $TiO_2$ nanotubes (Cu—N and Nb—N) show infrared absorption of incident light, shown using the small bandgaps determined by STS spectrum. These photocatalysts can absorb much more light than the undoped wide-bandgap nanotubes. Photocatalytic reduction of carbon-dioxide was used to demonstrate higher selectivity (Table in inset) and higher stability (FIG. 42) for the doped $TiO_2$ nanotubes. (D) Room-temperature magnetization (M) vs. magnetic field (H) hysteresis loop for Fe-doped $TiO_2$ nanotube samples. Inset shows zero-field cooled (ZFC) and field cooled (FC) temperature dependent magnetization, which demonstrates that ferromagnetic behavior of Fe-doped nanotubes results from substitutional Fe magnetic dopants, not secondary phases. Similar measurements on undoped nanotubes (FIGS. 41A-B) show clear paramagnetic behavior. Therefore, incorporation of desired dopants tunes the magnetic properties of these wide-bandgap semiconductors nanotubes.

FIG. 20. Electrochemical cell used for growth of undoped $TiO_2$ nanotubes. The cell consists of Pt cathode, Ti sheet as anode, a DC bias applied between these two electrodes, and an electrolyte consisting of solvent (glycerol, ethylene glycol, etc.) and fluoride acid ($NH_4F$, HF, etc.).

FIG. 21. A) A sketch showing design of new electrochemical cell developed in this work. It is divided to two parts separated with porous membrane to prevent from high currents and from cation deposition onto Pt electrode. B) Schematic illustrating rectangular shape AC signal with parameters employed for doping nanotubes.

Figure 22:
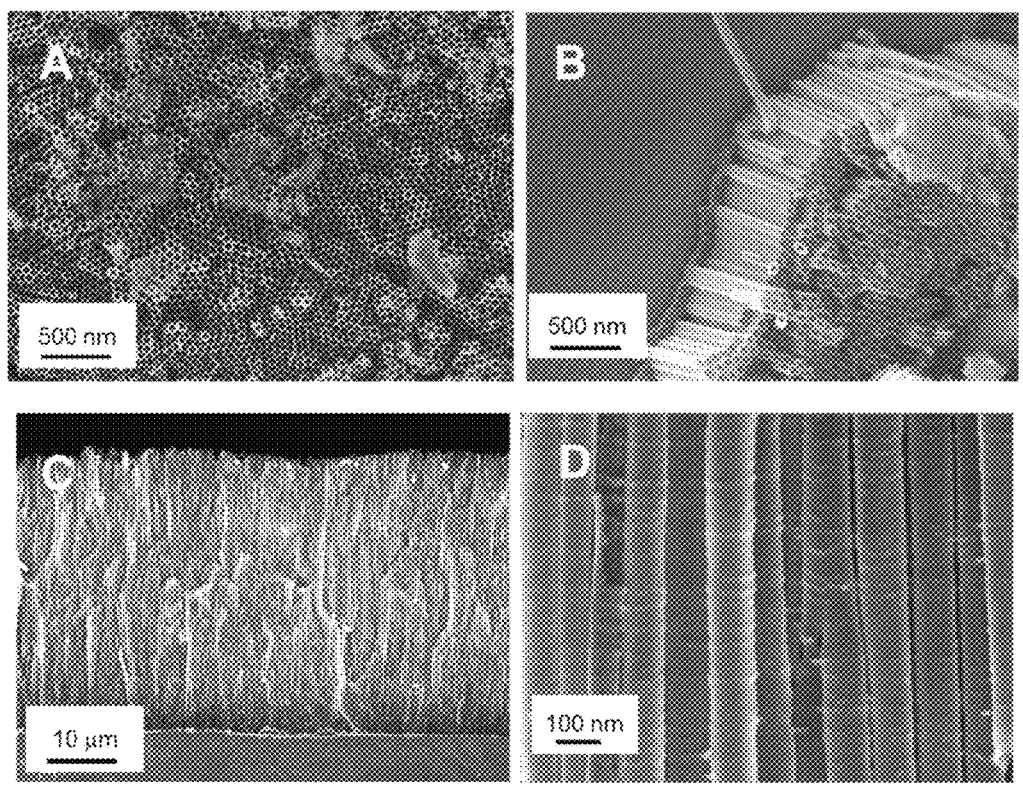

FIG. 22. Representative scanning electron micrographs of $TiO_2$ nanotube arrays grown by electrochemical anodization: A) show top view of densely packed nanotubes, B) shows a bottom view after removing nanotubes from the Ti metal, and the side view of the vertical, hollow, doped $TiO_2$ nanotubes, C) and D) show side profile at different magnifications.

Figure 23:
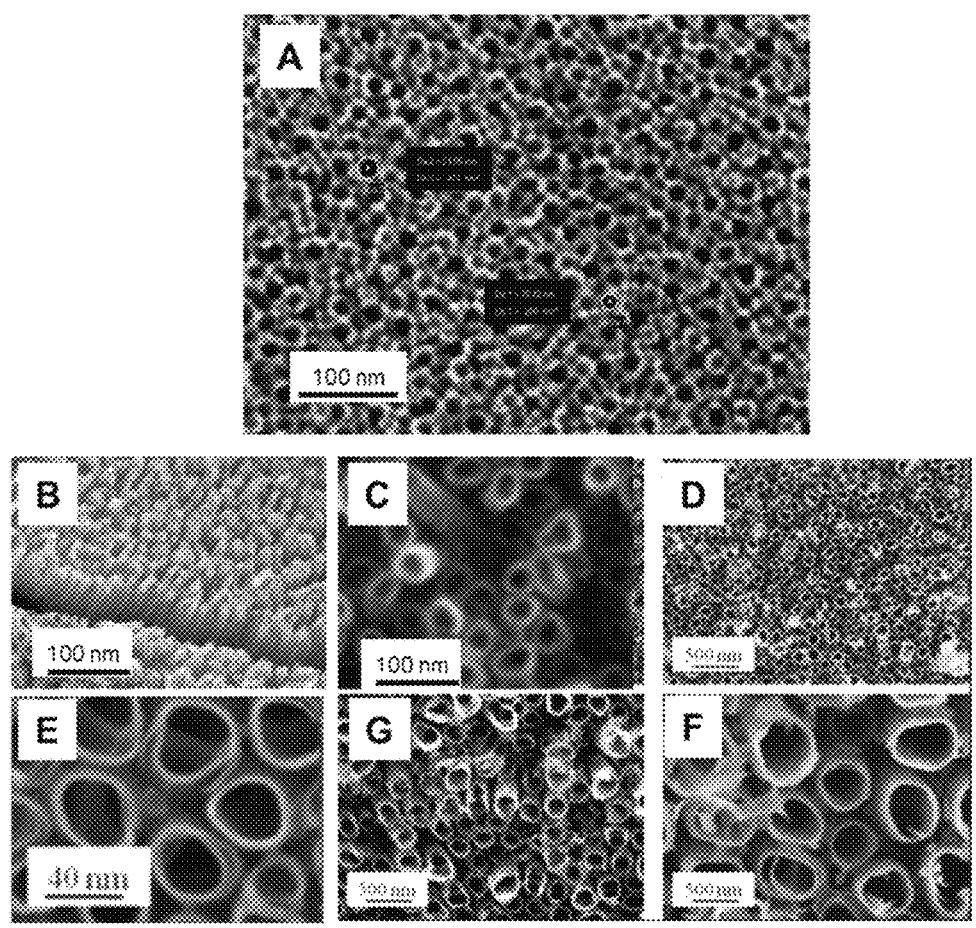

FIG. 23. SEM images of the $TiO_2$ nanotubes with different diameters grown at different anodization: A) and B) correspond to nanotubes with 18 nm diameter (grown at 7 V), A) shows nanotubes at early stage of the growth when nanotubes start forming. C), D), E), F), and G) correspond to nanotubes with diameters 43 nm (grown at 15 V), 86 nm (30 V), 170 nm (60 V), and 322 nm (120 V), and 550 nm (200 V).

Figure 24:
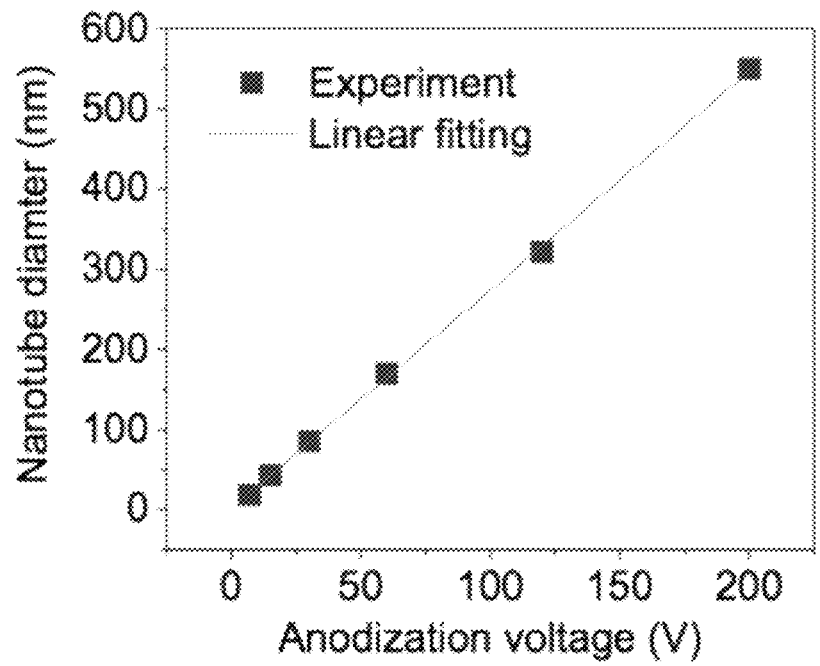

FIG. 24. The plot shown summarizes the effect of anodization voltage on the nanotube diameter. Linear relationship between applied anodization voltage and nanotube diameter makes obtaining desired nanotube morphology (diameter, thickness, length) easy.

Figure 25:
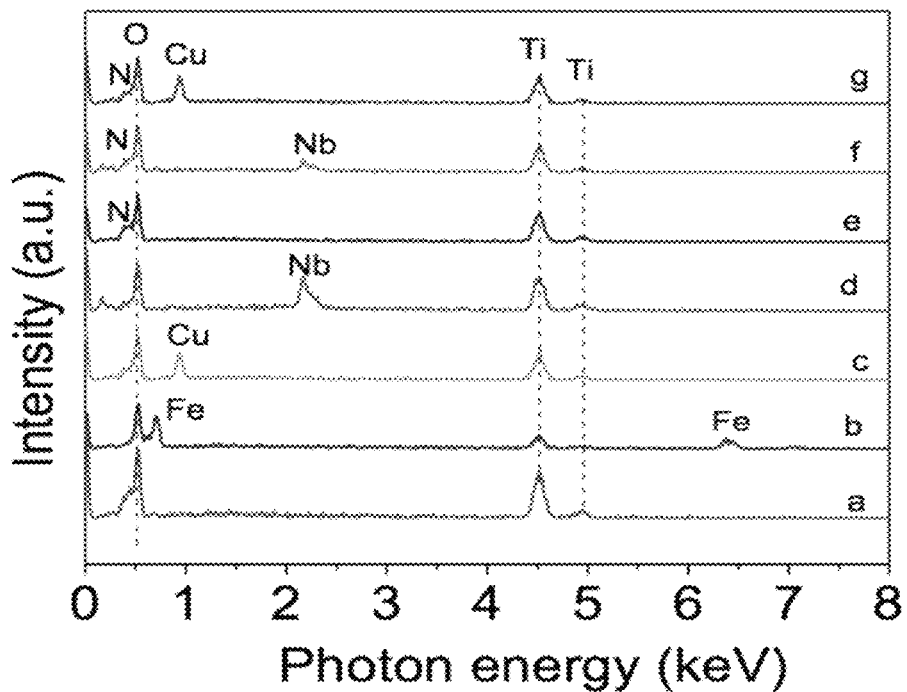

FIG. 25. Energy dispersive spectroscopy (EDS) for (a) undoped, (b) Fe-doped, (c) Cu-doped, (d) Nb-doped, (e) N-doped, (f) Nb and N co-doped, and (g) Cu and N co-doped doped $TiO_2$ nanotubes. Well-pronounced characteristic X-ray emission peaks of dopants can be seen along with $TiO_2$ matrix (Ti and O peaks). This data prove the presence of desired dopants in $TiO_2$ nanotube films.

Figure 26:
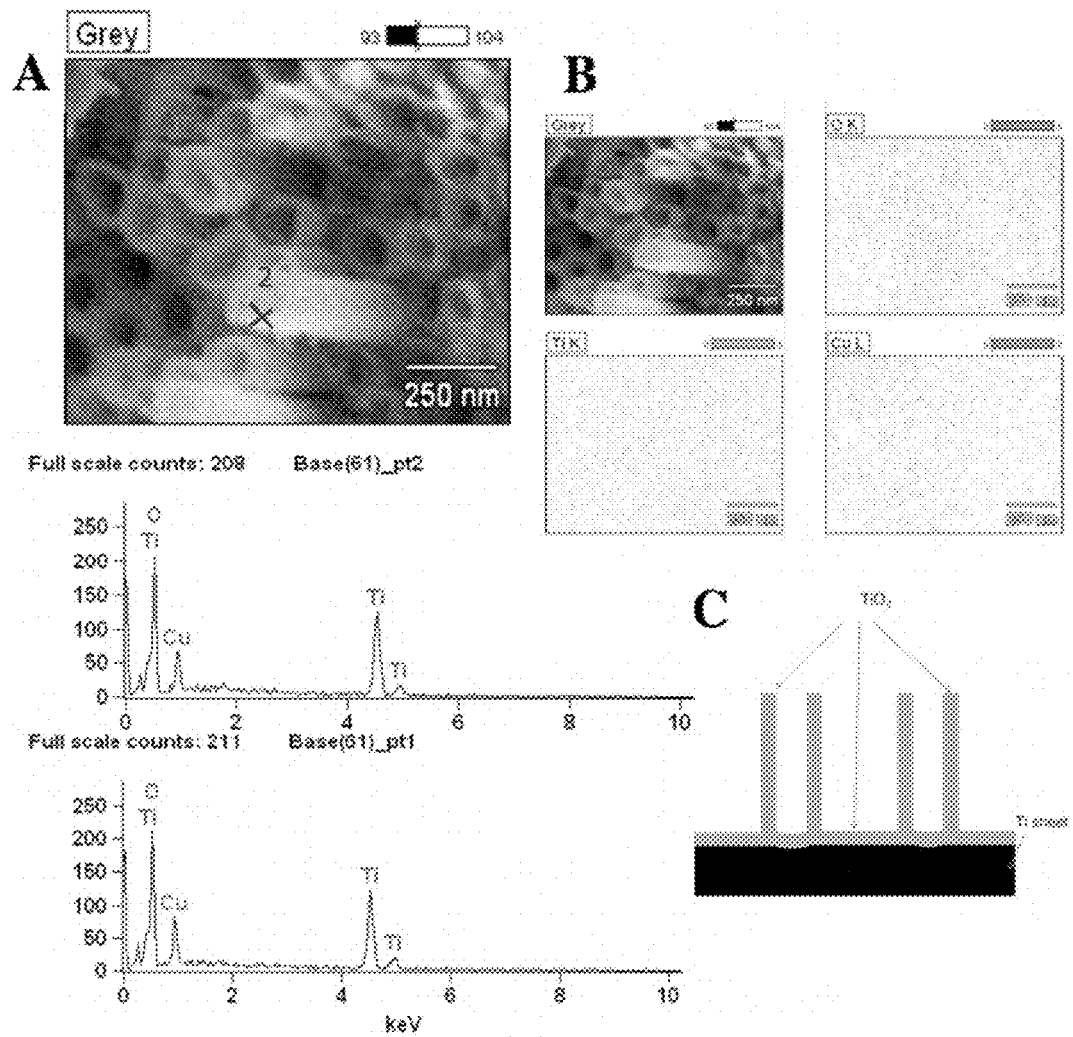

FIGS. 26A-C. (A) EDS point scans taken from different points of individual Cu-doped $TiO_2$ nanotubes (we show two representative points). This scan was performed by pointing a focused electron beam onto the surface of a single nanotube. This data demonstrates that Cu dopants were uniformly incorporated in the $TiO_2$ crystal lattice. Similar scans for all dopants (cations and anions) were performed to ensure uniform doping in $TiO_2$ nanotubes. (B) EDS elemental maps over large areas, showing uniform incorporation of the dopant (copper here). Such elemental maps were used to ensure uniform doping in wide-bandgap nanotubes. (C) Schematic showing EDS elemental mapping using characteristic X-rays emitted on irradiation with electron beam. Uniform incorporation of dopants mimic the Ti and O signal obtained (as shown in FIG. 26B). Formation of phase separated clusters can be detected as separate dense regions of dopant phase (X-ray signal), which were not seen for any dopants used in this present study.

Figure 27:
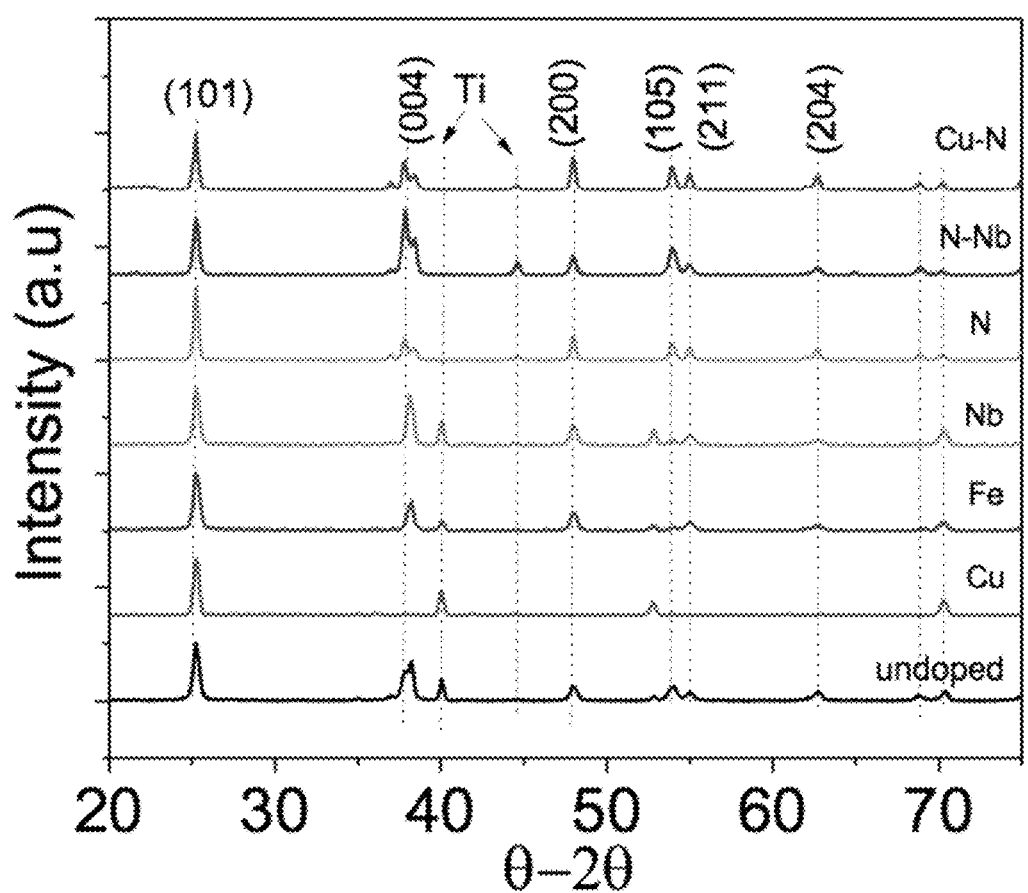

FIG. 27. XRD patterns for undoped, Nb, Cu, Fe, N doped, and Nb/N and Cu/N co-doped and undoped samples. Labels on the right guide to the corresponding samples. Only reflection peaks corresponding to anatase $TiO_2$ phase were detected in all samples indicating lack of secondary phases.

Figure 28:
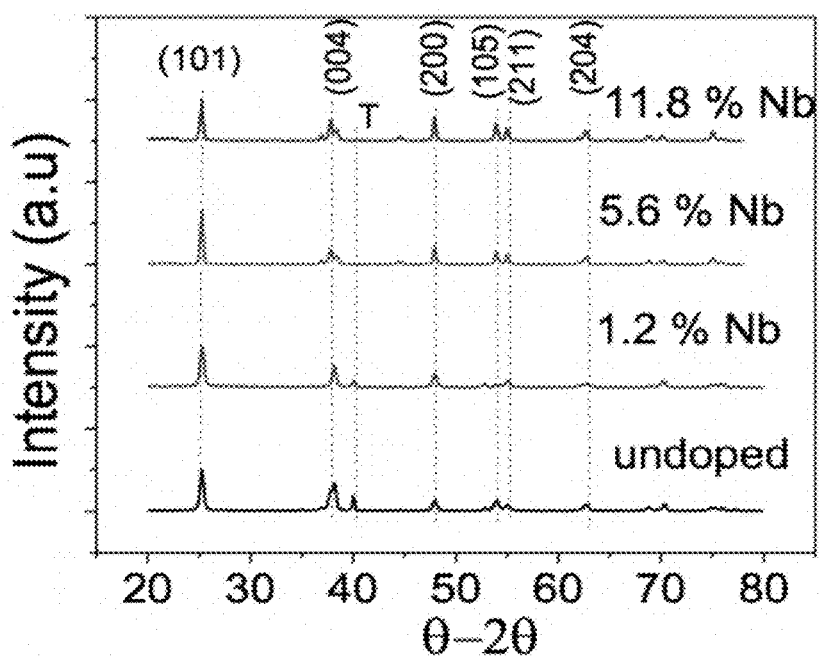

FIG. 28. XRD patterns for undoped and Nb doped $TiO_2$ nanotube samples, with different Nb concentrations. Only reflection peaks corresponding to anatase $TiO_2$ was observed in all samples without any secondary phase peaks. Peaks marked "T" in the 2θ patterns in this figure corresponds to the underlying Ti substrate from which $TiO_2$ nanotubes were grown.

Figure 29:
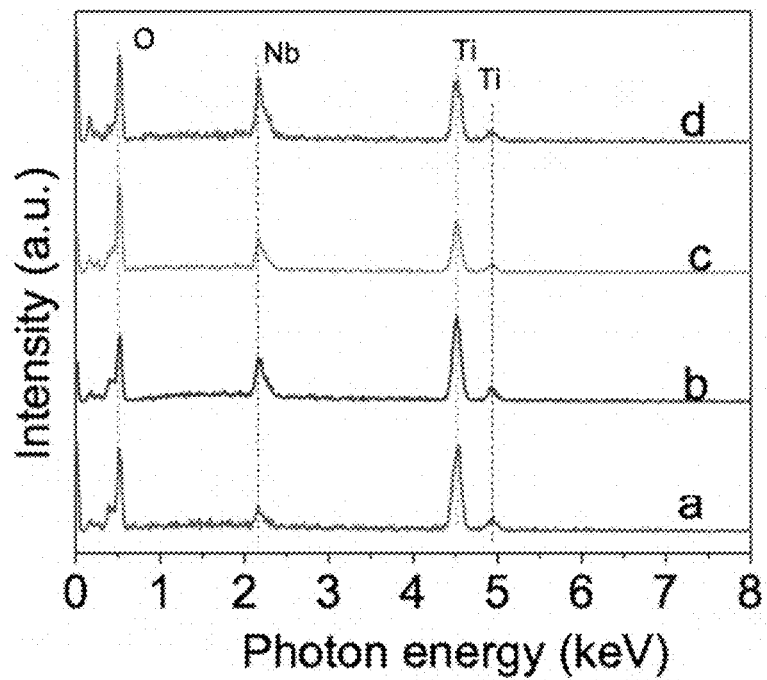
Figure 30:
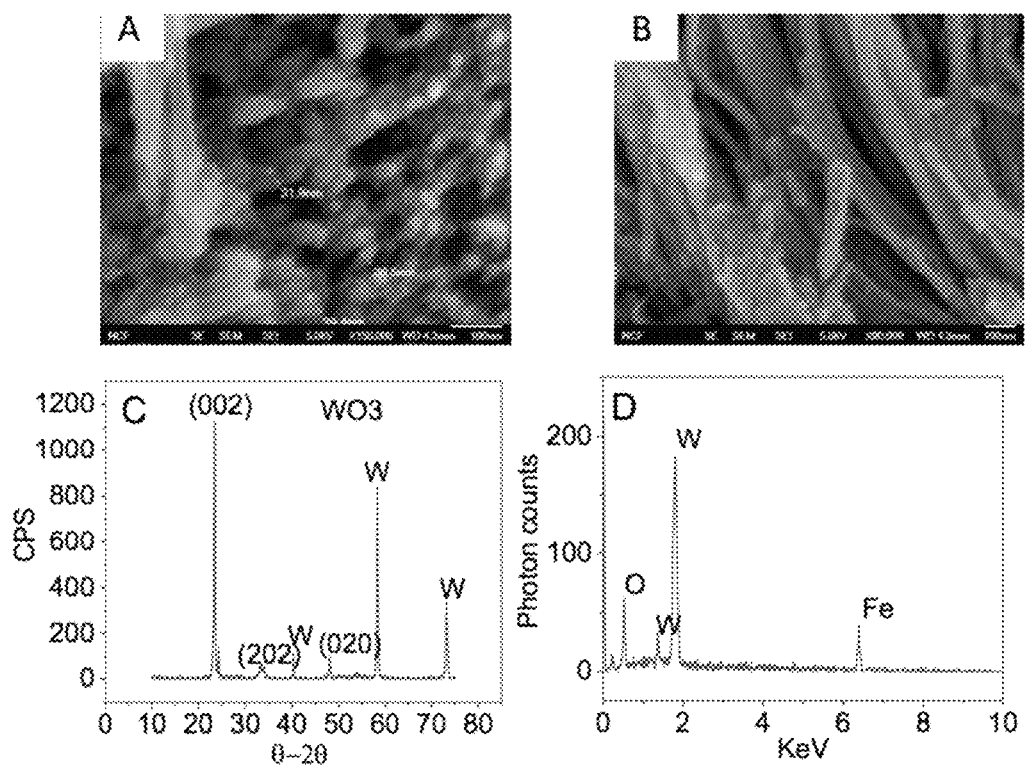

FIG. 29. Energy dispersive X-ray Spectrum (EDS) for Nb doped $TiO_2$ nanotubes with different concentrations of Nb precursor: a) 0.1%, b) 0.4%, c) 0.8%, and d) 1.2%. The corresponding Nb concentration in $TiO_2$ NT samples, quantified using EDS, were determined to be 1.37%, 3.8%, 7.8%, and 10.55%, respectively, presenting nearly linear relationship between $NbCl_5$ content in electrolyte and EDS signal.

FIGS. 30A-D. SEM images of Fe-doped WO3 nanotubes grown by anodization: (A) top view, (B) side view. (C) XRD data of heavily doped WO3 (10 wt % Fe in WO3), clearly shows absence of any secondary phase (due to phase separation or iron-oxide) signal. This indicates that Fe ions have likely replaced W in the $TiO_2$ lattice, thereby doping these WO3 nanotubes (W0.9F0.1O3). (D) EDS data from these doped WO3 nanotubes, showing clear incorporation of Fe in the nanotubes. Similar EDS signals were obtained all through the sample showing uniform addition of Fe ions.

Figure 31:
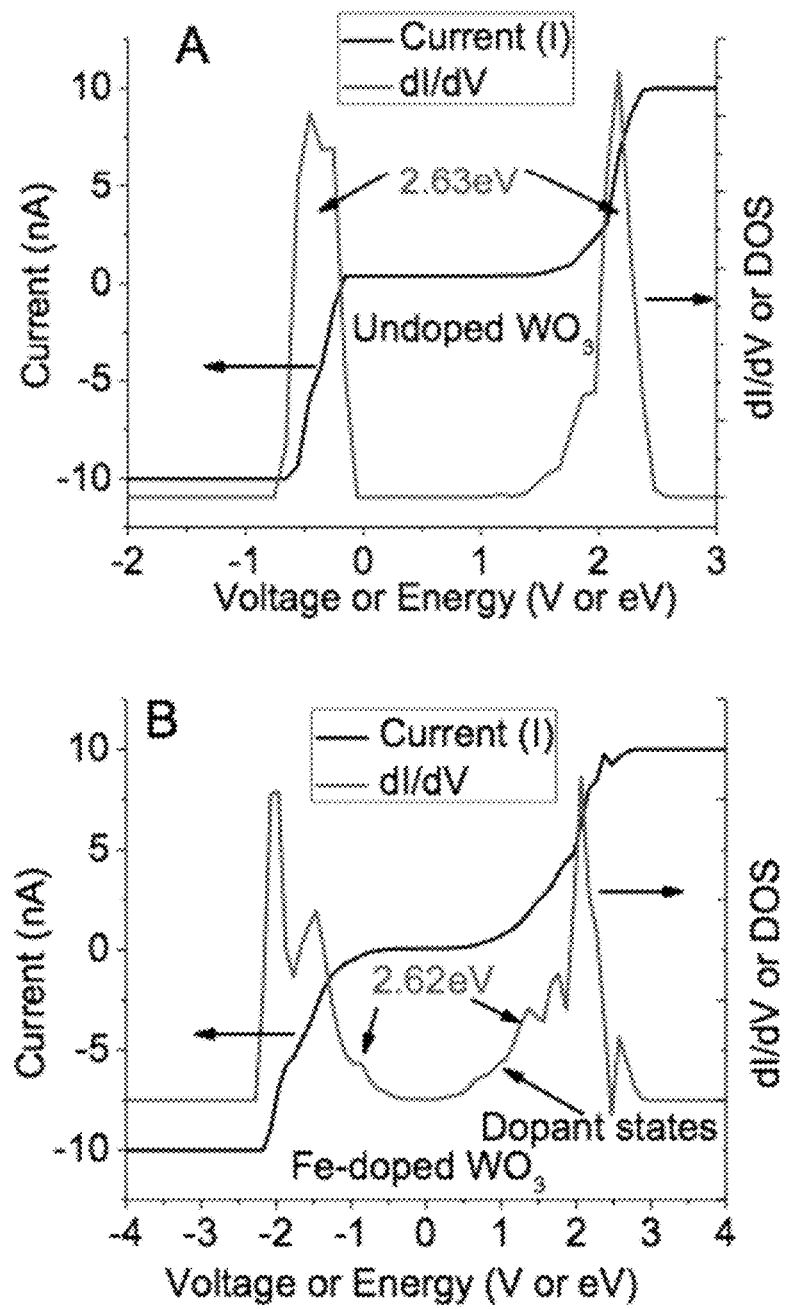

FIGS. 31A-B. STM data for A) undoped and B) Fe-doped $WO_3$ nanotubes grown by anodization. Fe-doped $WO_3$ nanotubes STM shows clear addition of dopant states in the conduction band. Positive voltages are conduction band (electron states), negative voltages are valence band (hole states). These results clearly show Fe-doped $WO_3$ nanotubes, resulting in n-doped (and possibly magnetically doped) wide-bandgap nanotubes.

Figure 32:
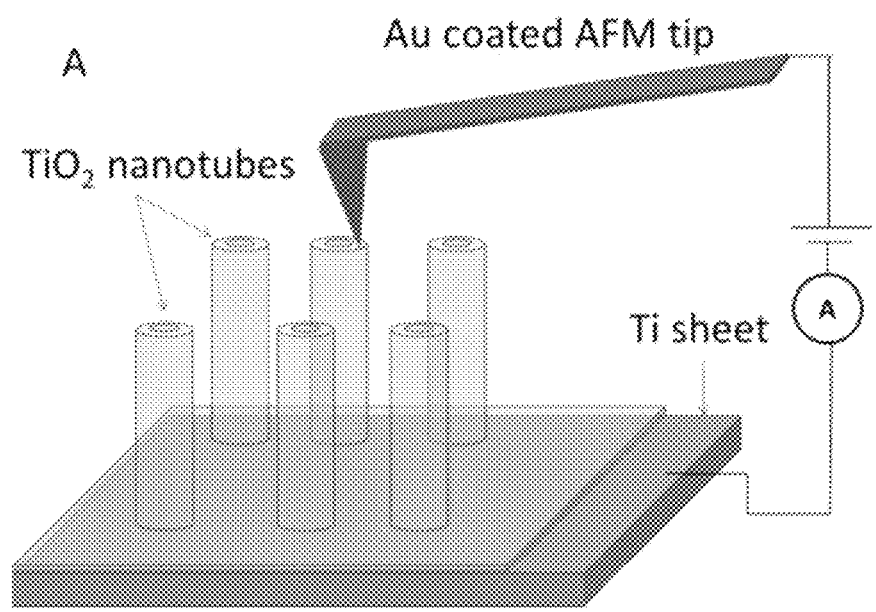

FIG. 32. A schematic showing electrical circuit during CS-AFM measurements.

Figure 33:
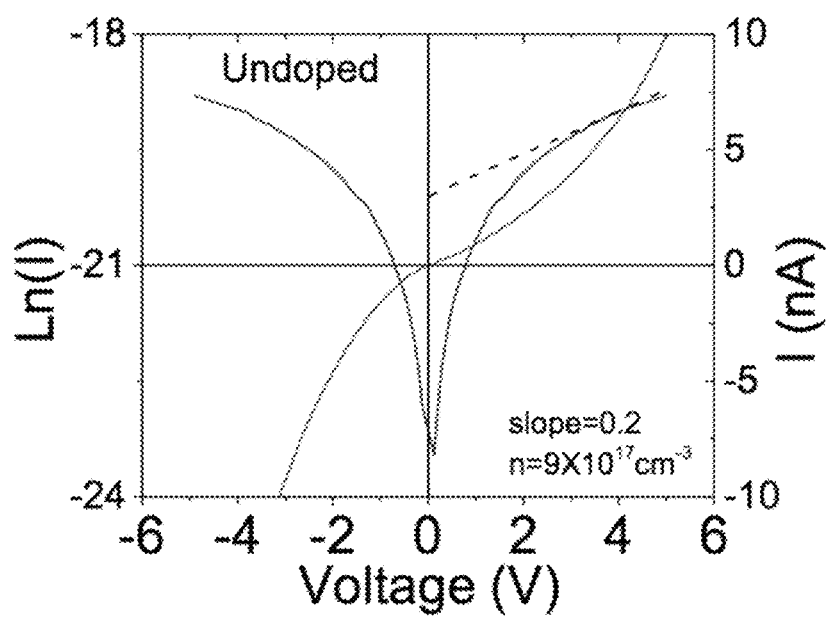

FIG. 33. CS-AFM I-V curve and corresponding ln(I)-V plot for undoped $TiO_2$ nanotubes to illustrate the calculation method for carrier concentration.

Figure 34:
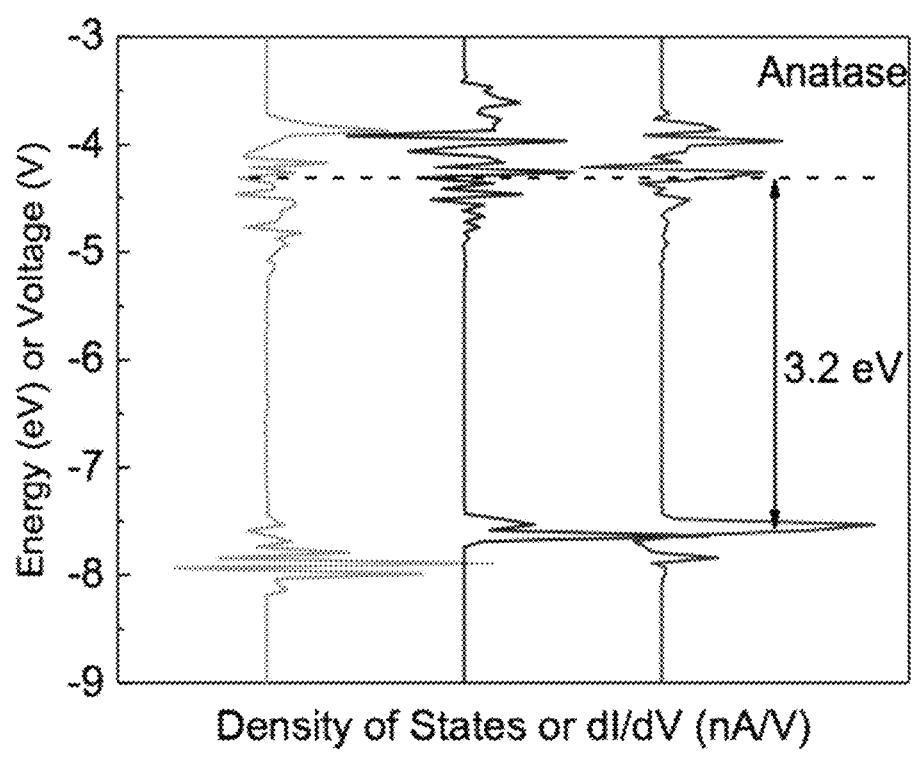
Figure 37A:
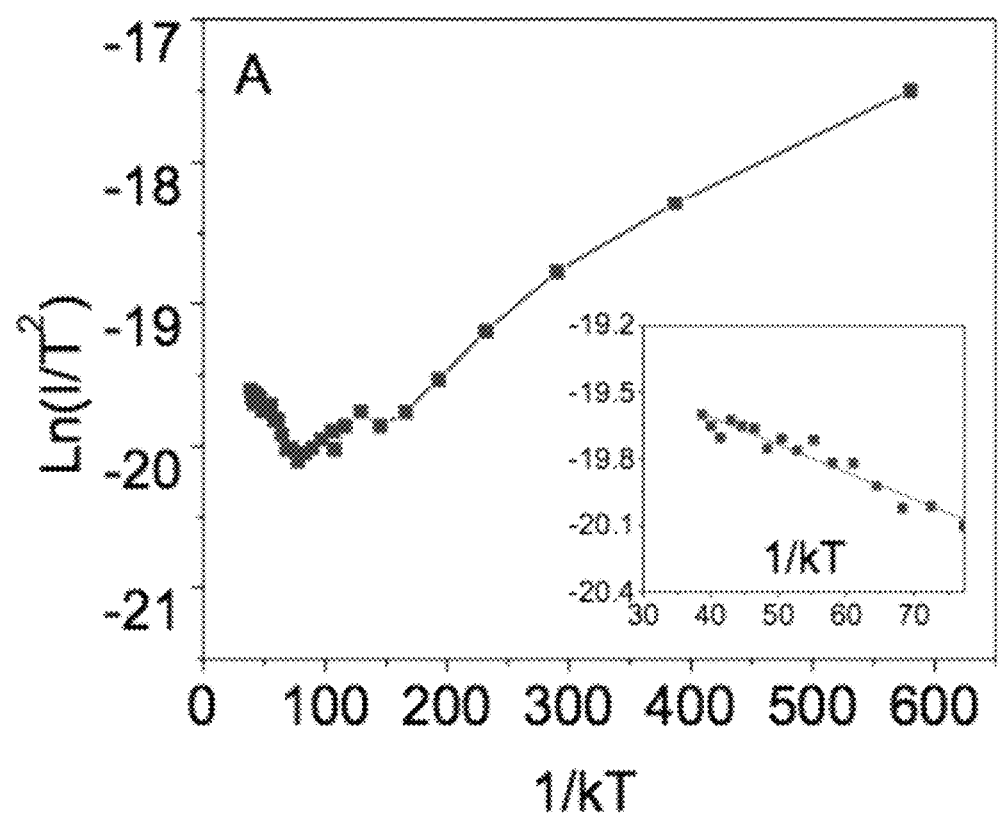

FIG. 34. Representative STS spectrum obtained from nominally undoped $TiO_2$, exhibiting high density of states near conduction band (~0.4-0.7 eV below the CB~-4.3 eV). These states are impurity donors (likely oxygen vacancies), and responsible for n-type behavior observed from these undoped $TiO_2$ nanotubes.

FIGS. 35A-D. CS-AFM current-voltage (I-V) characteristics and corresponding ln(I) vs V plots of single nanotubes of (A) undoped, (B) Fe-doped, (C) Nb-doped, and (D) Cu-doped $TiO_2$ nanotube samples. This data was analyzed to extract carrier concentration (described above).

FIGS. 36A-B. (A) Temperature dependent current-voltage characteristics presented in 3D mode; (B) Conductance (IN) of Nb-doped (curve 1), Fe-doped (curve 2), undoped (curve 3), and Cu-doped (curve 4) samples as a function of 1/kT. The slope at higher temperature region (>160 K) revealed activation energies 0.018 eV, 0.037 eV, 0.093 eV, and 0.532 eV for Nb-doped, undoped, Fe-doped, and Cu-doped samples respectively.

FIGS. 37A-E. (A) Shows Richardson plot $\ln(I/T^2)$ vs $1/kT$ for entire temperature range 20 K-300 K. Activation energies were calculated in the higher temperature region. (B)-(E) Richardson for doped and undoped samples; the activation energies were derived to be 0.027 eV, 0.014 eV, 0.097 eV, and 0.502 eV, respectively, for undoped, Nb-doped, Fe-doped, and Cu-doped samples.

FIGS. 38A-D. (A) Ensemble I-V characteristics of N-doped $TiO_2$ nanotubes, with different dopant concentrations (0.5% and 5%). This change of I-V behavior is explained by the transition of electrical properties of $TiO_2$ nanotubes from n-type to p-type. N-doping was easily controlled by changing the amount of N precursor (hexamethylenetetramine) in electrolyte. (B) Linear relationship between amount of N precursor in electrolyte and detected N in $TiO_2$ nanotubes. (C) The conductivity of N-doped samples first decreases and then increases, with an increase of N concentration m in $TiO_2$, reaching a minimum at m=2%, as shown. This concentration corresponds to the value when nitrogen acceptors compensate for all impurity donors in nominally undoped nanotubes. (D) As m increases, $TiO_2$ converts to p-type and resistivity begins to decrease as a result of acceptor holes. This is the first demonstration of p-type $TiO_2$ nanotubes, and such a pronounced n- to p-type conductivity in semiconductor nanostructure. The carrier concentrations for n- and p-type carriers, and resulting electron and hole mobilities respectively, are shown in this figure.

Figure 39:
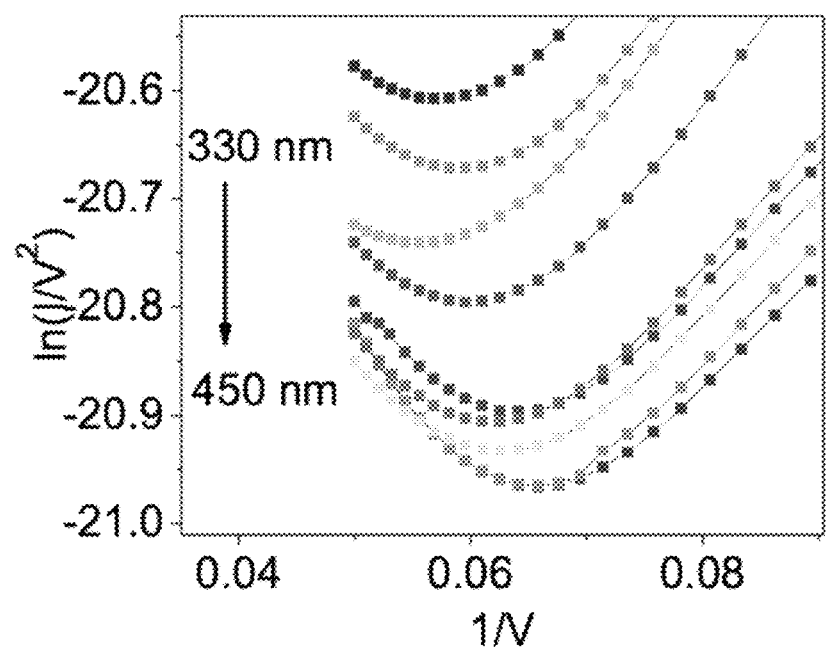

FIG. 39. Fowler-Nordheim $(I/V^2)$ vs $1/V$ plot for Cu doped $TiO_2$ nanotubes when irradiated with different monochromatic light wavelength ranging from 330 nm to 450 nm. We plotted $V*\ln(I/V^2*P*Abs)$ as a function of photon energy hv, where P is the power of incident light, and Abs is absorption coefficient, (see FIG. 18B).

Figure 40:
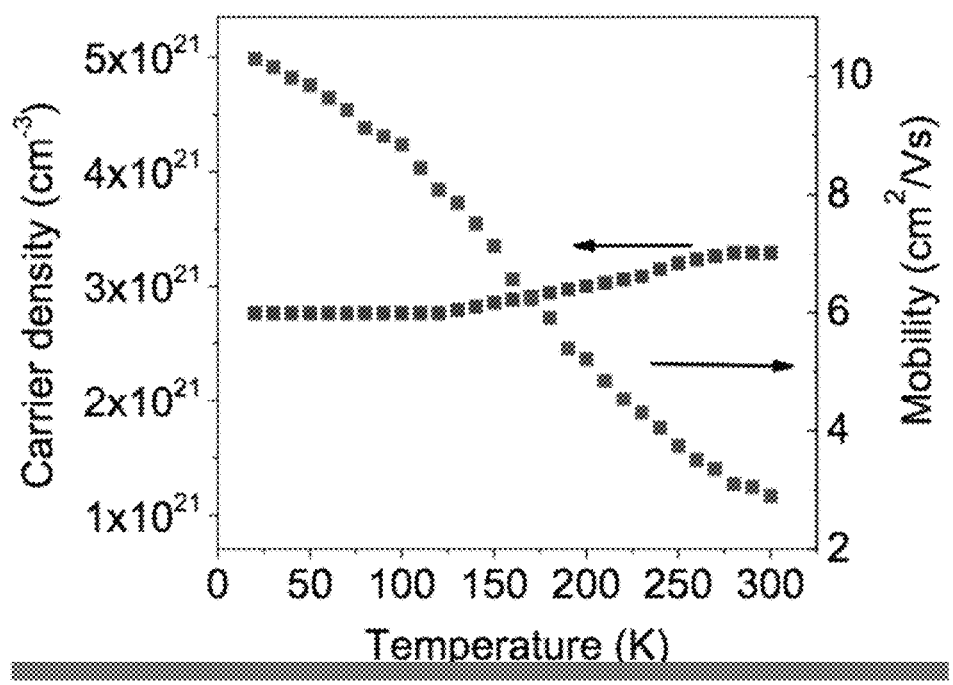

FIG. 40. Resistivity and mobility of Nb-doped samples as a function of temperature. The results show that carrier concentration determined from the plot ln(I) vs V (Equation 1 in the paper) was found to be $3\times10^{21}$ cm$^{-3}$ and slightly reduced to $2.8\times10^{21}$ cm$^{-3}$ as the temperature decreased to 300 K to 20 K. The mobility μ (calculated using p and n values and using formula 1/pen) was found to be 2.9 cm$^2$/Vs, which increased to 10.29 when temperature was decreased to 20 K.

Figure 41:
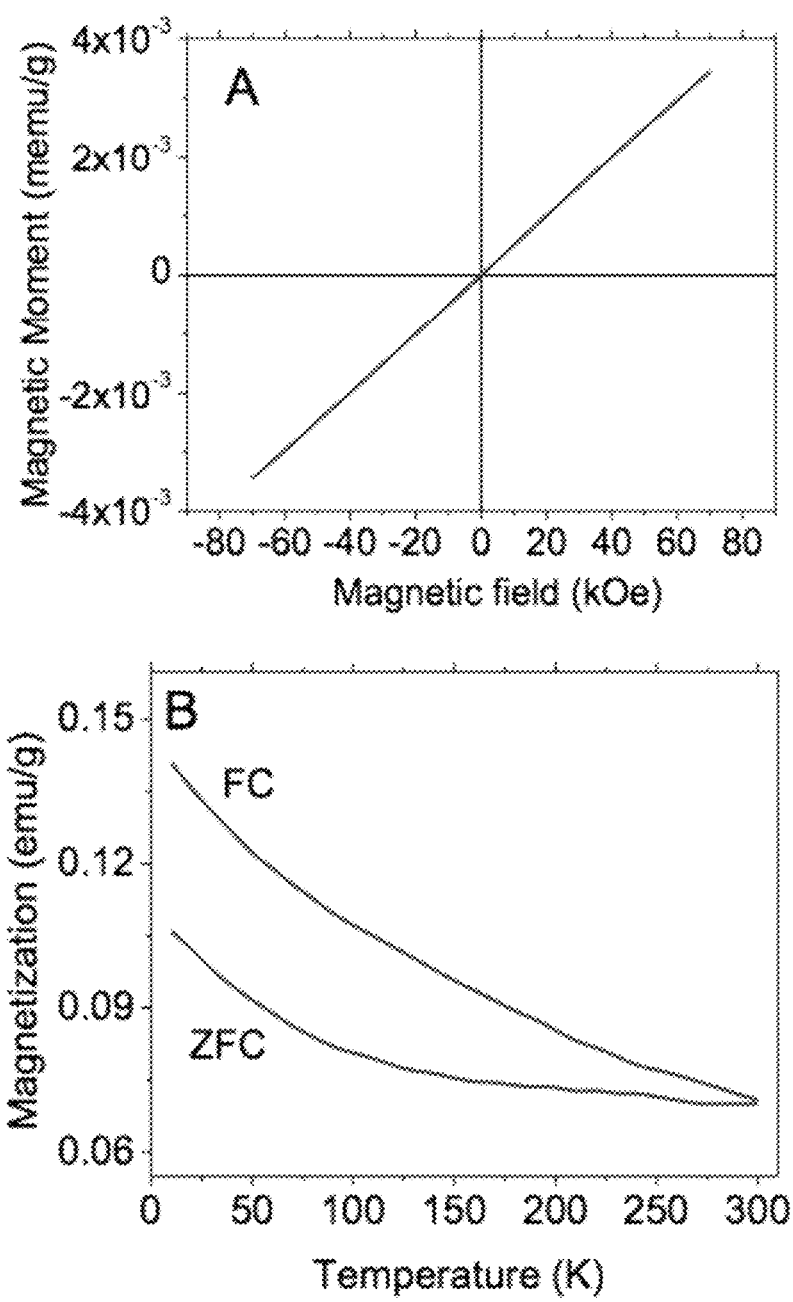

FIGS. 41A-B. A) Magnetization—magnetic field loop for undoped $TiO_2$ nanotube samples measured using SQUID. B) presents zero-field cooled (ZFC) and field cooled (FC) temperature dependent magnetization curves for Fe-doped sample.

Figure 42:
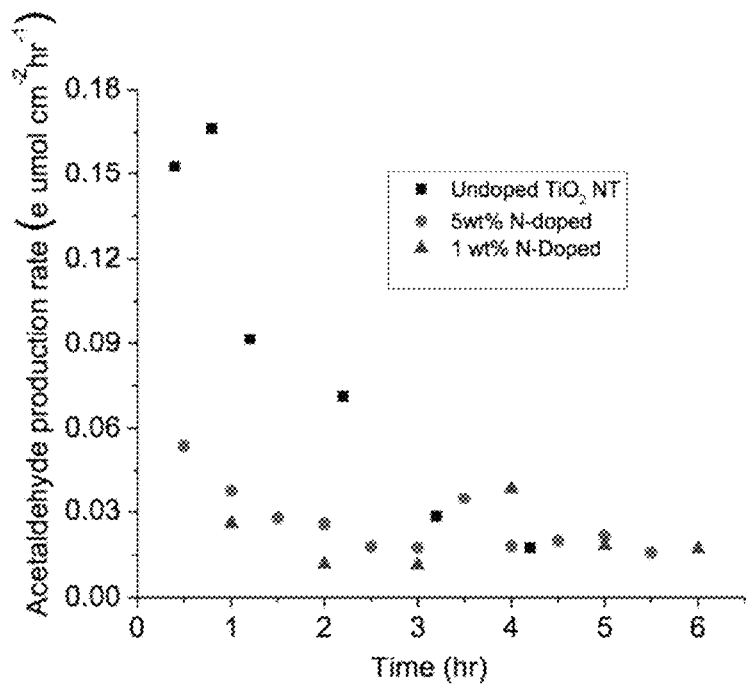

FIG. 42. Stability of undoped and nitrogen doped-$TiO_2$ NT catalyst. Undoped NT's show strong drop in catalytic activity, for $CO_2$—$H_2O$ reduction (artificial photosynthesis), with time. However, nitrogen doped nanotubes show stable photocatalytic yield of selective (FIG. 19C) high-value products, on illumination with simulated solar irradiation (AM1.5 spectrum).

Figure 43:
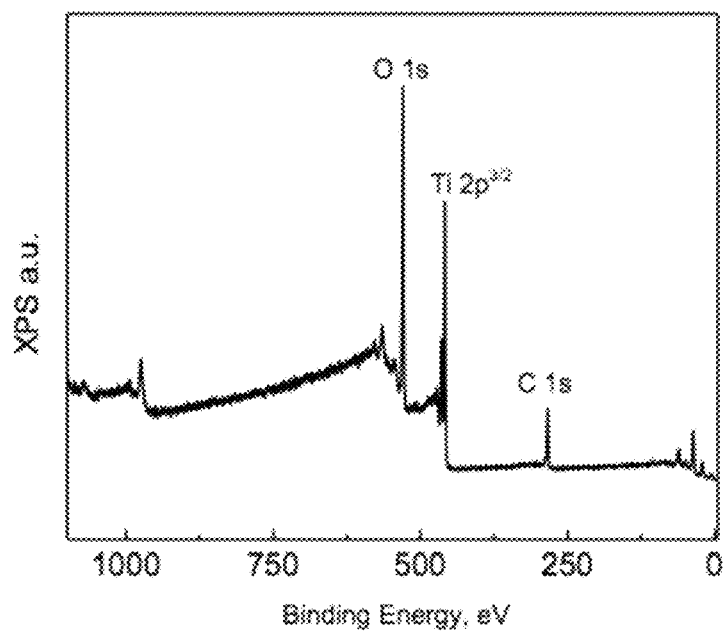

FIG. 43. XPS spectrum obtained for $TiO_2$.

Figure 44A:
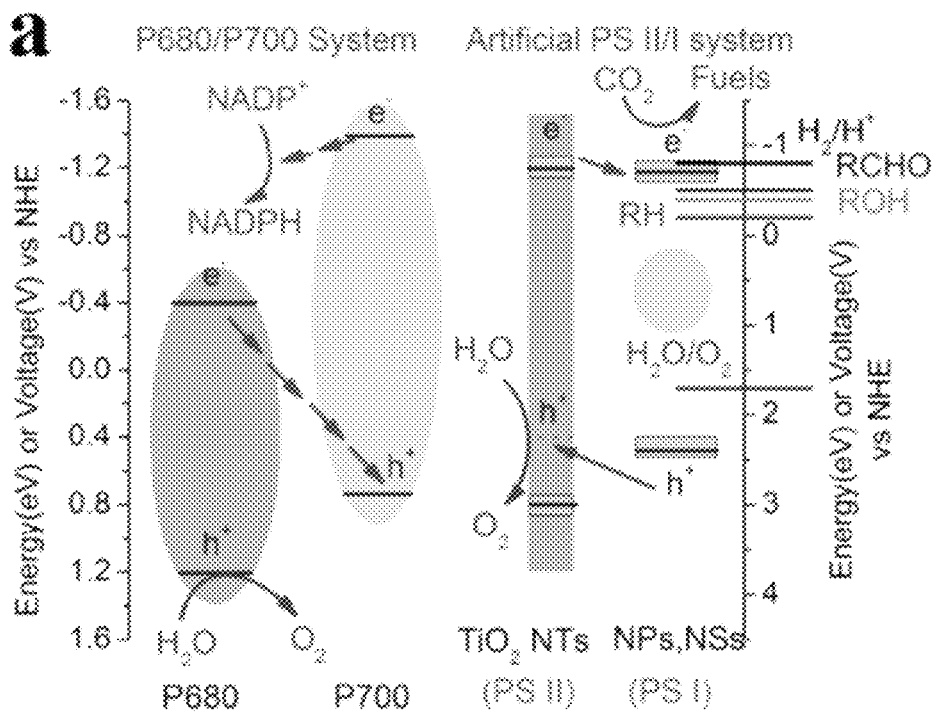
Figure 44B:
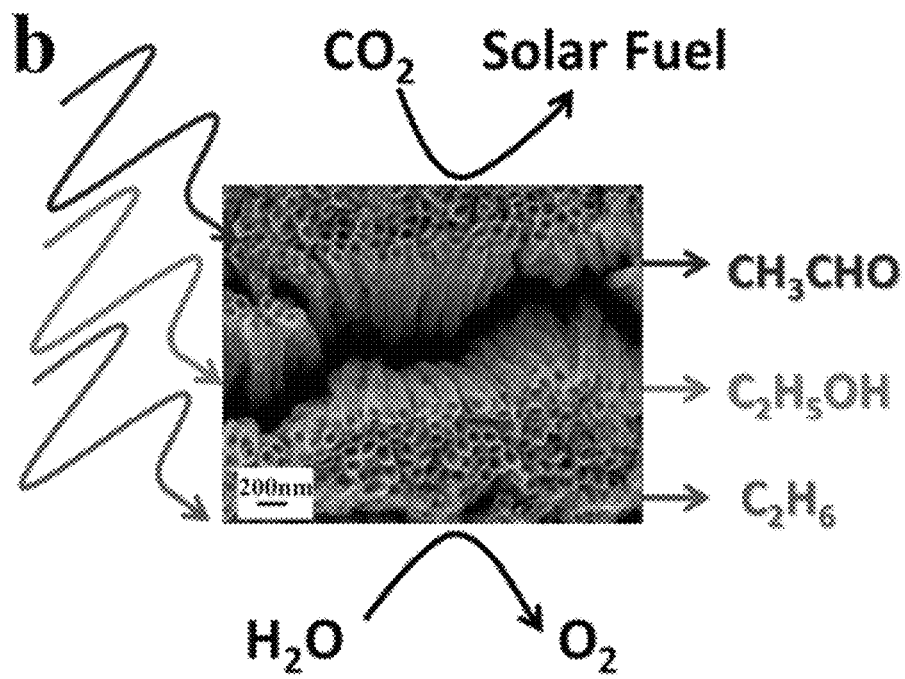

FIGS. 44A-B. (a) Schematic showing photosystem I and II in photosynthesis in plant leafs (left), and artificial photosystem I and II to carry out selective redox reactions (right), using molecule-like quantum confined states of nanoscaled semiconductors. (b) SEM image of $TiO_2$ NTs showing how different bandgap nanostructures (CdS, $MoS_2$, and CIS) can mediate tandem photocatalysis by absorbing different colors of light from the solar spectrum, and mediating $CO_2$—$H_2O$ redox to yield acetaldehyde, ethanol, and ethane selectively.

Figure 45A:
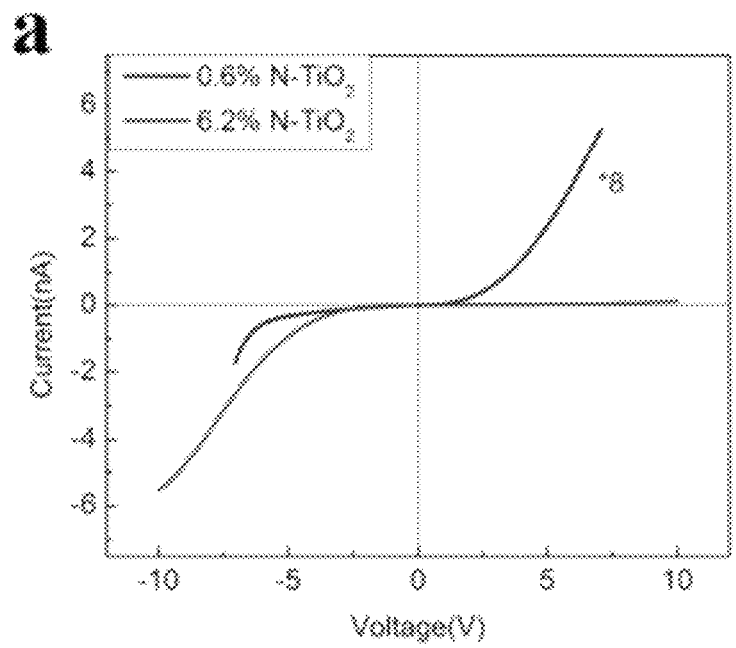
Figure 45B:
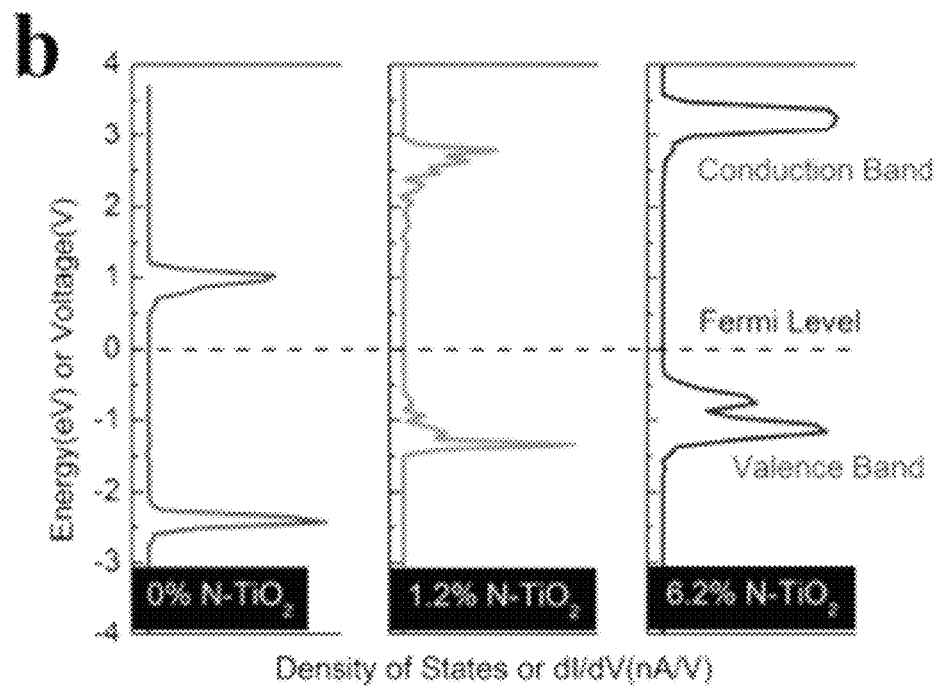
Figure 45C:
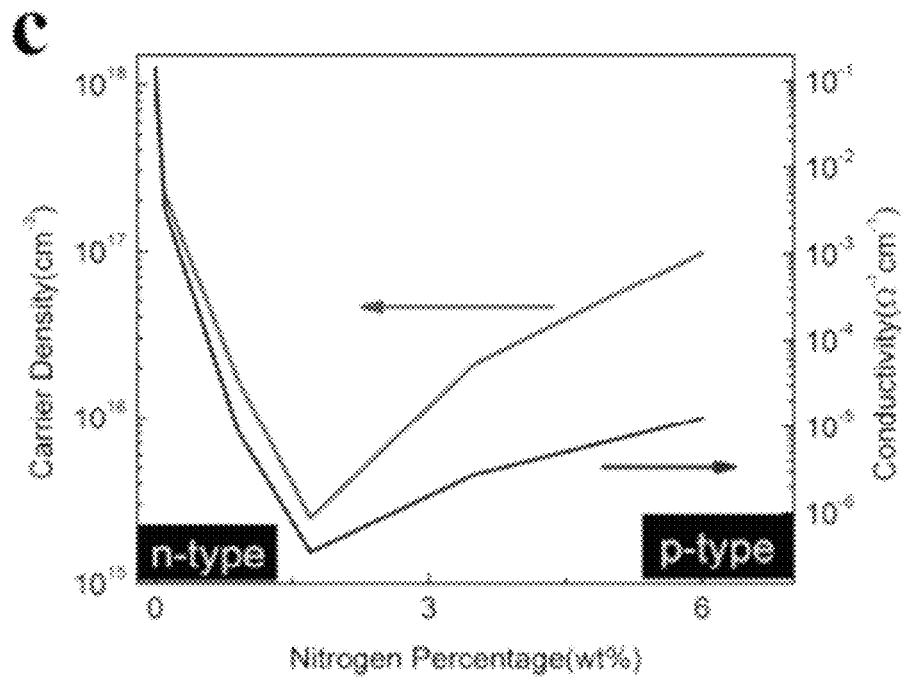

FIGS. 45A-C. (a) Single nanotube current-voltage spectrum (I-V) showing transition from n-type behavior (blue curve) to p-type conduction (red curve), as the nitrogen dopant concentration increases. (b) STS measurements of electronic DOS, where the FL of the Pt—Ir tip (0 V) tracks the FL of the semiconductor with increased doping. Proximity of the FL with conduction band (positive value peak) shows n-type behavior of the nominally undoped NTs, whereas p-type behavior is seen when the FL is closer to the VB in 6.2 wt % nitrogen dopant. (c) Carrier density (red curve) and charge conductivity (blue curve) as the nanotubes switch from n- to p-type conduction on increasing the doping with nitrogen.

FIGS. 46A-F. Optical absorption and photoluminescence spectra for (a) CIS nanocrystals; (b) $MoS_2$ nanosheets; (d) CdS nanocrystals. (c) Between two excitons in $MoS_2$ nanosheets (1.8 and 2.4 eV), the electron level of higher energy exciton matches the reduction potential of alcohol, as shown using measured electronic DOS. (e) Measured electronic DOS for different undoped $TiO_2$ NTs and CIS, $MoS_2$ and CdS semiconductor nanostructures. The alignment of respective quantum-confined energy states in these semiconductors (CIS, $MoS_2$ and CdS) matches the reduction potentials of alkane (dotted red line), alcohol (dotted green line), and aldehyde (dotted blue line) from $CO_2$, respectively. (f) Electronic DOS for different doped $TiO_2$ NTs, along with the position of FL (orange line), showing alignment with different redox potentials for photocatalyzed $CO_2$—$H_2O$ reaction.

Figure 47A:
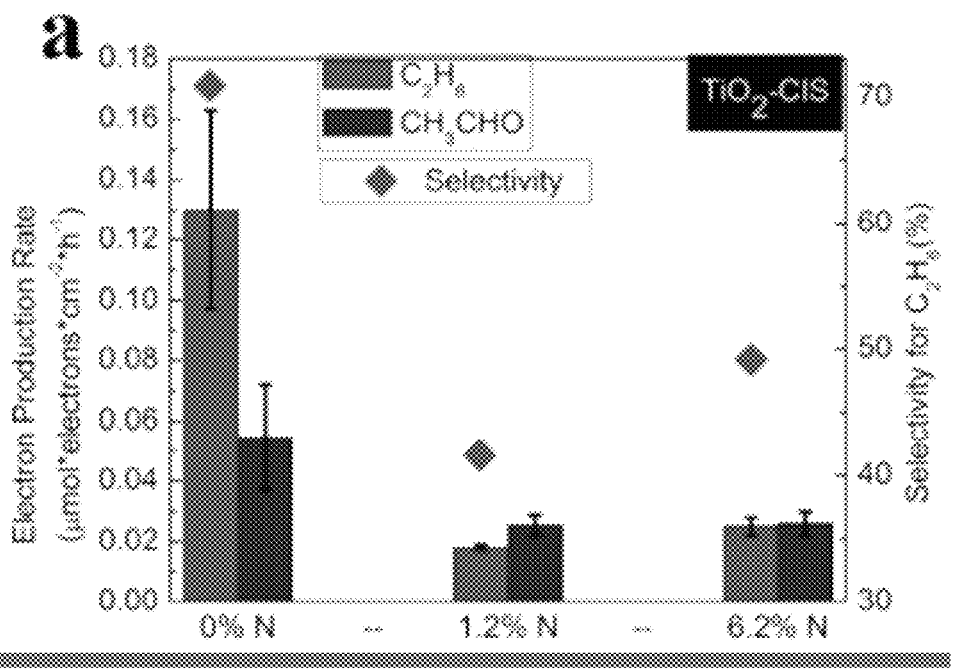
Figure 47B:
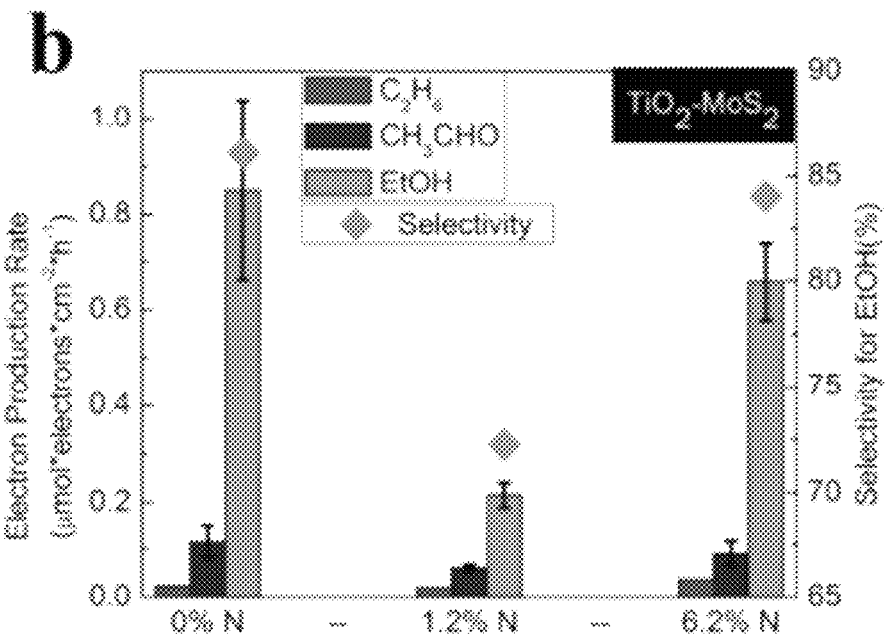
Figure 47C:
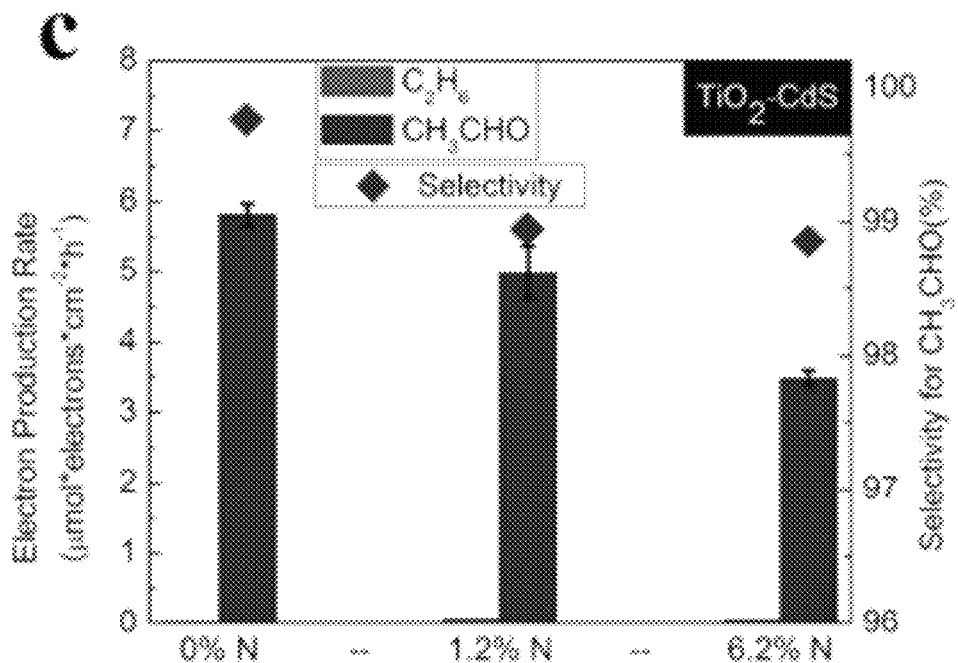

FIGS. 47A-C. Photocatalytic yields for different catalytic products (normalized as number of electron moles required for one mole of the product to compare different multielectron reduction reactions) for the $CO_2$—$H_2O$ redox reaction. The red bars represent the catalytic rates for ethane, green bars represent ethanol, and blue bars represent production rate for acetaldehyde using different artificial photosystems. (a) CIS nanocrystals and $TiO_2$ NTs with 0 wt % nitogen dopant (nominally undoped, n-type), 1.2 wt % nitrogen (close to intrinsic), and 6.2 wt % nitrogen (p-type). The red symbols represent the selectivity of this photosystem (selectivity shown on the right axis) for ethane as a solar fuel. (b)

MoS₂ 2D nanosheets with TiO₂ NTs with varying nitrogen doping. The green symbols represent the selectivity of this photosystem (selectivity shown on the right axis) for ethanol as a solar fuel. (c) CdS nanocrystals attached to TiO₂ NTs, with varying nitrogen doping. The blue symbols represent the selectivity of this photosystem (selectivity shown on the right axis) for acetaldehyde as a solar fuel.

Figure 48A:
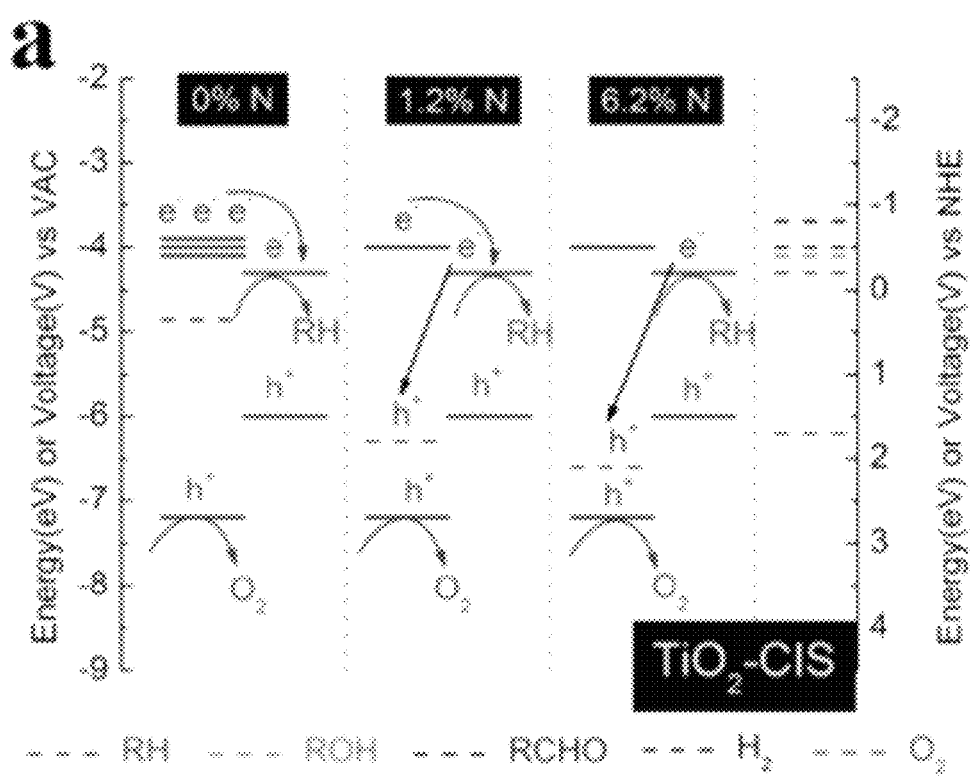
Figure 48B:
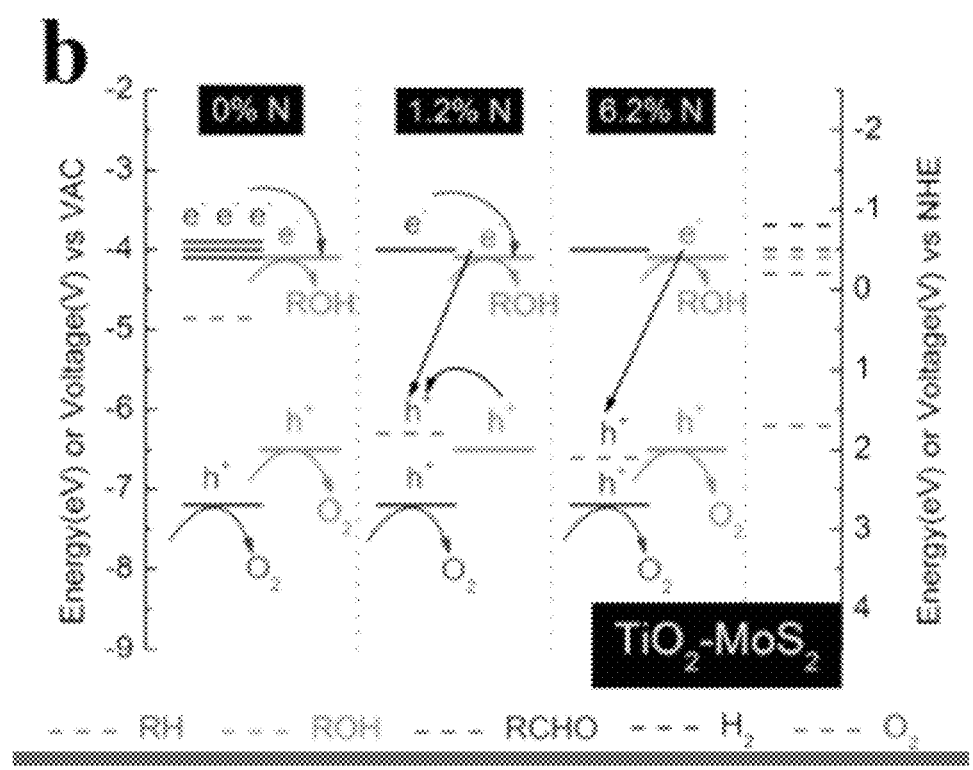
Figure 48C:
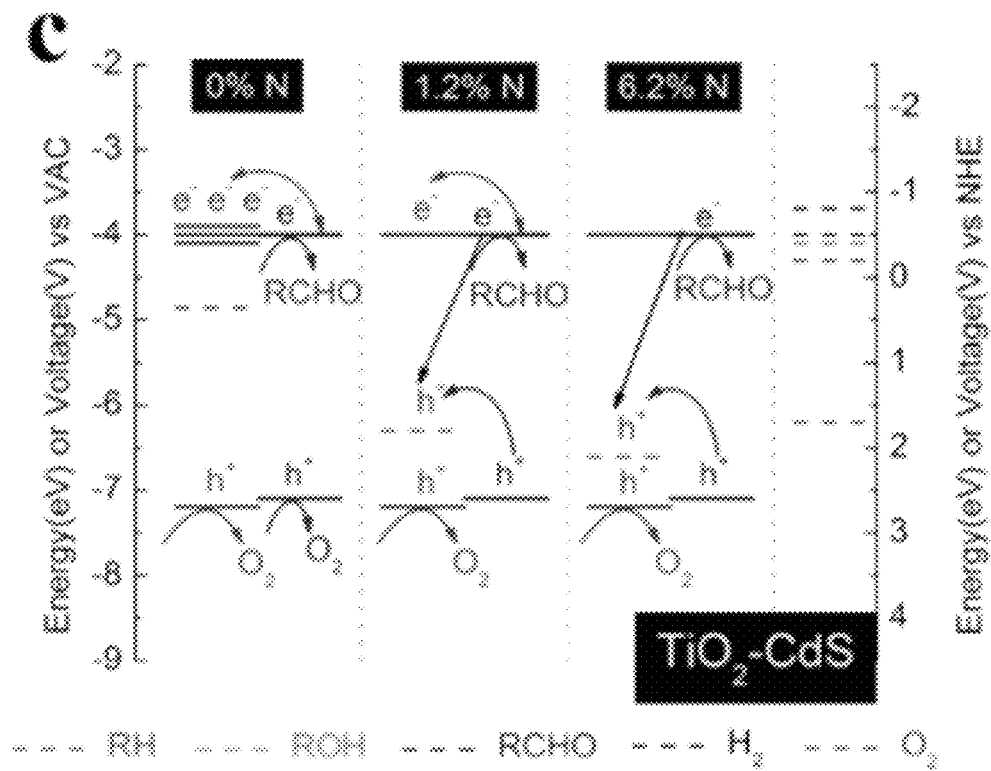

FIGS. 48A-C. Schematic of the respective photosystems (a) TiO₂ NTs-CIS nanocrystals; (b) TiO₂ NTs-MoS₂ 2D nanosheets; and (c) TiO₂ NTs-CdS nanocrystals, with varying nitrogen doping. The change in TiO₂ NT electronic behavior (from n- to p-type as nitrogen doping increases from 0 to 6.2 wt %) results in change in photophysics of $CO_2$—$H_2O$ redox reactions, and resulting changes into photocatalytic activity.

Figure 49:
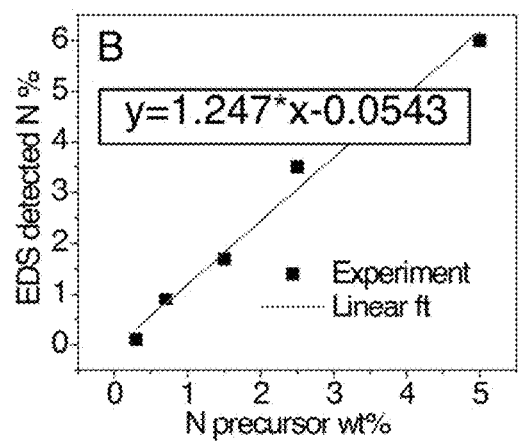

FIG. 49. Energy-dispersive X-ray spectroscopy analysis for the doping percentage of nitrogen with the weight percentage of nitrogen precursor (Hexamethylenetetramine) added in the ethylene glycol electrolyte, showing the nearly linear relationship between doping amount and precursor amount.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding the methods disclosed, the order of the steps presented is exemplary in nature, and thus, the order of the steps can be different in various embodiments. Except in the examples, or where otherwise expressly indicated, all numerical quantities in this description, including amounts of material or conditions of reaction and/or use, are to be understood as modified by the word "about" in describing the broadest scope of the technology.

Photocatalyst for Carbon Dioxide-Water Reduction

Titanium dioxide ($TiO_2$) has been extensively studied for several photocatalysis, photoelectrochemical, and catalytic reactions. There have been several experimental and theoretical investigations into modified $TiO_2$ semiconductors for enhancing light absorption or improving adsorption of reactant species. Since chemical modification of Fermi-level (FL) in semiconductor nanoparticles can have important consequences on recombination dynamics of photogenerated charges and density of electronic states which participate in charge transfer for photoreduction of adsorbed species, we carried out careful photophysical studies on unmodified (FIGS. 1B, 1C) and modified $TiO_2$ semiconductor nanoparticles. The energetic position of these states can affect the reduction potential (FIG. 1D) and hence likely product of simultaneous reduction of $CO_2$-water (because simultaneous or synergistic reduction of $CO_2$-water does not require a large overpotential 1.5-1.7 eV, when compared to $CO_2$ reduction without proton assistance):

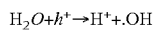

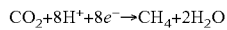

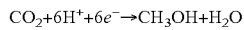

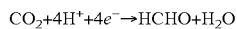

Figure 1C:
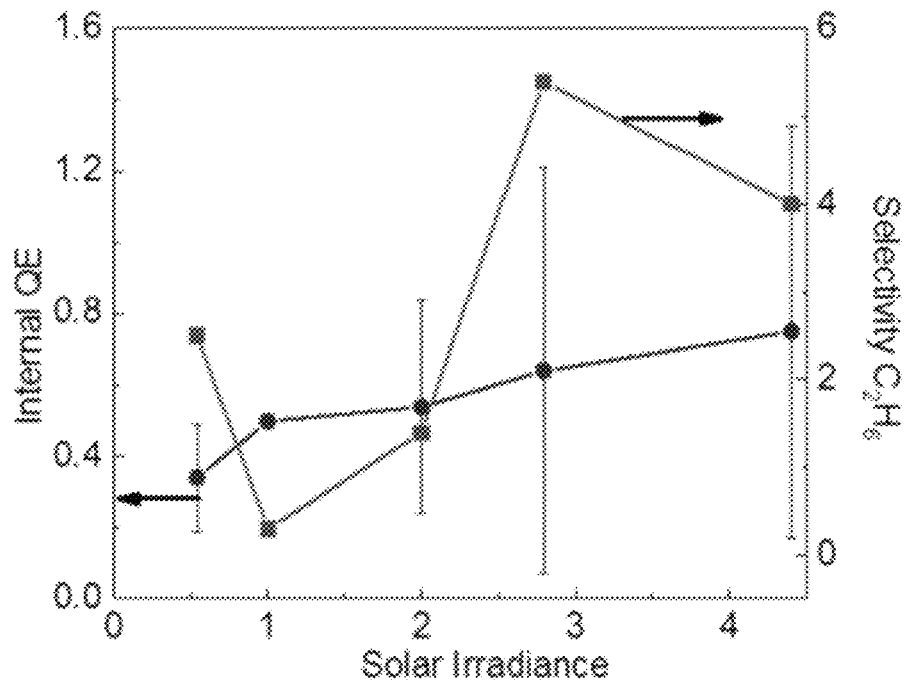
Figure 6:
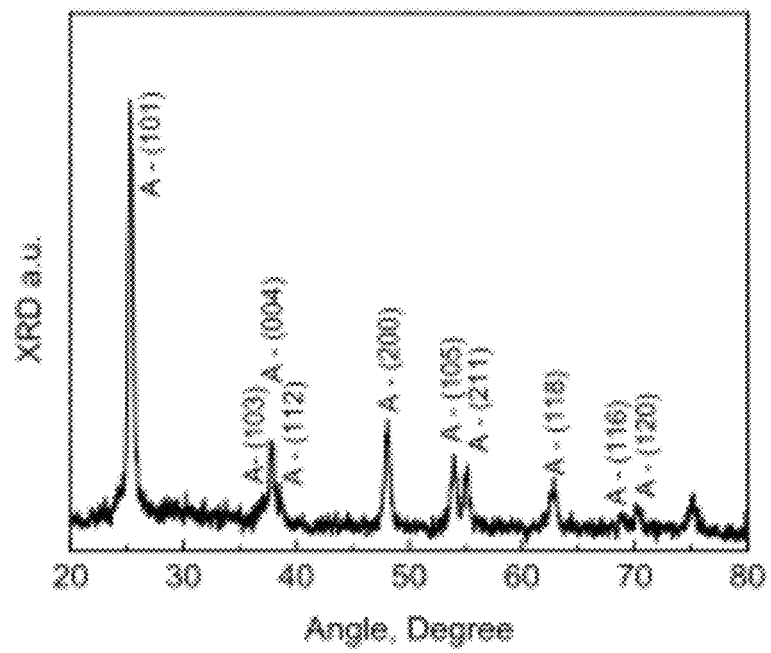
FIG. 6 depicts X-ray diffraction (XRD) patterns of $TiO_2$ nanoparticles.

We used correlated STM and Scanning Tunneling Spectroscopy (STS) for measurement of single nanoparticle electronic density of states. Unmodified $TiO_2$ nanoparticles demonstrated low catalytic rates for reducing $CO_2$-water under simulated AM1.5 illumination (1 Sun), and very low selectivity towards specific solar fuels resulting in a mixture of alkanes, aldehydes and alcohols (FIGS. 1B, 1C). However, presence of some defect states in $TiO_2$ nanoparticles ~0.5-1 eV below the conduction band (FIG. 1D) accelerated the yield of $CO_2$-water reduction reaction (FIGS. 1B, 1C). These defect states are likely electron traps since they are energetically closer to the conduction band (~0.5-1 eV) than valence band (~2.2-2.7 eV, FIG. 1D). Therefore, multiphonon emission leading to relaxation of photogenerated charges in these sub-bandgap states supports their role as electron traps. While adsorption of oxygen (or $CO_2$ here) is the rate limiting step in photocatalytic reactions and oxygen vacancies with similar energies (~0.5-1 eV below conduction band) have been predicted to catalyze the reaction, we have demonstrated here that photogenerated electron trapping can also lead to similar adsorption of reactant species. We also studied modified $TiO_2$ nanoparticles treated with hydrogen which leads to an increase in density of trap states below the conduction band (FIG. 6). This can likely explain the improved photocatalytic activity of "black-$TiO_2$" reported in other investigations, and other $TiO_2$ modifications leading to visible light absorption and improved catalytic activity in $TiO_2$ nanostructures. Therefore, careful three-dimensional mapping of electronic-DOS in $TiO_2$ nanoparticles (FIG. 1E) helped us in identifying electronic states responsible for accelerated photocatalytic yields for $CO_2$—$H_2O$ reaction.

Figure 1D:
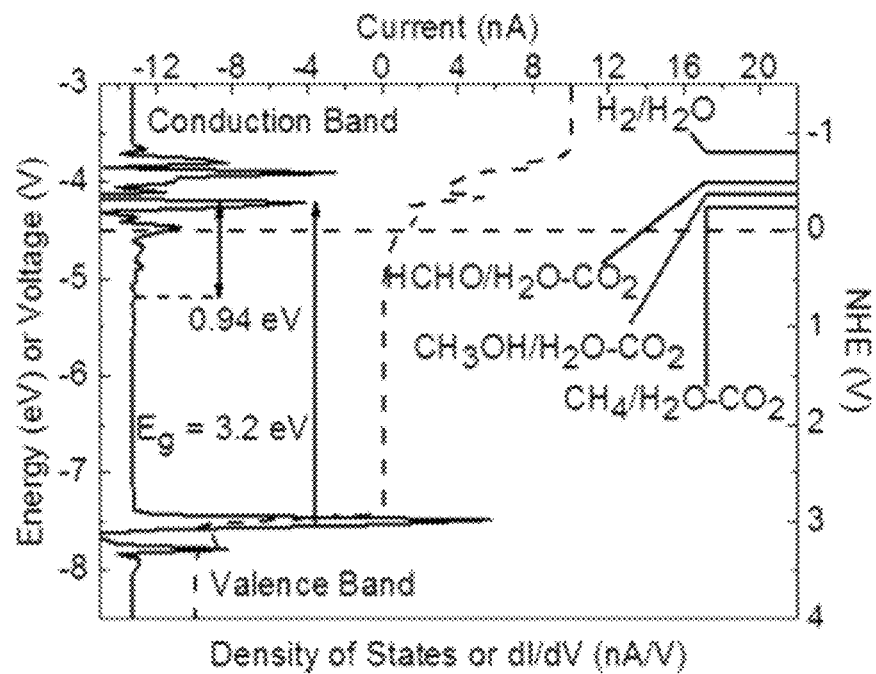
Figure 1E:
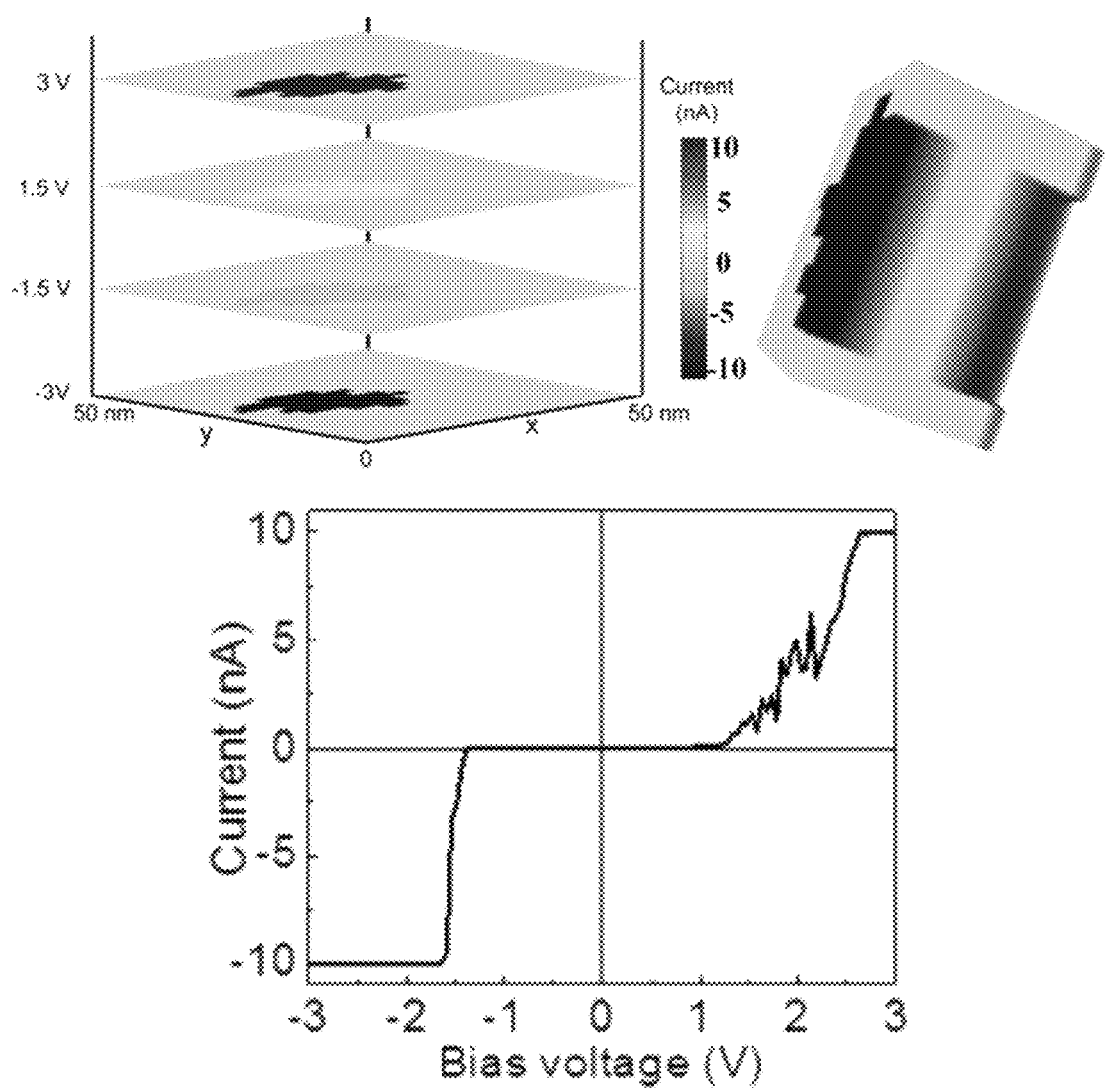
Figure 2A:
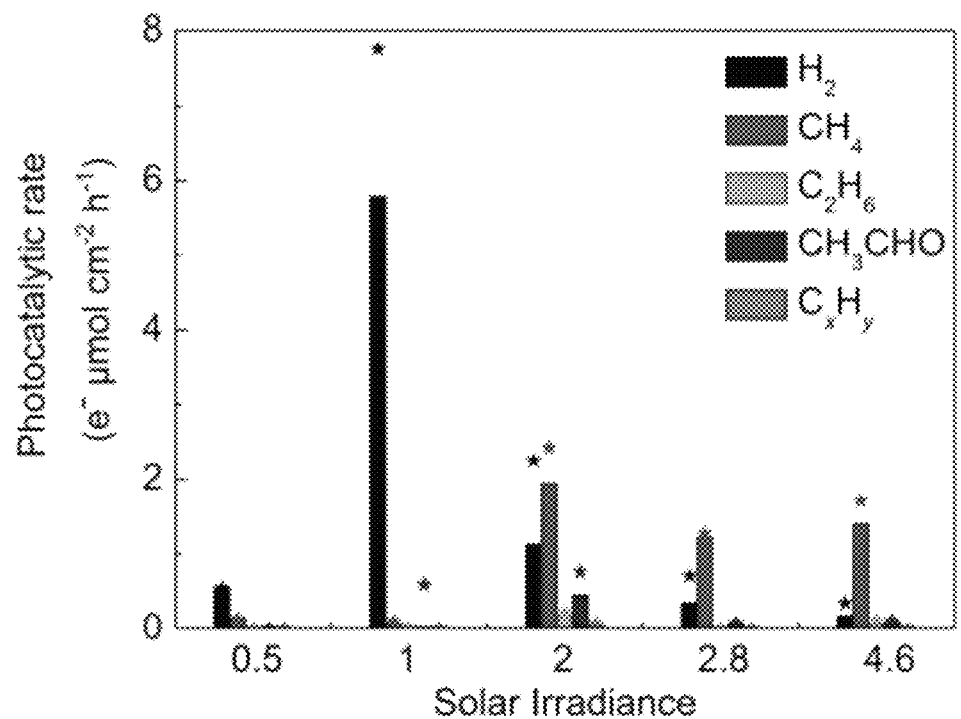
Figure 2B:
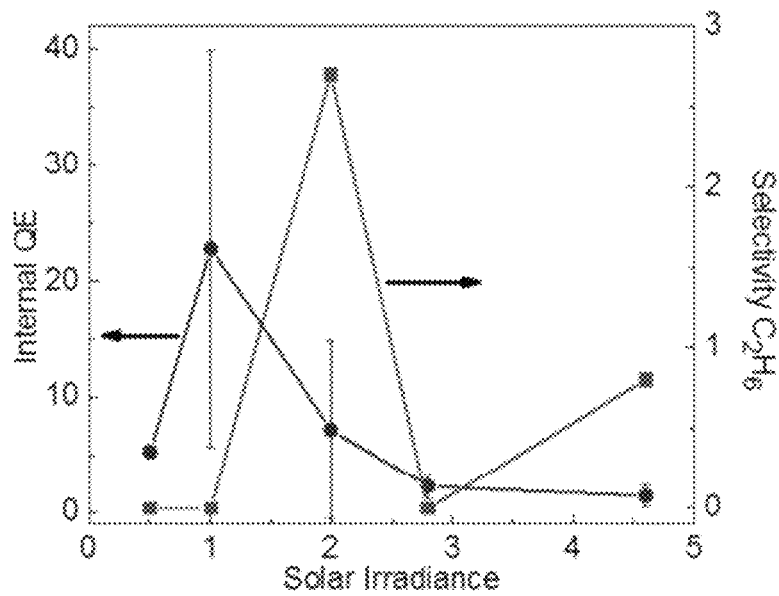
Figure 2C:
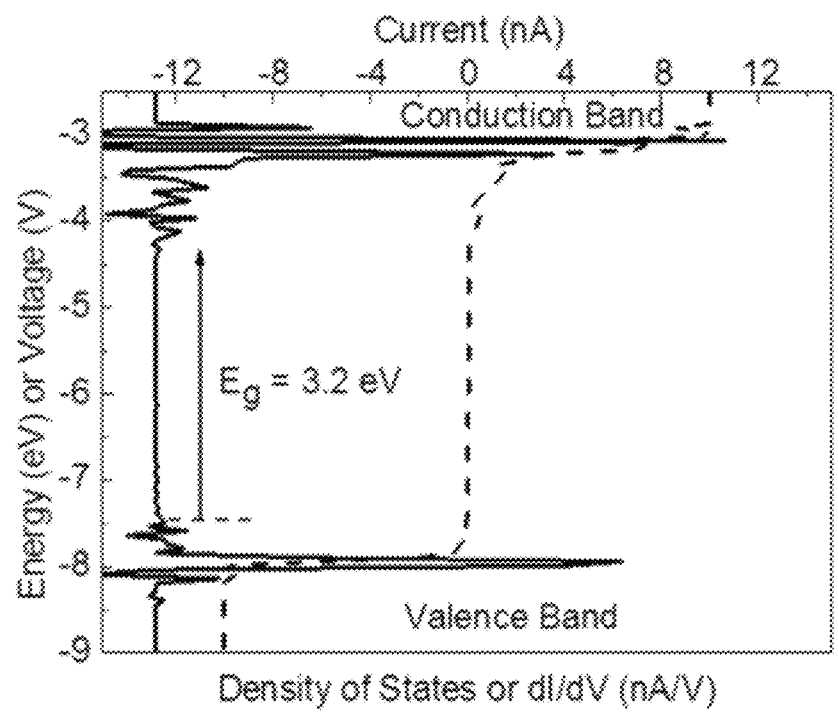
Figure 2D:
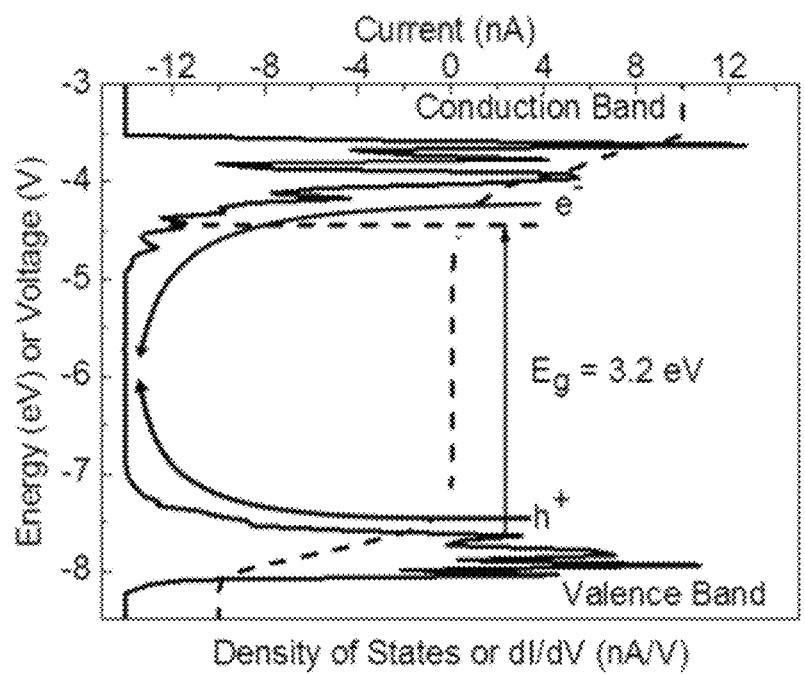

Chemical doping of nanoparticles can be used to selectively tune the FL and introduce energetic states within the bandgap of a semiconductor. To utilize this, we introduced some well-studied metal dopants in $TiO_2$ semiconductor to understand their role in photocatalysis. We first introduced varying amounts of platinum (Pt) dopant in $TiO_2$ to optimize the Pt loading and obtain highest catalytic rates for solar fuel production. While there has been reported variability on amount of Pt metal doping to obtain highest photocatalytic rates, we obtained the highest yield (23.1%, FIGS. 2A, 2B) for 1 wt % (percentage by weight) Pt under 1 Sun (AM1.5) simulated irradiation. On careful investigation of the effect of metal doping on energetic states, we did not observe any additional states or changes in electronic DOS of 0.5 wt % Pt-doped $TiO_2$ nanoparticles, when compared to unmodified $TiO_2$ (FIG. 2C compared to FIG. 1D). However, detailed analysis of STS data on 1 wt % Pt-doped $TiO_2$ clearly revealed bandtail states within $TiO_2$ semiconductor bandgap (FIG. 2D). Since the photocatalytic activity of $CO_2$—$H_2O$ reduction was enhanced several fold due to introduction of Pt metal (FIG. 2A), it is likely caused due to an increase in adsorption of oxygen atom on Pt interface. But as we increased the photogeneration rate by increasing the light intensity to enhance the photocatalytic conversion, we saw a decrease in catalytic yields (FIG. 2B). This observation can be explained since the bandtail states extended throughout the entire Pt-doped $TiO_2$ bandgap, likely facilitating the trapping and recombination of both photogenerated electron and holes (FIG. 2D). Therefore, while the Pt dopant increases adsorption of reactant molecules enhancing the photocatalysis rates (FIG. 2A), it also increases the recombination of photogenerated electrons and holes leading to an overall reduction in observed photogenerated hydrogen yields. This kind of metal mediated enhanced recombination is not uncommon in semiconductor-metal interfaces.

Figure 3A:
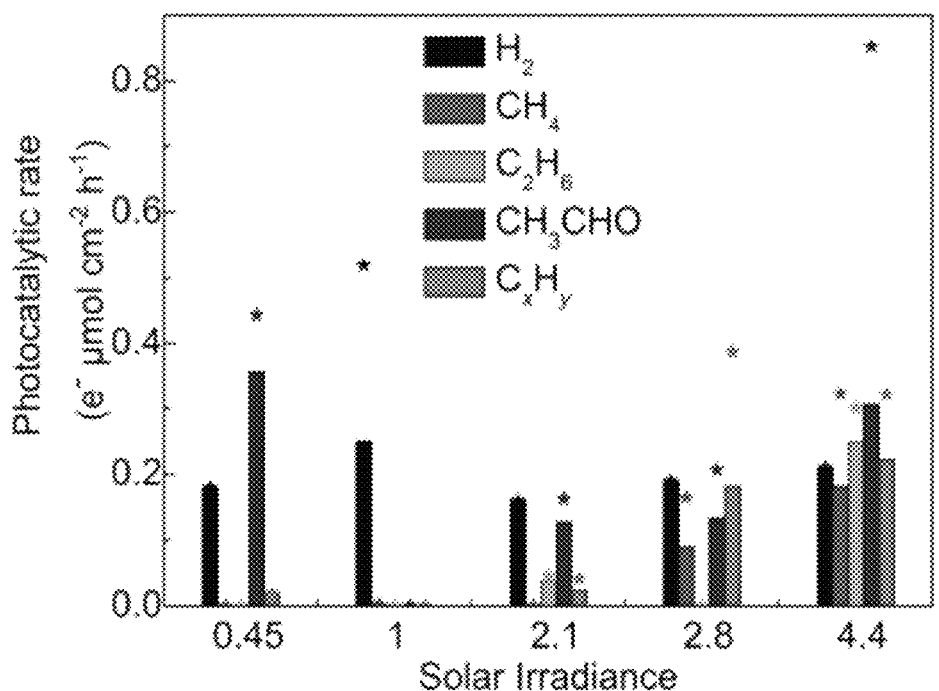
Figure 3B:
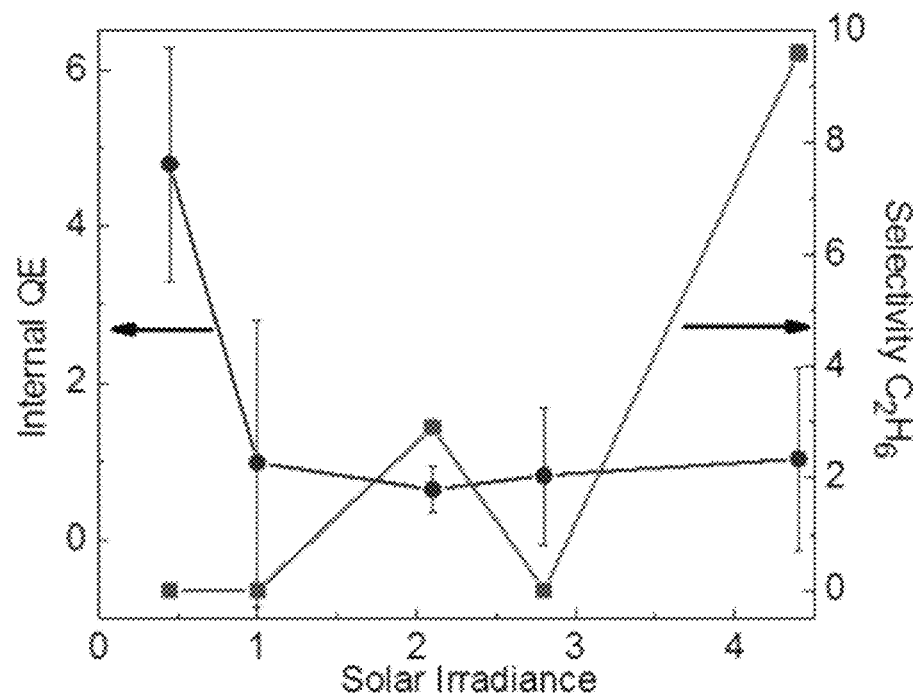
Figure 3C:
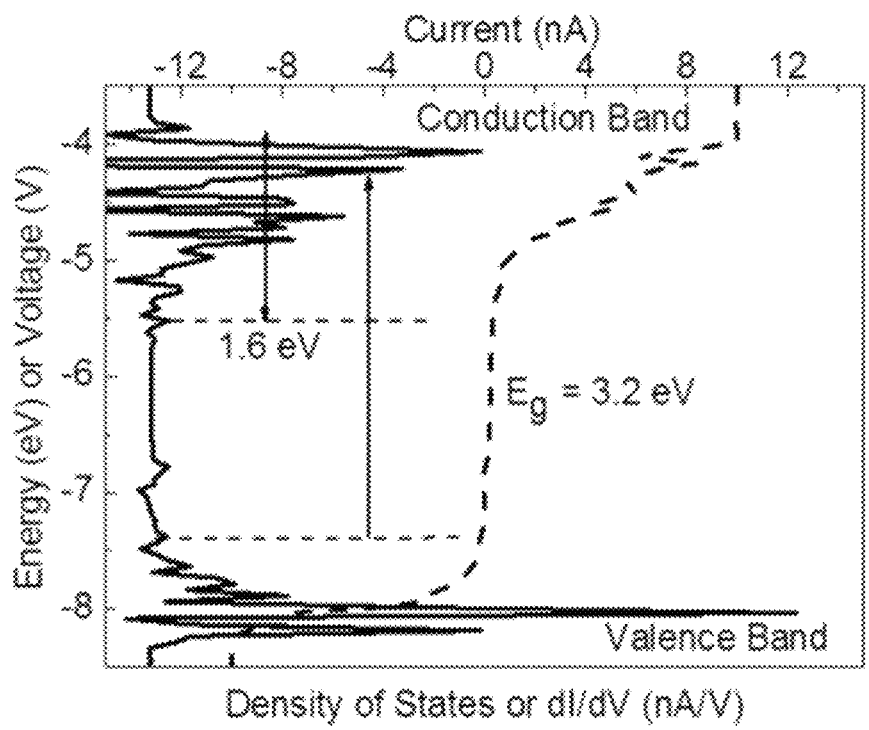
Figure 7:
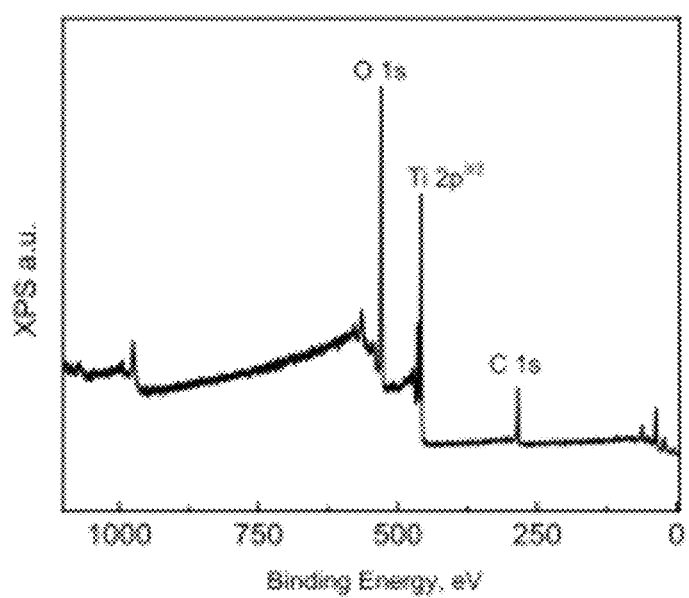
FIG. 7 depicts the X-ray photoelectron spectroscopy (XPS) of $TiO_2$ nanoparticles.

In order to prevent metal dopants from acting as recombination sites, we incorporated other inexpensive copper-based nanoparticles with staggered energy levels (FIG. 3C, FIG. 4C) to add the desired electronic energy states in $TiO_2$ composite photocatalyst and tune the energetic pathway, and hence products formed from $CO_2$-water reduction. To develop a robust and stable photocatalyst, we utilized copper-oxide nanoparticles grown on surface of $TiO_2$ as "dopants." The new composite nanoparticle has combined energetic states from $TiO_2$ nanoparticle and $Cu_{2-x}O$ ($0<x<1$) semiconductor (FIG. 3C). On illumination with AM1.5 light spectrum, there is a rapid increase in $CO_2$-water reduction as compared to unmodified $TiO_2$ photocatalyst (FIGS. 3A, 3B compared to FIGS. 1B, 1C). However, the overall incident photon to fuel conversion efficiency (FIG. 3C) is low because of variable oxidation state of copper-oxide nanoparticles. Since $Cu_2O$ (bandgap 2.1 eV) nanoparticles can be oxidized to CuO (bandgap 1.2 eV) nanoparticles, we have observed $Cu_{2-x}O$ nanoparticles with bandgap ranging from 1.87-1.37 eV (FIG. 7). This change in oxidation state of the $Cu_{2-x}O$ semiconductor gives rise to a charged defect or trap which is likely responsible for an enhancement in recombination rate of photogenerated electron and results in lower photocatalytic yields at higher photogeneration rates (FIG. 3C).

Figure 4A:
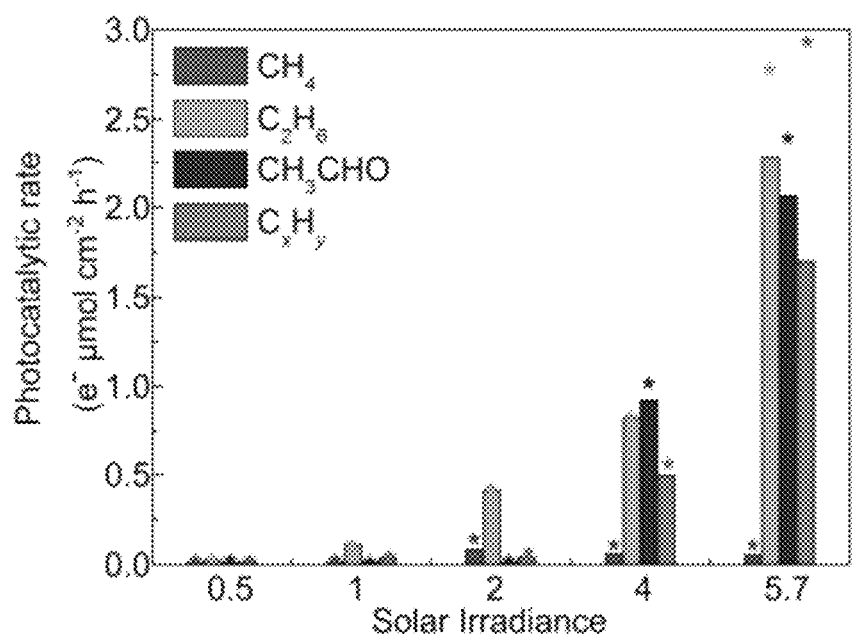
Figure 4B:
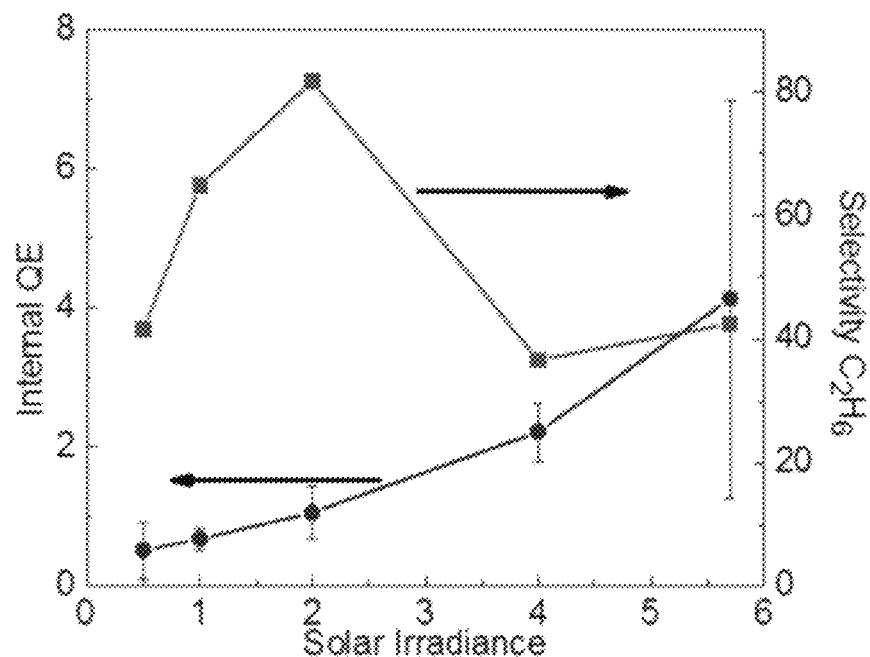
Figure 4C:
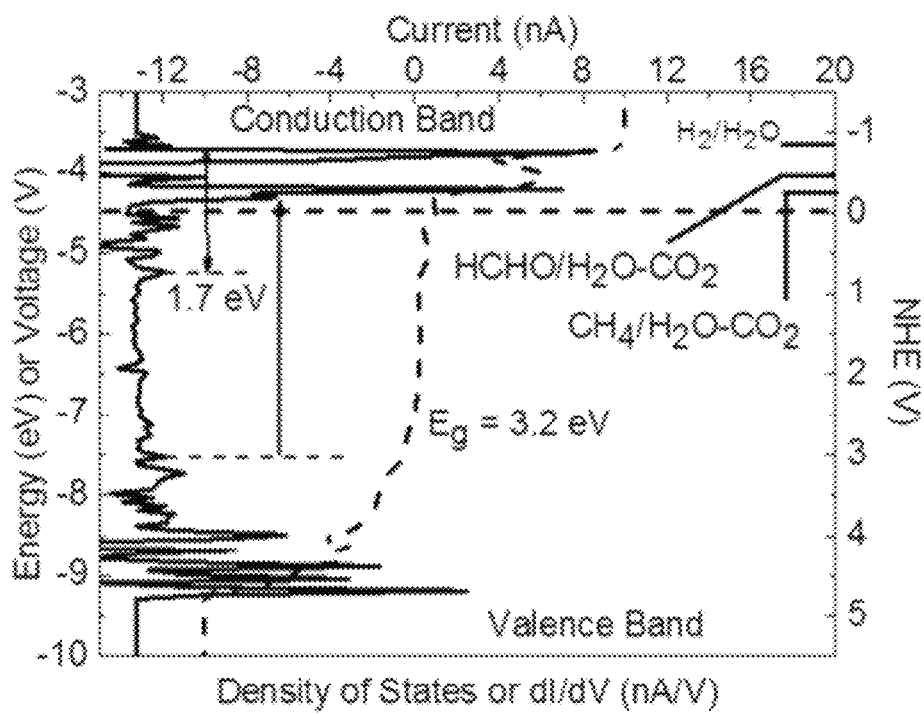

In order to produce a robust catalyst which can produce a specific product by using the energetic alignment of states, we synthesized CIS nanocrystals attached to $TiO_2$ nanoparticles. The composite nanoparticle ($TiO_2$—CIS) was analyzed for electronic DOS using single nanoparticle STS (FIG. 4C). The Fermi-level in the $TiO_2$—CIS quantum dots was expected to favor multielectron reduction to alkane hydrocarbon fuels (FIG. 4C). When we conducted photocatalytic reduction of $CO_2$-water, we observed evolution of higher hydrocarbon gases like ethane, propane etc., as shown in FIG. 4A, along with some acetaldehyde as we increased the photogeneration rate and the lower energy states get filled up (FIGS. 4A, 4B). However, the most striking result was CIS nanoparticles with bandgap ~1.7 eV demonstrated very high selectivity (>70%) for formation of ethane gas, as predicted by our study (FIG. 4B). With high selectivity, combined with yield of ~5% for this multielectron reduction process using a small concentrator (~5 Sun illumination, FIG. 4B), this new inexpensive photocatalyst shows a lot of promise for improved catalytic reduction of $CO_2$-water into selective solar fuels. Moreover, this new class of quantum dot (QD-$TiO_2$) based photocatalysts developed here allows careful tuning of electronic DOS in the composite photocatalyst by utilizing quantum confinement effect.

Figure 5A:
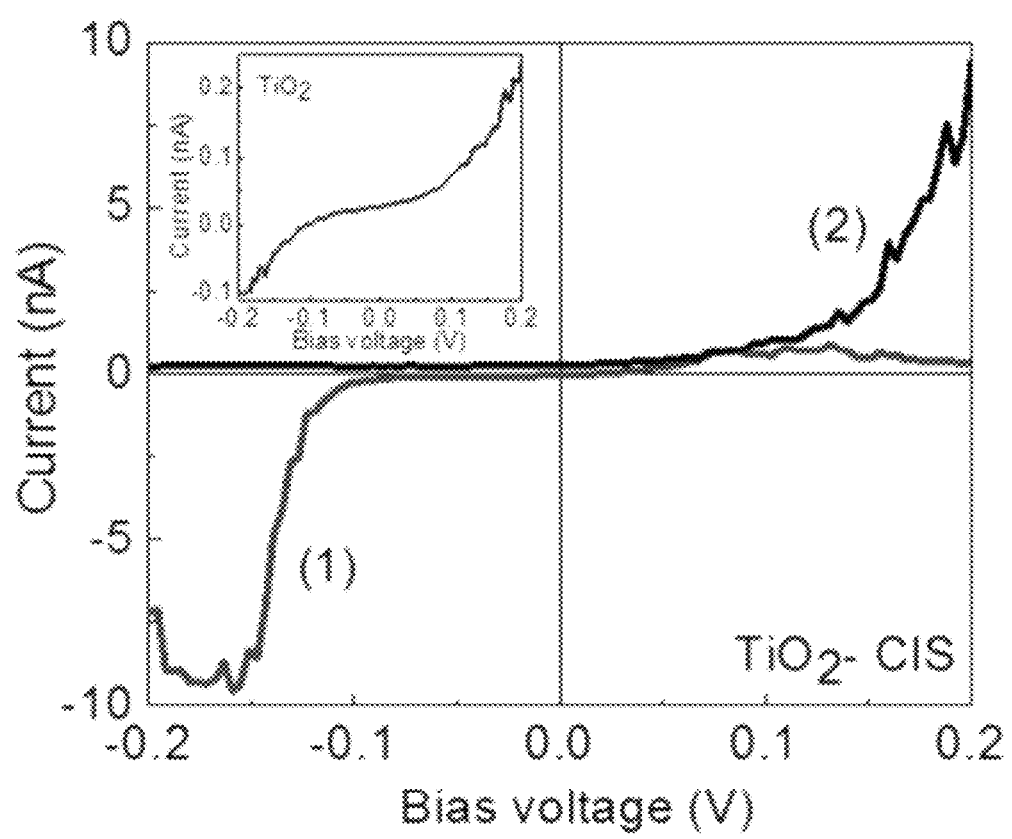
Figure 5B:
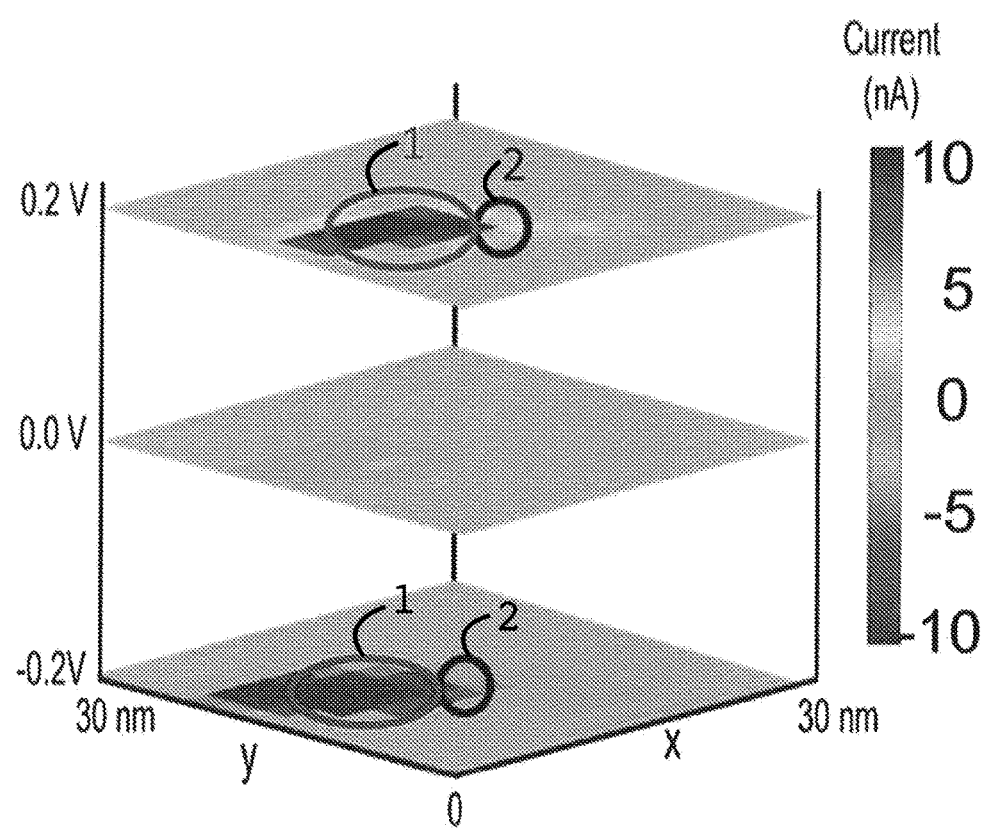
Figure 5C:
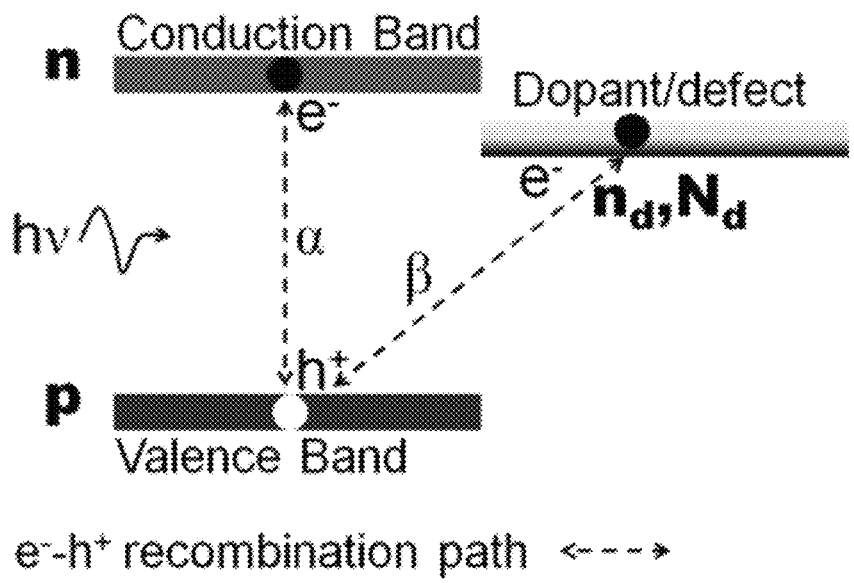

To understand the reason for high efficiency of photocatalytic yields in the new $TiO_2$—CIS nanoparticle, we utilized Current Sensing Atomic force Microscopy (CS-AFM) (FIGS. 5A, 5B). We observed clear spatial separation of electron and hole, as shown in FIGS. 5A and B. This spatial separation of photogenerated charges likely leads to longer lifetimes (due smaller overlap of electron and hole wavefunctions) and therefore higher photocatalytic yields. We developed a simple model (FIG. 5C) to understand the photophysics governing photogeneration, recombination, charge trapping, and photocatalytic reduction of adsorbed species in these dopant/defect centers on $TiO_2$ nanoparticles. Upon irradiation with light above the $TiO_2$ nanoparticle bandgap (photogeneration rate g), photogenerated electrons (n) and holes (p) are excited in the conduction and valence 'band' of the nanoparticle. A fraction of photogenerated electrons are transferred/trapped ($n_d$) in different dopant/defect centers (total number $N_d$) in these nanoparticles. Different photophysical events like recombination between photogenerated electrons and holes (rate constant α), transfer/trapping of photogenerated electrons (rate $r_t$) in dopant/defect centers and back to conduction band (rate $r_{dt}$), and recombination between electrons in dopant/defect centers and photogenerated holes (rate constant β) change the steady state concentration of electrons and hence rate of photocatalytic reduction (R=r×n, since reduction is the rate determining step). Using charge neutrality (p=n+$n_d$), and charge balance for electrons:

$$\frac{dn}{dt} = g - \alpha pn - r_t n\left(1 - \frac{n_d}{N_d}\right) + r_{dt} n_d - rn = 0 \text{ at steady state} \quad (\text{eq. 1})$$

and holes:

$$\frac{dp}{dt} = g - \alpha pn - \beta pn_d - rn \quad (\text{eq. 2})$$

we get a relationship between photogeneration rate (g) and rate of photocatalysis (R). Since the photocatalysis rate depends on rate of recombination (α, β), trapping ($r_t$, $r_{dt}$) and fraction of electrons in defects ($n_d$, compared to n), we identified four regimes for change in photocatalysis rate (r×n) with rate of photogeneration:

$$g=\alpha n(n+n_d)+\beta n_d(n+n_d)+rn \quad (\text{eq. 3})$$

In the first regime, we identified when α>>β (recombination between photogenerated electron and hole) and n>>$n_d$, g□$n^2$ and R(=r·n)□$g^{0.5}$ (bimolecular recombination) or expected square root dependence between rate of photocatalysis and photogeneration rate.

In photocatalysis mediated by $TiO_2$ nanoparticles, since traps and defects play an important role, we also modeled (β>>α, g≈β$n_d$(n+$n_d$)) trap mediated recombination. The second class of results predict when n>$n_d$ ($N_d$ is small and/or $r_t$ is slow), a linear relationship exists between photocatalytic rate (R=r×n) and incident photon rate (g≈β$n_d$n, $n_d$ is constant, unimolecular recombination, FIG. 1C observed in $TiO_2$ nanoparticles).

Figure 5D:
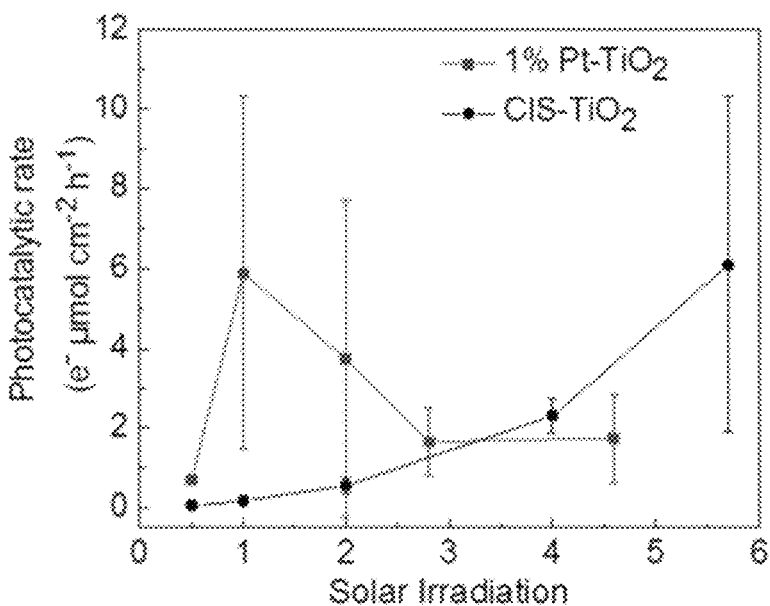

In cases when $N_d$ is large (compared to n, p) and trapping rate:

$$r_t n\left(1 - \frac{n_d}{N_d}\right) \quad (\text{eq. 4})$$

of photogenerated electrons is significant, we observed an inverse relationship between band edge photogenerated electrons (n) and trapped electrons ($n_d$□$n^{-x}$, 0<x<1) depending on trapping rates ($r_t$, $r_{dt}$), total available defects/dopants per nanoparticle ($N_d$), and the rates of recombination (α, β). In this third regime, we expect to observe a superlinear relationship between photocatalytic rate (r·n) and rate of photogeneration (g□$n^{1-x}$ or n□$g^{1/(1-x)}$). This superlinear dependence (FIGS. 4B, 5D observed in our $TiO_2$—CIS photocatalyst) implies the rate of multielectron photocatalytic reduction (R) to obtain solar fuels can be enhanced by increasing the photon flux or concentrating sunlight. This can have important implications for design of inexpensive photocatalysts by using relatively cheaper solar concentrators, than employing precious metal dopants in new photocatalyst design. However, this increase cannot occur indefinitely (FIG. 4B observed in $TiO_2$—CIS) and as the defect states get filled on increasing the rate of photogeneration (eq.

1), our model predicts the slope turns to linear or unimolecular recombination regime.

The fourth regime of results obtained from our model include cases when $n_d > n$ and hence possible decrease in multielectron photocatalytic reduction of $CO_2$—$H_2O$ can occur ($g \approx \beta n_d^2 \approx \beta n^{-2x}$) on increasing the rate of photogeneration (FIGS. 2B, 3B observed in $TiO_2$—$Cu_{2-x}O$ and $TiO_2$—Pt).

The experimental results on photocatalysis and the measurements of electronic DOS explain the observed dependence of catalytic yields and selectivity in different $TiO_2$-based photocatalysts. The insights obtained into the energetic states involved in photocatalysis led a rational design of new composite $TiO_2$—CIS catalyst with high selectivity and yields for $CO_2$-water reduction. These results, combined with our model for photocatalytic reduction explains the photophysics behind this important reaction. The model also clearly explains the observed relationship between photocatalytic rate and solar concentration (FIGS. 1C, 2B, 3B, 4B). Therefore, this new class of QD-$TiO_2$ photocatalysts developed here and the photophysics governing multielectron reduction of $CO_2$-water provide new inexpensive and selective photocatalysts.

The following methods were employed.

$TiO_2$ nanoparticles: We prepared nanometer size $TiO_2$ particles using a sol-gel method. Briefly, in a glass beaker, a mass of 14.3 g (50.3 mmol) of titanium isopropoxide ($C_{12}H_{28}O_4Ti$) was added to 94.7 g (2.05 mmol) of ethanol ($C_2H_6O$). Afterward, 3.15 g (0.25 mmol) of Pluronic F127 ($[C_3H_6O.C_2H_4O]_x$), was added and the mixture was stirred vigorously. In a separate mixture, 0.92 g (25.2-mmol) of hydrochloric acid and 13.6 g (0.76 mol) of de-ionized (D.I.) water ($H_2O$) were mixed and drop wise added into the first solution. The solution was wrapped with a paraffin paper and placed in an oven at 40° C. for 24 h. The paraffin paper was later removed and the solution was dried at 110° C. for another 24 h. The dried precipitate was then calcinated at 500° C. for 6 h to induce the crystallization of anatase $TiO_2$. Both the heating and cooling rates were ~0.3° C. $min^1$. Finally, the calcinated $TiO_2$ was used as a catalyst.

Synthesis of copper indium sulfide (CIS) nanoparticles: CIS nanoparticles were synthesized. Briefly, oleylamine capped CIS nanocrystals were prepared by degassing (pulling vacuum for 30 minutes, followed by backfill with nitrogen using a Schlenk line) a mixture of 1 mmol copper (II) acetylacetonate, 2 mmol of oleylamine, and 1 mmol indium (III) acetate in 7 ml of dichlorobenzene in a round bottom reaction flask, followed by heating to 110° C. under nitrogen flow. In another flask, elemental sulfur (2 mmol) was dissolved in dicholorobenzene by heating at 60° C. under nitrogen, and injected into the reaction flask. The reaction mixture was heated to 180° C. under nitrogen flow and reacted for 40 minutes. At the end of the reaction, the reaction mixture is cooled to room temperature, and the nanocrystals colloid is purified by precipitation using addition of ethanol followed by centrifugation (5000 rpm), and re-dispersed in chloroform. This cleaning step is repeated twice to obtain clean and stable CIS nanocrystal dispersion coated with oleylamine. Dodecanthiol (DDT) coated CIS nanocrystals are prepared by one pot synthesis by mixing 1 mmol indium acetate, 1mmol copper (I) iodide and 10 ml DDT, as sulfur source, ligand, and solvent, in a three-neck reaction flask. The mixture was degassed on a Schlenk line, and heated under nitrogen flow to 90° C. for 30 minutes. Following this, the reaction mixture is heated to 230° C. for 40 minutes to form CIS nanocrystals. The reaction mixture is then cooled down to room temperature and cleaned (using ethanol precipitation followed by redispersing in chloroform) three times to obtain clear nanocrystal dispersion coated with DDT.

Ligand exchange of CIS nanoparticles: Two-milliliters of CIS nanoparticles in chloroform with a concentration 10-15 mg $mL^{-1}$ was placed in a 20 mL vial, followed by the addition of 2 mL of D.I. water, 7 drops of a NaOH solution (pH=12), 4 mL of mercaptoethanol and 5 mL of ethanol (200 proof). The solution was stirred and mildly heated (solution must not boil) for 3 hours. The final solution was then precipitated at 5000 RPM for 10 minutes, and the precipitate was re-suspended with methanol or ethanol.

Synthesis of $TiO_2$—CIS nanoparticles: Phase-transferred CIS nanoparticles (coated with mercaptoethanol) were suspended in 1 ml of methanol (concentration ~10 mg/mL). 50 mg $TiO_2$ nanoparticles were placed in a 20 mL vial on a hot plate at low heat and the CIS colloidal solution was added. The loading of CIS nanoparticles was confirmed with STM to be 14% (which corresponds to a ratio of ~3 CIS QDs attached to 1 $TiO_2$ nanoparticle, as seen in STM and CSAFM studies).

Characterization with XRD and XPS: $TiO_2$ samples were subjected to XRD measurements using a Scintag XDS 2000 X-ray diffractometer from samples prepared by drop-casting a highly dense ethanol nanoparticle solution in onto a glass substrate. A PHI 5600 x-ray photoelectron spectrometer was used to obtain x-ray photoelectron spectra (XPS) of $TiO_2$ samples. The powder samples were pressed into pellets with a thickness of 0.7 mm and a diameter of 5.5 mm and affixed to the sample puck with carbon tape. Monochromatic Al K$\alpha$ x-rays (1486.6 eV) were used for the XPS analysis. The pass energy was 93.9 eV and the step size was 0.400 eV. An electron beam neutralizer was employed at 17.8 mA. Data was collected with Auger Scan (RBD Enterprises, Inc., Bend, Oreg.). XPS data was analyzed in CASA XPS (Casa Software Ltd, UK). Quantitative measurement of Pt, Cr and Ti in $TiO_2$ samples was performed with an ARL 3410+ inductively coupled optical emission spectrometer (ICP-OES). Samples were dried and digested in different acid solutions and concentrations were calculated from calibration curves composed of three certified standards.

Gas-phase reduction of $CO_2$ and $H_2O$: 20 to 30 mg of catalyst were deposited in a rounded glass vial cut in half with a 0.64 $cm^2$ cross sectional area. The vial was then enclosed in a 48-mL reactor and purged for 45 minutes with $CO_2$ (75 $cm^3$ $min^{-1}$) humidified in a bubbler filled with D.I. water. After purging, the reactor was closed and irradiated with 1 SUN (100 mW $cm^{-2}$) through a glass window using a solar simulator (ABET Technologies). One-milliliter samples were extracted from the reactor and injected into a gas chromatograph (GC) equipped with a thermal conductivity detector (TCD) and a flame ionization detector (FID) for measuring concentrations. Separation of the hydrocarbons was done with a Hayesep D column or with Silica-gel column. Reported data of photocatalytic rate and quantum yield were calculated based on the electron flux ($\mu$mol $cm^{-2}$ $h^{-1}$) used to form $H_2$, $CH_4$, $C_2H_6$, hydrocarbons and others.

STM and STS measurements: Scanning Tunneling Microscope images were obtained using a customized Molecular Imaging PicoScan 2500 setup (with PicoSPM II controller). An STM nosecone (N9533A series, Agilent Technologies) was used for scanning and spectroscopy using chemically etched Pt—Ir tips (80:20) purchased from Agilent Technologies, USA. The measurements were done at room temperature under atmospheric conditions. Tunneling junction parameters were set at tunneling currents ranging between 100 and 500 pA and sample bias voltage between 0.1 and 0.2V. Scan rate was set to 1 line per second and 512 points per line on scan areas of 1 $\mu m^2$. Spectroscopy measurements were obtained at a scan rate of 1 V/s with previous junction parameters. All samples were prepared by drop casting dilute solutions on a cleaned indium tin oxide (ITO) coated glass substrate.

Current sensing AFM (CSAFM) measurements: CSAFM measurements were done using modified Molecular Imaging PicoSPM II setup. The CSAFM tips used were coated in-house using thermal evaporator with 5 nm of 99.99% Cr and 15 nm of 99.99% Au, both purchased from Kurt J. Lesker Company. The silicon tips for contact mode imaging and spectroscopy were obtained from NanoDevices Inc. Contact force was set to soft contact (deflection set point between −1 and −3V). Multiple topography and current scans were taken at different bias voltage ranging from −200 to +200 mV with steps of 50 mV. The scan area was set to 1 µm² at a scan rate of 1 line per second and 512 points/line. All samples were prepared by drop casting dilute solutions on cleaned ITO coated substrate. The sample stage was modified by creating a transparent light path for illuminating the samples from the bottom. The sample placed on a transparent ITO substrate was connected using a wire attached to the ITO using conductive silver paste.

Measuring Photocatalytic Activity

Gas Chromatography i. Identification and separation. Two 14 L gas samples were bought from MATHESON TRI•GAS. Gas cylinder 1 presented a composition of 1000 ppm for each saturated hydrocarbon methane, ethane, propane, butane, pentane and hexane, and was balanced with Helium (He) gas. A second sample, also balanced with He, had a concentration of 1000 ppm of unsaturated hydrocarbons ethylene, propylene, 1-butene, 1-pentene and 1-Hexene. A gas chromatography G1540 Agilient was equipped with a 6-ft silica gel capable to separate hydrocarbons. The column unfortunately was unable to separate carbon monoxide (CO), nitrogen ($N_2$) and oxygen, nonetheless, former experiments using a 6 ft-Hayesep D column did not report the formation of CO. Variation of the temperature and pressure was employed for separation. The final ramping program for separation was:

Time=0 min., P=35 psi, T=150° C.

Time 3.15 min., temperature is ramped to 200° C. at 40° C. per minute

Time 25 min., program stops and return to initial conditions ii. Calibration. Measurement of species concentration was done by purging and filling up the reactor volume with a gas mixture of known concentration. Constant ($K_i$) values based on variables expected effect and area measured were calculated. Since we work at low concentrations, below 1000 ppm, the area signal measured is expected to be linear with variables that increase the amount of material, for instance, pressure, concentration and volume. Thus, $$K_i = \frac{Conc_i \times Pressure \times Volume}{Area}$$

units used were Torr for pressure, ppm for concentration, and µL, for volume.

iii. Summary

| Species | Retention time min | Constant ppm · torr · µL area$^{-1}$ | Detector used |
|---|---|---|---|
| Hydrogen | 0.48 | 8,411,645 | TCD |
| Methane | 0.78 | 97,414 | FID |
| Ethane | 0.93 | 50,541 | FID |
| Ethylene | 1.38 | 45,252 | FID |
| Propylene | 2.08 | 30,173 | FID |
| Propane | 2.73 | 34,219 | FID |
| 1-Butene | 3.88 | 23,392 | FID |
| Butane | 4.43 | 35,843 | FID |
| 1-Pentene | 5.42 | 19,267 | FID |
| Pentane | 6.23 | 20,740 | FID |
| 1-Hexene | 6.23 | 17,079 | FID |
| Hexane | 7.93 | 19,306 | FID |
| Acetaldehyde | 16.2 | 56,261 | FID |
| Methanol | >30 min | NA | FID |
| Ethanol | >30 min | NA | FID |

Electron Flux Calculations

In order to compare the photocatalytic activity of the different nanomaterials, the species formed were translated into a flux of electrons based on the amount of electron per molecule required to be synthesized. For instance, hydrogen and methane, reported in this manuscript, require 2 and 8 electrons respectively to be formed. Diatomic hydrogen requires 1 electron per hydrogen atom while methane requires 4 electron for the carbon atom and 4 for each hydrogen atom. A table of electron requirement per species is presented below.

| Species | Electron per molecule |
|---|---|
| Hydrogen ($H_2$) | 2 |
| Methane ($CH_4$) | 8 |
| Ethane ($C_2H_6$) | 14 |
| Ethylene ($C_2H_4$) | 12 |
| Propane ($C_3H_8$) | 32 |
| Propylene ($C_3H_6$) | 30 |
| Butane ($C_4H_{10}$) | 42 |
| 1-Butene ($C_4H_8$) | 40 |
| Pentane ($C_5H_{12}$) | 52 |
| 1-Pentene ($C_5H_{10}$) | 50 |
| Hexane ($C_6H_{14}$) | 62 |
| 1-Hexene ($C_6H_{12}$) | 60 |
| Acetaldehyde ($C_2H_4O$) | 10 |

Irradiance Measurement and Calibration

A solar simulator (ABET technologies) was used for measurements of photocatalysis using simulated sunlight irradiation. The light source (especially for high sun measurements) was measured using a calibrated power meter (1918-R, Newport Corporation) equipped with a 818-UV silicon detector. A rough calibration of the light source was done using a silicon photodiode (S1787-12, Hamamatsu Photonics). Since the photodiodes are linear with light intensity (under this illumination intensity), high sun light intensities were measured using our calibrated silicon photodiodes.

| Photon$_i$ wavelength nm | Photon$_i$ energy eV | Irradiance up to photon in µmol cm$^{-2}$ h$^{-1}$ | Spectrum photon % |
|---|---|---|---|
| 400 | 3.20 | 25.92 | 1.44 |

EXAMPLE

The electron flux of 100 ppm of $CH_4$ produced in 30 minutes in our reactor is measured as follows:

Sampling port pressure=760 Torr.

Reactor volume=48.2 mL.

Reactor Temperature=25° C., the change in reactor temperature was negligible, even under high sun illumination.

First we determine the number of nanomols produced (S stands for sample and R for reactor):

$$n = \frac{P_s V_R}{RT_R} = \frac{100 \text{ ppm} \times (1/10^6) \times 760(\text{torr}) \times (1(\text{atm})/760(\text{torr})) \times 0.048(L)}{0.08206 \text{ atm}L/\text{molK} \times 298K} \times$$

$$\frac{(10^9 \text{ nanomol})}{1 \text{ mol}} = 1.971 \text{ nanomol of } CH_4$$

$$e^- \text{flux} = 1.971 \times (8 \text{ electron}/1 \text{ nanomol } CH_4) \times (1 \text{ μmol}/10 \text{ nanomol}) \times (1/30 \text{ min}) \times (60 \text{ min}/1 \text{ h}) \times (1/0.78 \text{ cm}^2) = 4.043 e^- \text{ μmol cm}^{-2} h^{-1}$$

Quantum Yield

The quantum yield is determined by dividing the total sum of electron used to produce hydrogen and hydrocarbons, by the photon irradiation. The photon irradiation threshold is defined by the semiconductor energy bandgap. Since higher energy electrons, or "hot-electrons" form different (higher energy or molecules with higher reduction potential) products or solar fuels, the energy of the photon corresponds well to the energetic threshold required to produce the reduced fuel product.

Calibration of acetaldehyde: Pure acetaldehyde sample were diluted to a 15,265 ppm concentration using chloroform as balance, and 1 microLiter was injected and followed a similar method as with gas species.

X-ray diffraction is shown in FIG. 6.

Diffraction patterns of $TiO_2$ nanoparticles show a dominant Anatase phase. This conclusion is based on the presence of the peak at 25.6° which corresponds to the [101] Anatase plane and the absence of a peak at 27.6° which corresponds to [110] Rutile plane.

Titanium Dioxide Nanoparticle Dimension

The nanoparticle sizes were independently confirmed using TEM, STM, AFM, and XRD measurements. Determination of the nanoparticle size using XRD was done by calculating the domain size with the Scherrer equation, $\tau=(K\lambda)/(\beta \cos \theta)$, where $\tau$ is the size domain of the repeated crystal plane, is the wavelength of the x-rays applied (1.54 Å), $\beta$ is the line broadening at half the maximum intensity (FWHM) in radians, $\theta$ is the Bragg angle and K is shape factor with a value 0.9 for spherical particles. The size found was 10.7 nm.

X-ray photoelectron spectroscopy is shown in FIG. 7.

STM and STS. For STM measurements, the pre-amp sensitivity set to 1 nA/V. Other relevant parameters that were modified to obtain the STM images were I, P gain (%) for z-servo which correspond to the changes in the tunneling current, sample bias voltage where the polarity indicates the current flow, positive indicating flow from tip to sample, set-point current that is maintained constant during the scan. Other additional settings involved the number of scan frames, speed (lines/sec), points/lines, scan size (μm), X,Y offset on the scan range and scan angle. The typical range of values for the parameters taken to obtain the images for $TiO_2$ photocatalysts are mentioned below. The I and P gains were kept between 10 and 9%, sample bias 0.1-0.5 V, setpoint current 0.1-1 nA, scan size (1 μm), scan frame (1), speed (1 line/sec), points/line (512), scan offset in X, Y directions mostly set to 0 and scan angle (0°). After several attempts using different STM tips and parameter setting, images were obtained and the tunneling current as a function of applied bias voltage (STS) was recorded at multiple positions on the sample at room temperature and atmospheric pressure.

Current Sensing Atomic Force Microscopy (CSAFM) was conducted on the $CIS$—$TiO_2$ sample, using a CSAFM nosecone. The sample holder connections were identical to the above settings but with the gold coated AFM tip. Alignment of the laser beam was done via the movement of the horizontal/vertical knobs to obtain the diffraction pattern from the gold coated cantilever. Reflection of the cantilever onto the frosted glass after alignment showed the pattern of a cross. Next, the vertical deflection signal was adjusted to −3 using the horizontal adjustment knob while the LFM (lateral, or friction) vertical knob was adjusted to show zero. After the adjustment procedure outlined above the I and P gains were kept between 1 and 0.9% while the scan size (1 μm), scan frame (1), speed (1 line/sec), points/line (512), scan offset in X, Y unchanged and scan angle (0°). The scan provided us with topography and current image of conducting portions of the sample.

Data Analysis STM/CSAFM

The data obtained for the tunneling current (I) as a function of applied bias voltage (V) was differentiated to obtain dI/dV using OriginPro 8.5/Matlab. The peak positions were identified on the plots for dI/dV vs. V to determine the local electronic density of states. Energy band assignment of conduction and valence band was done by assigning the first significant positive and negative peaks from the density of states plots. The energy difference between conduction and valence band was identified as the electronic energy band gap. For the doped-$TiO_2$ samples, observation of additional intra-band states were noted and marked. These measurements were repeated numerous times and careful analysis was done to verify the reproducibility of the data. All the plots were carefully examined for similarities and differences (absence/presence of intra-band states on un-doped/doped $TiO_2$, overlap among tail-states at band-edges) on all the $TiO_2$ samples and the results were appropriately presented. The energy difference between conduction and valence band defines the electronic band gap energy. Cross-section and 3D map of STS was done using Matlab based on tunneling probability identified using STS on the shown nanoparticle.

CSAFM volume current image was obtained by aligning and cropping common areas of their respective topographic images at different bias voltage using image processor ImageJ (NIH, USA) in order to correct thermal drift on the sample.

Figure 8:
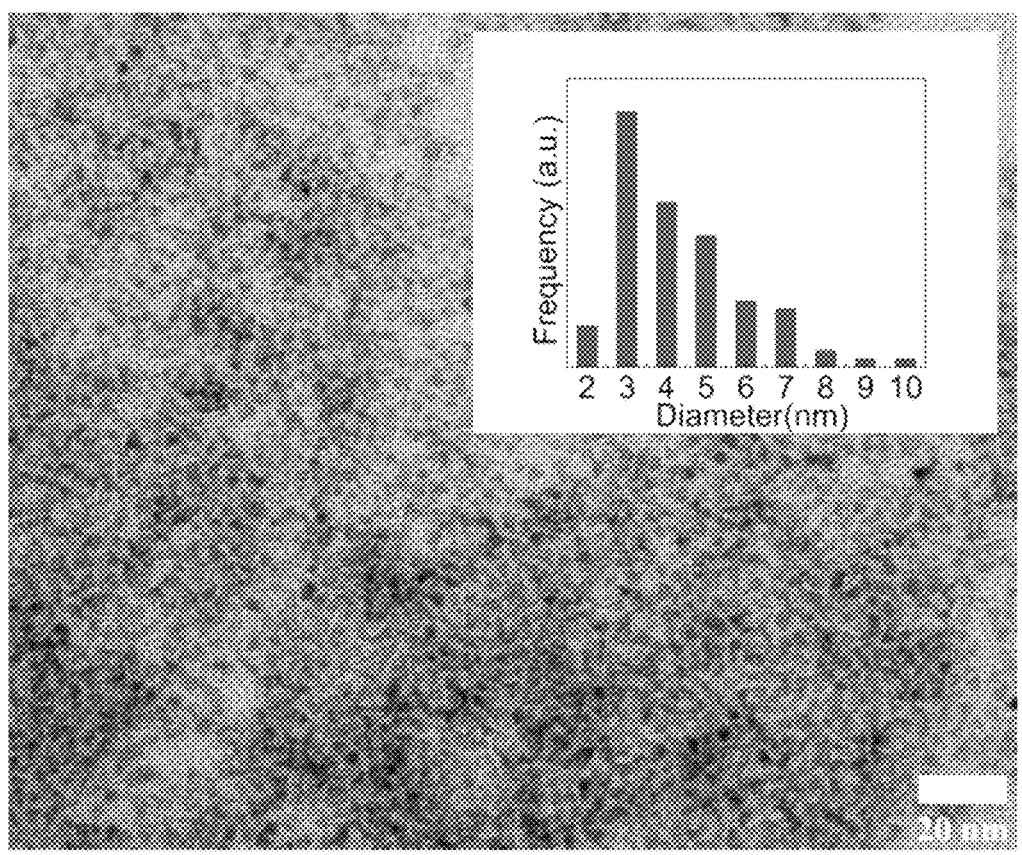
FIG. 8 shows a TEM image of CIS nanoparticles with a size distribution over several TEM images graphically depicted in the inset.

TEM characterization for Copper Indium Sulfide Nanoparticles is shown in FIG. 8.

CIS nanoparticles used in this study had a nominal diameter of 3.8±0.8 nm. Here we show a transmission electron micrograph of CIS nanoparticles, and size distribution taken over several TEM images, shown in the inset of FIG. 8.

Results of photocorrosion studies of our $TiO_2$—CIS catalyst are depicted in FIGS. 9A-C. The yield of all products was found to be stable and no "etching" of the catalysts was observed since the hole stays in $TiO_2$ nanoparticles, whereas the electron is transferred to CIS. To confirm the stability of our new photocatalyst $TiO_2$—CIS nanoparticles, we conducted time "photocorrosion" studies on our nanoparticles. As seen in FIGS. 9A-C, only nominal changes in yields of all products were obtained, well within the error bar reported overall several measurements. As indicated in our STM studies, and confirmed by our CSAFM measurements, photogenerated hole remains in the $TiO_2$ nanoparticles, which are resistant to "etching" or corrosion by oxygen, whereas the electrons get transferred to CIS QDs. Therefore, the photocatalysts reported in our work were found to be stable, even at different solar flux. Similar stability of the reported $TiO_2$—$Cu_{2-x}O$ and $TiO_2$—Pt catalyst was also observed, as shown in FIG. 10.

CdS Nanostructures as Standalone Wireless Photosynthetic Device with High Efficiency and Selectivity The present technology includes the design of cadmium sulfide (CdS) semiconductor nanostructures as standalone wireless photosynthetic devices, for efficient and stable production of highly selective solar fuels. CdS has been synthesized in a variety of nanostructures like nanoparticles, nanorods, metal-hybrids, and core-shell nanostructures changing the quantum-confined bandgap from visible (bulk bandgap 2.42 eV) to ultraviolet energies. While the tailored bandgap allows control over fraction of solar radiation that can be absorbed by CdS nanostructures, the band alignment of CdS electron and hole states with reduction potentials of different products for synergistic reduction of $CO_2$—$H_2O$ offers an excellent opportunity to design CdS nanostructures as standalone photosynthetic devices. However, several photophysical events leading to multielectron reduction of $CO_2$ need to be optimized (using nanostructure size, shape, and composition) to obtain high photocatalytic activity, selectivity and stability.

Simultaneous reduction of $CO_2$—$H_2O$, is a multi-step process which includes: 1) light absorption and creation of photoexcited electron-hole pair; 2) separation and transport of photogenerated charge carriers; 3) adsorption of reactants; 4) charge injection and $CO_2$—$H_2O$ redox reaction; and 5) desorption of products. Several CdS nanostructures were designed to improve these specific photophysical steps, and their respective role in multielectron photocatalytic reduction was evaluated. CdS nanorods (NRs) were synthesized to enhance light absorption (compared to spherical nanoparticles), due to the larger absorption cross-section of these one-dimensional nanomaterials. NRs were also expected to improve electron transport to the photocatalytic reaction site. Different-sized CdS nanoparticles were used to modify the energy bandgap (or fraction of solar spectrum absorbed) and the alignment of respective energetic states (conduction and valence "band") with reduction potential of various photocatalytic products, to evaluate the effect on selectivity and catalytic activity. Semiconductor-metal hybrid structures (CdS—Au and CdS—Ag) were expected to enhance the plasmonic light harvesting and to improve the charge separation at the metal-semiconductor interface.

CdS NRs were synthesized (FIG. 13a), with a quantum confined bandgap of 2.68 eV and bandedge photoluminescence (PL) of 2.62 eV (FIG. 13b). However, due to defect mediated recombination, a more prominent lower energy PL (peak centered at 1.84 eV) was observed. On using these CdS NRs for simultaneous $CO_2$—$H_2O$ reduction, good external quantum efficiency (~10% based on their respective bandgaps, all catalytic rates and quantum efficiencies have been normalized to electron mole per unit area and time, due to different number of electrons required for various photocatalytic products) was observed (FIG. 13c). We also synthesized Au- and Ag-metal hybrids grown at the end of CdS NRs (FIG. 13a), to improve the light absorption and charge separation in these standalone photocatalysts. While the metal-semiconductor hybrids showed similar absorption characteristics as the CdS NRs, distinct bandtail absorption was also seen for both Au and Ag hybrid (FIG. 13b). Moreover, PL observed from these materials was completely quenched, either due to charge separation or metal-mediated quenching. On testing these nanocatalysts for photocatalytic reduction, a significant drop was observed in their catalytic yields (FIG. 13c). While these nanohybrids have been reported to have very high quantum efficiency in the presence of hole scavengers, the single charge electrochemical reductions reduce the electron-hole recombination process leading to strongly enhanced quantum yields. However, standalone photocatalytic nanostructures using semiconductor-metal hybrids demonstrate lower the observed catalytic activity (10.1, 1.10 and 2.20 µmol $cm^{-2}$ $h^{-1}$ for NRs, NR—Au and NR—Ag, respectively), likely due to metal-mediated photogenerated charge recombination. Another distinct deviation from CdS NRs was the observation of hydrogen formation due to water splitting in these CdS NR-metal hybrids. NR—Au and NR—Ag showed hydrogen evolution rates of 0.17 and 0.06 µmol $cm^{-2}$ $h^{-1}$, respectively, likely due to charge extraction into the metal from higher energy states in these nanohybrids matched with the reduction potential of hydrogen (as shown in measured electronic density of states (DOS), FIG. 15a). While similar hot-electron states also exist in CdS NRs, these hot carriers can relax quickly in the semiconductor to the bandedge states.

Different sized CdS nanoparticles (NPs) were synthesized (FIG. 14a) to tune the energy bandgap and the position of conduction (and valence) band states. Due to the heavy hole and small electron masses ($m_e^*$=0.19 $m_0$, $m_h^*$=0.8 $m_0$ where $m_e^*$ and $m_h^*$ are effective electron and hole masses, and $m_0$ is the free electron mass), change in quantum-confinement was manifested as a larger change in conduction band state, and possible alignment with different reduction potentials for products of $CO_2$—$H_2O$ redox reaction (FIG. 15b). We show two different sized CdS NPs for comparison: 3.1 nm CdS NPs (bandedge PL peak at 3.07 eV, FIG. 14b) and 7.3 nm CdS NPs (absorption peak at 2.62 eV, FIG. 14b). Measurement of electronic DOS of these NPs revealed that 3.1 nm CdS NPs have their conduction band state just above the reduction potential of aldehydes, while the 7.3 nm NPs were expected to favor formation of alkanes (conduction band state just below reduction potential of aldehyde, FIG. 15b). However, comparing the PL observed between these two NP sizes, 3.1 nm CdS NPs showed much higher bandedge PL compared to 7.3 nm NPs, which predominantly photoluminesce due to defect mediated recombination (centered at 1.68 eV, FIG. 14b). Moreover, strong non-radiative recombination leads to weak PL likely indicating low electron-hole lifetimes and low expected photocatalytic yields for multielectron reduction. We tested the photocatalytic activity and selectivity of these standalone 3.1 nm CdS NPs and observed high catalytic yield (13.2 µmol $cm^{-2}$ $h^{-1}$) and quantum yield (>38%), with extremely high selectivity for acetaldehyde production (>99%, no other chemical species was detected in significant amount). This represents a four-fold increase in quantum yield over CdS NRs. However, larger NPs (7.3 nm CdS NPs) showed a significantly lower activity and quantum yield, (2.13 e-µmol $cm^{-2}$ $h^{-1}$ and 1.7%, respectively), as expected.

Since defects (likely surface defects) dominate the photogenerated charge carrier dynamics and hence the efficiency of CdS nanostructures as standalone, wireless photosynthetic devices, we tested the effect of surface passivation for CdS nanostructures. We coated the surface of CdS nanorods with Zinc Selenide (ZnSe) shell using solution phase synthesis. ZnSe has a similar crystal structure and a 3% lattice constant mismatch with CdS, which prevents formation of lattice mismatched defects on the surface, and forms a type II semiconductor heterojunction with CdS. The absorption from the CdS/ZnSe core-shell nanostructures exhibit bandedge CdS absorption (centered at 2.7 eV, FIG.

14b, also seen in electronic DOS, FIG. 15b) and a long absorption tail till ~2.13 eV, due to interfacial absorption between staggered energy levels of CdS and ZnSe (FIGS. 14b, 15b). Increased PL from these core-shell structures (centered at 2.13 eV) shows radiative recombination of photogenerated charge carriers (electrons in CdS and holes in ZnSe) at the staggered CdS/ZnSe interface (FIG. 14b). Electronic DOS for these core-shell nanoparticles also exhibit the distinct CdS bandedge states and the staggered ZnSe valence band states, due to the semiconductor heterojunction (FIG. 15b). Measurement of photocatalytic activity showed a decrease in activity due to increased barrier for charge transfer of electron from CdS core. However, long term catalytic activity (12 hour day cycle) showed that due to better surface passivation, the core-shell structures demonstrate stable photocatalytic production of acetaldehyde as compared to CdS NPs (the data collected over three 12 hour cycles, FIG. 15c). While catalytic activity of all CdS nanostructures recovers in dark ambient (likely due to replenishing of trapped electrons in surface states), stable production of solar fuels on light irradiation is an important requirement for standalone photosynthetic device. Therefore, core-shell nanoparticles offer a path towards achieving higher stability by preventing surface oxidation of CdS nanostructures.

In summary, we have demonstrated that CdS nanostructures can be developed as standalone, wireless artificial photosynthetic devices. While several nanostructure shape, size, and compositions (metal-hybrids, core-shell) were investigated to optimize the different steps leading to multielectron photocatalytic reduction of $CO_2$—$H_2O$, surface defects dominated the recombination dynamics and hence the photocatalytic yields of different nanostructures. Photocatalytic reduction of well-matched energy states of the 3.1 nm CdS nanoparticles lead to high activity (40% quantum efficiency) and highly selective evolution (>99% selectivity) of acetaldehyde. Core-shell type II semiconductor heterojunctions show separation of photogenerated electron-hole pair, and prevent the oxidation of the surface leading to stable catalytic activity. Since, acetaldehyde is a reactive building block toward higher-value chemicals such as acetic acid, acetic anhydride, ethyl acetate, butanol and pyridines, these results can have important implications towards design of other standalone nanostructured catalysts for artificial photosynthesis.

Doping Wide-Bandgap Semiconductor Nanotubes

The present technology relates to doped wide-bandgap semiconductor nanotubes. One-dimensional hollow nanotubes are used as a model system, to offer a large surface area for light absorption/emission and enhanced conduction. We fabricated wide-bandgap nanotubes, made from titanium oxide ($TiO_2$) and tungsten oxide ($WO_3$), to demonstrate doping and characterization of resulting optical, electronic and magnetic properties. We utilized electrochemical oxidation, also termed anodization, of corresponding metal foils to fabricate nanotubes of desired size and lengths (see methods). While several metal-oxide nanostructures have been grown using this technique, we focused on titanium dioxide as an example in this study, due to it's wide ranging technological applications. We studied dopants to tune the light absorption/emission (optics), electronic structure, catalytic properties, and magnetic properties in as-grown $TiO_2$ nanotubes. To ensure the general applicability of this doping method, we also demonstrated similar results in other wide-bandgap materials like $WO_3$ nanotubes.

We doped wide-bandgap nanotubes (especially $TiO_2$ nanotubes), with both cationic, anionic, and co-dopants, substitutional and interstitial dopants, shallow and deep dopants (energetically) with varying doping levels, to obtain desired physical properties. We started with a thin metal foil (titanium metal for $TiO_2$ nanotubes), or a sputtered metal film on a transparent conducting indium-tin-oxide coated glass surface. Electrochemical oxidation, or anodization, of titanium metal to form $TiO_2$ nanotubes can be accomplished using metal foil as anode and platinum metal as cathode in an electrochemical nanostructure growth cell (see methods and FIGS. 20-21). Simple addition of desired concentration of anionic precursors (eg. methenamine as nitrogen precursor) in this same configuration (see methods) allows growth of vertically aligned, anion-doped nanotubes, as shown in FIG. 16A. The nanotube diameter, size, length, and dopant concentration can be varied by changing the applied voltage, growth solvent and etching solution, and precursor concentration in solution (see methods, FIG. 22, 23A-F). Incorporation of cationic dopants (eg. Niobium, Iron, Copper etc.) in nanotubes is more challenging, since the adding cation precursors in growth solution electrodeposits the cation on the Pt cathode and increase the current substantially, thereby stopping the growth of $TiO_2$ nanotubes. We developed a simple electrochemical cell design, and used a modulated alternating current for facile incorporation of cationic dopants in $TiO_2$ nanotubes (FIG. 21, see methods). Therefore, we developed a very simple and inexpensive method for facile incorporation of desired single and co-dopants into wide-bandgap semiconductor nanotubes.

We confirmed the dopant incorporation by a variety of characterization techniques like Energy Dispersive X-ray Spectroscopy (EDS, FIGS. 25, 26A-C, 29, 30A-D), Scanning Tunneling Microscopy and Spectroscopy (STS, FIGS. 16B, 16C, 17B, 31A-B) and elemental analysis. Using STS spectroscopy, we used the fixed Fermi-level of the Pt—Ir tip (at 0V), as probe of the shift of Fermi-level with doping. As shown in FIG. 16B, clear shift of Fermi-level towards valence band was observed on p-type doping (shift towards conduction band on n-type doping is seen in FIG. 17B). Since nominally undoped nanotubes have impurity donors (FIG. 34) and behave as n-doped semiconductors, doping with p-type dopants (like nitrogen) first compensates these impurities (FIG. 38A-D), thereby accentuating the Fermi-level shifts initially (from 0 to 1 wt %, FIG. 16B). Similar doping with a variety of n- and p-type, optical and electronic dopants was also monitored using their respective STS spectrum (FIG. 16C). We varied the amount of dopant incorporated into the nanotubes, and even at very high doping concentrations (~10% of ions replaced), we did not detect any phase separation or separate dopant phase using XRD (FIGS. 27, 28, 30A-D). These results indicate possible incorporation of desired concentration of cationic and anionic dopants into as-grown wide-bandgap semiconductor nanotubes (doped $WO_3$ nanotube, FIG. 30A-D, 31A-B). This method can also be expanded to synthesis of doped nanoparticles using transformation of doped nanotubes to nanoparticles.

To test the doped nanotubes for desired optical properties, we measured the absorbance spectra, for undoped and different doped nanotubes, as shown in FIG. 16D. The optical spectrum does not reveal the nature of dopant, or the direction of shift of Fermi-level (which was analyzed by STS, as shown in FIG. 16B, 16C, 17B) towards conduction or valence band. However, the optical spectroscopy can be used to monitor the semiconductor bandgap, by changing the dopant and the concentration of dopant in $TiO_2$ nanotube. Moreover, the electronic level of the dopant can also be estimated since the Fermi-level (and effective bandgap) is also pinned at high dopant concentrations (FIG. 16B).

However, this analysis is complicated by the indirect bandgap of TiO$_2$ semiconductor, large Rayleigh scattering ($\propto 1/\lambda^4$) observed in the nanotubes (shown as black dashed curve in FIG. 16D), and the presence of impurity donor states (below the bandgap) in undoped TiO$_2$ (FIG. 34). The band gaps estimated from respective optical spectra (after removing scattering) were 2.7 eV (due to impurity donors), 2.6 eV, 2.5 eV, 2.4 eV, 2.3 eV, 2.2 eV, 2.0 eV for undoped, Nb, Cu, Fe, N, Nb—N, and Cu—N doped and co-doped samples, respectively (FIG. 16D). These bandgaps were only qualitative estimates, and we relied on STS spectroscopy (FIG. 16B, 16C, 17B, 19C, 31A-B, 34) and photoconductance measurements (FIG. 18A-B), to better quantify the effect of doping on semiconductor bandgaps. Therefore, careful analysis (optical and STS) of doped nanotubes provided us with a simple method to tune the optical properties of TiO$_2$ nanotubes using the dopant electronic levels, depending on their desired applications as transparent conductors (Nb dopant as shallow donor) or enhanced infrared absorption in photocatalysts (Nb—N or Cu—N co-doped catalyst).

One of the main motivations of doping high-surface area, conductive TiO$_2$ nanotubes was to tune their electronic properties for applications in optoelectronic devices (solar cells, LED's etc.). As-synthesized "undoped" TiO$_2$ nanostructures show n-type doping behavior, due to impurity donors (confirmed by our STS data, FIG. 34, 16B etc.), which allows them to be used in thin-film photovoltaics and photoconductors. However, the inability to tailor the impurity dopant level (and hence Fermi-level), or change the dopant from n- to p-type doping, has hindered several studies of optoelectronic devices. The strong dependence of the "impurity dopants" on the synthesis technique can also explain the variability in literature reports, and possible variations in device efficiency. Here we report, for the first time, p- and desired n-doping (FIG. 17B, 17C, tunable dopant concentration FIG. 19B, 38A-D) of TiO$_2$ nanotube films, as shown in FIG. 17A. Clear injection of only holes (and electrons) was observed in p- (and n-) type TiO$_2$ nanotube doped with nitrogen cation (and niobium anion), respectively (FIG. 17C). This observation is also confirmed by clear shifts in Fermi-levels towards the valence (and conduction) bands for p- (and n-) type TiO$_2$ nanotubes (compared with Pt—Ir tip level at zero), using STS data shown in FIG. 17B. Similar results were found from ensemble I-V measurements that indicate TiO$_2$ nanotube array is uniformly p-type (see FIG. 38A-D). Although nitrogen doping of TiO$_2$ nanotubes was demonstrated before, this is first observation of p-type TiO$_2$ nanostructured film. We also conducted current-voltage spectroscopy (I-V), on all undoped and doped nanotubes, using ensemble measurements (FIG. 17A, 17D) and single nanotube current sensing AFM measurements (see methods, FIG. 32, 33, 35A-D). Since the dopant concentrations for all cations and anions was kept the same in FIG. 17A, the differences in the conductivity of the nanotubes can also arise from the number of ionized dopants $$n = n_0 \exp\left(-\frac{E_i}{kT}\right)$$

which depends on the dopant electronic level $E_i$ and the available energy at kT room temperature ($k_b T = 25$ meV, where $k_b$ is the Boltzmann constant and T is the temperature). To further understand ionization of dopants to generate doped charge carriers, which determines the electronic property of doped semiconductors, temperature dependent I-V characteristics (I-V-T) of samples were measured. We plotted the conductivity $\sigma = \ln(I/V)$ as a function of temperature T (FIGS. 17D, 35A-D), to measure the activation barrier for charge transport (or energy required to ionize charge carriers in a doped semiconductor). Activation energies ($E_a$) for Nb, Fe, and Cu doped samples were found to be 0.018 eV, 0.093 eV, and 0.502 eV, respectively (FIGS. 17D, 36A-B). The activation energy for Nb-doped TiO$_2$ nanotubes was very close to the reported ionization energy values for Nb donors in anatase TiO$_2$ thin films and bulk crystals, which was in the range 10-40 meV (26-27). We also confirmed using Richardson plots ($\ln(I/T^2)$ vs. 1/kT) similar values (FIGS. 37A-E) obtained for thermally-activated transport in these doped semiconductor nanotubes. These findings provide insights into charge conduction in these doped nanostructures, and further prove electronic doping of TiO$_2$ wide-bandgap nanotubes using cationic and anionic dopants.

While the electronic conductivity of TiO$_2$ nanotubes increases with addition of dopants (FIG. 17A), the only exceptions were the anionic dopants (interstitial copper and substitutional nitrogen, FIG. 17A). In these p-type dopants, hole doping first compensates the impurity donors (FIG. 34) available in nominally undoped nanotubes, resulting in an initial drop in conductivity (or resistive sample, FIGS. 38A-D). Addition of more hole dopants results in a shift from n-doped to a conductive p-doped semiconductor film, as shown in FIGS. 38A-D, for increased nitrogen doping. Furthermore, it is surprising that copper doping results in p-type conductivity (confirmed using STS shown in FIG. 16C and CS-AFM shown in FIG. 18D), whereas substitution of titanium cation (Ti$^{4+}$) with copper (Cu$^+$ or Cu$^{2+}$) is expected to show n-type doping. This result can be explained by substitutional doping of copper in TiO$_2$ nanotubes, since it has been shown that Cu atoms can act as deep acceptors when they are in interstitial positions in the crystal lattice. Therefore, Cu likely occupies interstitial positions in TiO$_2$ crystal lattice (interstitial dopant).

To further evaluate the role played by these dopants on the optoelectronic properties, and to ensure the dopants are properly incorporated in the TiO$_2$ crystal (and not as recombination sites or traps on the surface), we evaluated the photoresponse of these doped nanotubes. We illuminated these films with a small flux of photons (to identify possible recombination from dopants as traps), and observed the change in current (from the dark) due to photogenerated charge carriers, normalized by the intensity of light. The photoresponse ($I_{ph} = (L_{light} - I_{dark})/P_{light}$) for highly conductive samples (FIG. 17A) was within the error bar for the measurement, due to high concentration of background electrons (photogenerated charge carriers are much less than equilibrium carrier concentration). However, the lightly-doped (more resistive) samples (undoped, and Cu-, N-, and Cu—N doped nanotubes) showed good transport for photogenerated charges in these devices, following exciton dissociation and charge transport in these doped nanotubes (FIGS. 18A, 18B, 39). Spectrally resolved normalized photocurrent (FIG. 18A) mimics the absorption spectra for the respective nanotubes, shown in FIG. 16D. This is expected since the photocurrent is limited by thin film absorption of incident light. To further evaluate the charge conduction mechanism, we developed a modified Fowler-Nordheim (F-N) plot for photogenerated charges. For identifying different regimes of charge transport and acceptor (or donor) level below the bandgap, instead of F—N plot of ln(I/V2) vs 1/V, we plotted $$V \times \ln\left(\frac{I_{photo,\lambda} - I_{dark}}{V^2 \times P_{light} \times Abs}\right)$$

as a function of photon energy (FIG. 18B), where $P_{light}$ is the incident light intensity, and Abs is absorption coefficient (see FIG. 39). The data for copper doped nanotube showed photocurrent ~0.5-0.7 eV below the nominal $TiO_2$ bandgap, indicating the deep acceptor level for copper. These measurements are consistent with measurements for activation energy (FIGS. 17D, 36A-B, 37A-E), and STS data (FIGS. 16B, C). Moreover, this indicates that even at low fluence, photogenerated charges are not trapped at the copper dopant sites (interstitial acceptor). These measurements clearly show the dopant atoms are likely incorporated in the lattice, and contribute towards imparting the desired optical and electronic properties to doped $TiO_2$ nanotubes.

Development of efficient optoelectronic devices, based on these doped nanotubes, requires electronic characterization of fundamental transport properties like mobility and carrier concentration. We measured these characteristic properties (carrier concentration n and mobility μ) for these nanotubes, using single nanotube current sensing AFM (CS-AFM measurements). We brought a conductive gold coated AFM tip (known cross-section of contact), with single nanotube (Schottky-barrier) and measured to current-voltage (I-V) curves from a number of nanotubes. We used the I-V curves (FIG. 18C) in the intermediate bias regime (where the reverse-biased Schottky barrier dominates the total current)

$$\ln(I) = \ln(S) + e(1/(kT) - 1/E_0)V + \ln(J_s) \quad (1)$$

where J is the current density, S is the contact area, $E_0$ is a parameter depending on carrier concentration n, e is elementary charge, k-Boltzmann constant, and $J_s$ is a function of applied bias. This logarithmic plot of the current I as a function of the bias V gives approximately a straight line, the slope of which is equal to $e(1/(kT) - 1/E_0)$. The electron mobility can be calculated using the relation μ=1/(nep), with p being the resistivity of the nanotubes. The extracted values of n and μ are listed in Table I. I-V characteristics of Cu doped $TiO_2$ nanotubes samples at higher voltages showed clear nonlinear behavior of the form I~$V^2$ (FIG. 18D), which can be explained by space-charge limited current model (SCLC). In this SCLC region the carrier concentration can be calculated using the equation:

$$n = \frac{\varepsilon V_C}{eR^2} \quad (30),$$

where ε dielectric constant, R-radius of nanotubes, and $V_C$ is the crossover voltage presenting transition from Ohmic to SCLC regimes. Extracting charge carrier concentration using the SCLC model for Cu doped $TiO_2$ nanotubes shows a concentration of $5 \times 10^{15}$ cm$^{-3}$, which is very close to the value $1.3 \times 10^{16}$ cm$^{-3}$ that was calculated using Equation 1.

Using these fundamental characterizations of doped wide-bandgap doped semiconductor nanotubes, we demonstrated suitable design and applications of these nanostructures. By using a shallow dopant for $TiO_2$ nanotubes (Nb), we fabricated transparent nanotube films (UV-bandgap ~3.1 eV) and varied the doping concentration to tune the conductivity. Since the (Nb) dopants show linear concentration with cationic precursors, and hence easily tunable resistivity (FIGS. 19A, 40), we can fabricate transparent conducting oxide films. We confirmed that transmission obtained in these films is above 90% for entire visible wavelength range (FIG. 19B), and demonstrate metal-like conductivity (FIG. 19B inset). Thus, these results show that Nb-doped $TiO_2$ nanotubes can be excellent candidates for use as transparent conducting oxide nanotubes for photovoltaics (as transparent conducting oxide (TCO) contacts and depleted heterojunction devices), photodetectors, artificial displays, and building blocks for future nanoscale devices. This is first demonstration of TCO nanotubes on a thin flexible metal foil, which was enabled using doping method introduced in this work. Using suitable deep monodopants and co-dopants (Cu, Cu—N, Nb—N), we fabricated photocatalysts, with high absorption throughout the visible wavelengths (for enhanced light absorption, FIG. 19C). Besides the infrared absorption and easily tunable electronic levels in these doped wide-bandgap nanotubes for photocatalysis (FIG. 19C), we also demonstrated a selective (FIG. 19C inset) and stable (FIG. 42) photocatalyst using N-doped nanotubes. To tune the magnetic properties of these wide-bandgap nanotubes, we incorporated Fe dopants. Using SQUID measurements (details in Methods), we confirmed that Fe-doped $TiO_2$ nanotubes showed clear ferromagnetic behavior (FIG. 19D), as compared to undoped nanotubes which are paramagnetic (FIGS. 41A-B). The saturation magnetization ($M_s$), coercive field ($H_c$), and remnant magnetization were extracted to be 0.22 emu/g, 402 Oe, and 0.028 emu/g, respectively.

Therefore, using the tuned electrical, optical, and magnetic properties of the doped $TiO_2$ nanotubes, we made a variety of functional wide-bandgap semiconductor nanostructured films. The doping method developed here is very versatile, and can be used for simple and inexpensive fabrication of a variety of doped nanotubes, including tungsten oxide ($WO_3$), zirconium ($ZrO_2$), hafnium ($HfO_2$), and others (FIGS. 30A-D, 31A-B). We performed a variety of characterization (single nanotube and ensemble films) to ensure uniform incorporation of dopants in the crystal structure, and clear modification of their desired optical (ultraviolet to infrared bandgap), electronic (new p-doped oxides) and magnetic (ferromagnetic nanotubes) properties. These results can have important implications for development of new devices and device architectures for applications in the broad field of optoelectronics, catalysis, display technologies, and power electronics.

Method for $TiO_2$ nanotube growth by anodization.

$TiO_2$ nanotubes in this work were grown by electrochemical oxidation (anodization) (21, S1-S5). Briefly, $TiO_2$ nanotubes were grown using electrolyte which consisted of solvent (glycerol or ethylene glycol) with 1% ammonium fluorine ($NH_3F$), and 2% of water. The type of solvent used determined the growth rate of nanotubes. The growth rate of nanotubes in glycerol was approximately 100 nm per hour, while this value for ethylene glycol was ~4 μm per hour. These growth rates were fairly constant for the beginning of the growth process (up to 5 hour); later the growth rate becomes sub-linear because of two competing processes: electrochemical nanotube growth, and nanotube etching by the electrolyte's $NH_4F$ acid. All as-grown samples were amorphous and they were annealed at 500° C. for 1 hour in air, to convert to anatase phase.

In a regular setting of electrochemical cell, negative-biased Platinum (Pt) electrode and positive-biased Titanium (Ti) sheet are immersed in the electrolyte 2-3 cm apart, as shown in FIG. 20. In this configuration negative ions in the electrolyte move toward positive Ti sheet and positive ions move toward negative Pt sheet. Addition of desired dopant metal cations into the electrolyte results in repulsion of the positively charged ions from the Ti sheet (away from the growing TiO$_2$ nanotubes). This prevents TiO$_2$ nanotubes from doping with metallic cations.

Replacing DC power supply with AC can resolve this problem. During the "negative" cycle (switched polarities), the desired dopant cations are attracted by the Ti sheet, thus making possible doping with cations. However, direct application of this approach does not solve the problem. First, the added cations (especially for loading necessary for high doping concentrations) dramatically increase conductivity, making it impossible to apply high enough voltages to enable TiO$_2$ nanotube growth (voltages higher than 5 V need to be applied to initiate nanotube growth. Second, during the positive bias on Ti sheet (therefore, negative on Pt plate), cations still deposit on the Pt electrode, rapidly covering it with metallic layer quickly degrading its performance.

To overcome these problems we modified the electrochemical cell. The electrochemical cell was divided into two sections separated with porous membrane (FIG. 21A). The first part of the cell contains Pt electrode and is filled with electrolyte free of dopant precursor. The second part of the cell is with Ti sheet and is filled with electrolyte that contains dopant precursor. The porous membrane serves as the barrier for two different parts of the electrochemical cell to prevent from mixing, while still allowing flow of electrolyte to complete the electrochemical cell. The resulting currents in this configuration are comparable to the currents in regular electrochemical cells with DC power supply, and high voltages (7V-200 V) can be applied.

As an AC voltage source, rectangular shaped power pulses were used in this present study. The shape of AC voltage and its parameters are shown in schematic FIG. 21B. The period of AC voltage is characterized by positive part V$_1$, negative part V$_2$, frequency f, which is equal to:

$$f = \frac{1}{t_1 + t_2},$$

where t$_1$ and t$_2$ are durations for positive and negative parts of the cycle, respectively. The ratio of these durations t1/t2 controls the growth and doping times, respectively.

Another simple method was also developed in this study, for growth of wide-bandgap nanotubes with cationic dopants. Instead of using a membrane separator, we used two separate electrochemical cells. Cell 1 had a growth solution with only electrolyte (without the cationic dopant), and the second cell (Cell 2) had a growth solution with the electrolyte and the cationic dopant. We grew the nanotubes with Ti sheet as anode in Cell 1, and then switch polarities (Ti sheet as cathode) in Cell 2. We controlled the ratio t1/t2 by changing the amount of growth time in respective electrochemical cells. We recommend frequent cycling between the electrochemical cells for uniform incorporation of dopant ions.

Scanning electron microscopy (SEM) analysis showed that the morphology of TiO$_2$ nanotubes did not change after doping and well-defined tubular structure as typical to undoped samples was observed. Representative images of TiO$_2$ nanotubes grown by anodization at different angles and at different voltages are shown in FIGS. 22, 23A-F.

The growth rate depended on the solvent used. Two different solvents were used—glycerol and ethylene glycol (EG). The growth rate in electrolyte based on glycerol was about 100 nm per hour, while the growth rate in electrolyte based on EG was 2-3 μm per hour (μm/h). The diameter of nanotubes changed with the applied voltage and there was almost a linear relationship between these two parameters. FIGS. 23A-F presents SEM images for TiO$_2$ nanotubes grown at different voltages to obtain nanotubes with different diameters.

Three main types of cationic dopants were used in this study—Niobium (Nb), Iron (Fe), and Copper (Cu). Among the prominent anion dopants, we used Nitrogen (N), while several combinations of co-doped anion and cation co-dopants were also prepared. Energy dispersive X-ray spectroscopy (EDS) confirmed presence of doped elements in TiO$_2$ nanotubes. As precursors niobium (V) chloride, iron (III) chloride, and copper (II) sulfate were used. While this method can be applied to any cation, we focused on Nb, Fe, and Cu due to their importance for a variety of applications. For example, Nb was shown to be a shallow donor for TiO$_2$, and therefore, a good candidate for the growth transparent conducting oxide thin films. Fe is a good dopant for fabricating magnetic semiconductors. Cu and Nb co-doped with N were used to increase photocatalytic activity of TiO$_2$. FIG. 25 presents EDS spectra for Nb, Cu, Fe, N, and Cu/N and Nb/N co-doped samples. Corresponding characteristic X-ray peaks for each dopant can be clearly seen. To test the uniform incorporation of dopants into the TiO$_2$ nanotubes crystal, EDS point scans (and maps) were performed by directing focused electron beam onto a single nanotube (or mapping the elemental distribution over a large area). FIG. 26A-C present EDS spectra from different points of individual Cu-doped TiO$_2$ nanotubes. Highly pronounced Cu peaks were seen at different points (we are showing two points for clarity), indicating Cu is uniformly incorporated in TiO$_2$ nanotubes crystal, rather than accumulating as clusters or secondary phase oxides. This conclusion was supported by X-ray diffraction studies, which showed only TiO$_2$ anatase phase without any diffraction peaks from secondary phases.

The XRD pattern of samples did not change with doping level up to 12%. As an illustration in FIG. 27 we show XRD patterns for Nb doped TiO$_2$ nanotubes with doping level up to 12%. Only peaks corresponding to anatase TiO$_2$ was observed.

One of the requirements for an efficient doping method is its ability to vary the doping level. From a series of detailed experiments, it was found that the dopant level, or dopant concentration n, mostly depended on the negative bias V$_2$, frequency f, t$_1$/t$_2$ ratio (see FIG. 21B), and dopant precursor amount b in the electrolyte. Our studies showed that the dependence of n on f and t$_1$/t$_2$ at fixed V$_2$ and b is very complex, depending on a number of factors including the viscosity of the electrolyte (varying the electrolyte changed the doping amount and growth rate), applying very high voltages (100-200 V) increases the diffusion of the cationic dopant, thereby decreasing the growth rate, etc. Therefore, we study the dependence of doping (n) on each of these parameters separately, keeping the other parameters constant. The dependence of n on V$_2$ (when other parameters were fixed) was more predictable; however, a strong sub-linear relationship between these two parameters was observed (changing V$_2$ also changes the nanotube diameter, see FIG. 23A-F). The dependence between n and the amount of precursor b in the electrolyte was nearly linear (FIG. 19A, 38A-D). Therefore, this was the most desired path for controlling doping level in TiO$_2$ nanotubes. In all experiments in this work variation of dopant concentration was performed by varying precursor amount in the electrolyte. To demonstrate this we show EDS spectra for Nb doped samples at different NbCl$_5$ wt % in electrolyte. It is seen that the intensity of Nb peak in EDS spectra grows with NbCl$_5$ wt %. EDS quantitative analysis showed almost linear relationship between detected Nb signal in TiO$_2$ nanotubes concentration and NbCl$_5$ precursor. This plot is shown in FIG. 19A.

Electrochemical oxidation can be used not only for growth TiO$_2$ nanotubes, but also many other wide-band gap semiconductors such as WO$_3$, Nb$_2$O$_5$, ZrO$_2$, HfO$_2$, etc. The feasibility of the new doping method was tested on WO$_3$ nanotubes (amongst others) as another example. FIGS. 30A-D and 31A-B present SEM images, XRD pattern, EDS spectrum, and STS spectrum for undoped, and Fe-doped WO3 nanotubes (as an example of cationic doping). These results demonstrate that wide-bandgap nanotubes (WO$_3$ nanotubes here) were easily doped (eg. with Fe) without compromising the nanotube crystal and morphology properties. Details are provided in the Figure captions.

Methods and instruments used for characterization of doped TiO$_2$ nanotubes.

Current sensing AFM (CSAFM) measurements: CSAFM measurements were performed using modified Molecular Imaging PicoSPM II setup. The CSAFM tips used were coated in-house using thermal evaporator with 5 nm of 99.99% Cr and 15 nm of 99.99% Au, both purchased from Kurt J. Lesker Company. The silicon tips for contact mode imaging and spectroscopy were obtained from NanoDevices Inc. Contact force was set to soft contact (deflection set point between −1 and −3V). Multiple current scans were taken at different bias voltage ranging from −5 to +5 V with steps of 50 mV. The measurements were performed by contacting top of vertically aligned TiO$_2$ nanotubes and the open area of Ti sheet as the second contact to form complete circuit. FIG. 32 illustrates the experimental configuration used for the CS-AFM measurements. Alignment of the laser beam was done via the movement of the horizontal/vertical knobs to obtain the diffraction pattern from the gold coated cantilever.

STM and STS measurements: Scanning Tunneling Microscope images were obtained using a customized Molecular Imaging PicoScan 2500 setup (with PicoSPM II controller). An STM nosecone (N9533A series, Agilent Technologies) was used for scanning and spectroscopy, using chemically etched Pt—Ir tips (80:20) purchased from Agilent Technologies, USA. The measurements were done at room temperature under atmospheric conditions. Tunneling junction parameters were set at tunneling currents ranging between 100 and 500 pA and sample bias voltage between −5 and +5 V. Spectroscopy measurements were obtained at a scan rate of 1 V/s. For STM measurements, the pre-amp sensitivity was set to 1 nA/V. The tunneling current as a function of applied bias voltage (STS) was recorded at multiple positions on the sample at room temperature and atmospheric pressure.

I-V characterization was performed by two different ways: 1) from single nanotubes using CS-AFM and 2) ensemble measurements using Keithley source meter (Keithley 2612A, Tektronix Inc.).

I-V-T studies: Temperature dependent current-voltage characterization (I-V-T) was performed in temperature range 20 K-300 K with 10 K temperatures steps, using our closed loop Helium Cryostat (ARS-202AE with ARS-2HW Helium compressor, Advanced Research Systems Inc.). The voltage for these measurements was varied in the range −20V-+20V.

Characterization with XRD: The crystal structure of doped and undoped TiO$_2$ and WO3 nanotube samples were analyzed by X-ray diffraction (XRD) measurements using a Scintag XDS 2000 X-ray diffractometer. The measurements were performed using Cu K radiation at 45 kV and 40 mA.

Characterization with XPS: A PHI 5600 x-ray photoelectron spectrometer was used to obtain x-ray photoelectron spectra (XPS) of TiO$_2$ samples. The powder samples were pressed into pellets with a thickness of 0.7 mm and a diameter of 5.5 mm and affixed to the sample puck with carbon tape. Monochromatic Al Kα x-rays (1486.6 eV) were used for the XPS analysis. The pass energy was 93.9 eV and the step size was 0.400 eV. An electron beam neutralizer was employed at 17.8 mA. Data was collected with Auger Scan (RBD Enterprises, Inc., Bend, Oreg.). XPS data was analyzed in CASA XPS (Casa Software Ltd, UK). Quantitative measurement of TiO$_2$ samples was performed with an ARL 3410+ inductively coupled optical emission spectrometer (ICP-OES). Samples were dried and digested in different acid solutions and concentrations were calculated from calibration curves composed of three certified standards.

An XPS spectrum obtained for TiO$_2$ is shown in FIG. 43.

SEM characterization: The morphology of grown TiO$_2$ nanotubes were examined in field-emission scanning electron microscope FE-SEM JEOL 7401F.

EDS analysis: Compositional analysis were performed by energy dispersive X-ray spectroscopy (EDS) embedded in FE-SEM JEOL 7401F instrument. These analysis were performed in different modes (2D mapping, point scan, etc.) to test for uniformity and possible secondary phases.

Photoresponse measurements: Spectral photo I-V measurements were performed in the wavelength range 300 nm-1000 nm. Monochromatic light was obtained using monochromator from light source. Photocurrent was calibrated to incident power of monochromatic light measured using Si-based detector (NIST). The intensity of monochromatic light was measured using an optical power meter (Newport, 1830-C).

Gas-phase reduction of CO$_2$ and H$_2$O: Twenty to thirty mg of catalyst was deposited in a rounded glass vial cut in half with a 0.64 cm$^2$ cross sectional area. The vial was then enclosed in a 48-mL reactor and purged for 45 minutes with CO$_2$ (75 cm$^3$ min$^{-1}$) humidified in a bubbler filled with D.I. water. After purging, the reactor was closed and irradiated with 1 SUN (100 mW cm$^{-2}$) through a glass window using a solar simulator (ABET Technologies). One-milliliter samples were extracted from the reactor and injected into a gas chromatograph (GC) equipped with a thermal conductivity detector (TCD) and a flame ionization detector (FID) for measuring concentrations. Separation of the hydrocarbons was done with a Hayesep D column or with Silica-gel column. Reported data of photocatalytic rate and quantum yield were calculated based on the electron flux (μmol cm$^{-2}$ h$^{-1}$) used to form H$_2$, CH$_4$, C$_2$H$_6$, hydrocarbons and others.

Measuring Photocatalytic Activity

Gas Chromatography i. Identification and separation. Two 14 L gas samples were bought from MATHESON TRI•GAS. Gas cylinder 1 presented a composition of 1000 ppm for each saturated hydrocarbon methane, ethane, propane, butane, pentane and hexane, and was balanced with Helium (He) gas. A second sample, also balanced with He, had a concentration of 1000 ppm of unsaturated hydrocarbons ethylene, propylene, 1-butene, 1-pentene and 1-Hexene. A gas chromatography G1540 Agilient was equipped with a 6-ft silica gel capable to separate hydrocarbons. The column unfortunately was unable to separate carbon monoxide (CO), nitrogen (N$_2$) and oxygen, nonetheless, former experiments using a 6 ft-Hayesep D column did not report the formation of CO.

Variation of the temperature and pressure was employed for separation. The final ramping program for separation was:
Time=0 min., P=35 psi, T=150° C.
Time 3.15 min., temperature is ramped to 200° C. at 40° C. per minute
Time 25 min., program stops and return to initial conditions ii. Calibration. Measurement of species concentration was done by purging and filling up the reactor volume with a gas mixture of known concentration. Constant (Ki) values based on variables expected effect and area measured were calculated. Since we work at low concentrations, below 1000 ppm, the area signal measured is expected to be linear with variables that increase the amount of material, for instance, pressure, concentration and volume. Thus, $$K_i = \frac{Conc_i \times \text{Pressure} \times \text{Volume}}{\text{Area}}$$

units used were Torr for pressure, ppm for concentration, and μL, for volume.

iii. Summary

| Species | Retention time min | Constant ppm · torr · μL area$^{-1}$ | Detector used |
|---|---|---|---|
| Hydrogen | 0.48 | 8,411,645 | TCD |
| Methane | 0.78 | 97,414 | FID |
| Ethane | 0.93 | 50,541 | FID |
| Ethylene | 1.38 | 45,252 | FID |
| Propylene | 2.08 | 30,173 | FID |
| Propane | 2.73 | 34,219 | FID |
| 1-Butene | 3.88 | 23,392 | FID |
| Butane | 4.43 | 35,843 | FID |
| 1-Pentene | 5.42 | 19,267 | FID |
| Pentane | 6.23 | 20,740 | FID |
| 1-Hexene | 6.23 | 17,079 | FID |
| Hexane | 7.93 | 19,306 | FID |
| Acetaldehyde | 16.2 | 56,261 | FID |
| Methanol | >30 min | NA | FID |
| Ethanol | >30 min | NA | FID |

Electron Flux Calculations

In order to compare the photocatalytic activity of the different nanomaterials, the species formed were translated into a flux of electrons based on the amount of electron per molecule required to be synthesized. For instance, hydrogen and methane, reported in this manuscript, require 2 and 8 electrons respectively to be formed. Diatomic hydrogen requires 1 electron per hydrogen atom while methane requires 4 electron for the carbon atom and 4 for each hydrogen atom. A table of electron requirement per species is presented below.

| Species | Electron per molecule |
|---|---|
| Hydrogen ($H_2$) | 2 |
| Methane ($CH_4$) | 8 |
| Ethane ($C_2H_6$) | 14 |
| Ethylene ($C_2H_4$) | 12 |
| Propane ($C_3H_8$) | 32 |
| Propylene ($C_3H_6$) | 30 |
| Butane ($C_4H_{10}$) | 42 |
| 1-Butene ($C_4H_8$) | 40 |
| Pentane ($C_5H_{12}$) | 52 |
| 1-Pentene ($C_5H_{10}$) | 50 |
| Hexane ($C_6H_{14}$) | 62 |
| 1-Hexene ($C_6H_{12}$) | 60 |
| Acetaldehyde ($C_2H_4O$) | 10 |

Irradiance Measurement and Calibration

A solar simulator (ABET technologies) was used for measurements of photocatalysis using simulated sunlight irradiation. The light source (especially for high sun measurements) was measured using a calibrated power meter (1918-R, Newport Corporation) equipped with a 818-UV silicon detector. A rough calibration of the light source was done using a silicon photodiode (S1787-12, Hamamatsu Photonics). Since the photodiodes are linear with light intensity (under this illumination intensity), high sun light intensities were measured using our calibrated silicon photodiodes.

| Photon$_i$ wavelength nm | Photon$_i$ energy eV | Irradiance up to photon in μmol cm$^{-2}$ h$^{-1}$ | Spectrum photon % |
|---|---|---|---|
| 400 | 3.20 | 25.92 | 1.44 |

Example. The electron flux of 100 ppm of $CH_4$ produced in 30 minutes in our reactor is measured as follow:
Sampling port pressure=760 Torr.
Reactor volume=48.2 mL.
Reactor Temperature=25° C., the change in reactor temperature was negligible, even under high sun illumination.

First we determine the number of nanomols produced (S stands for sample and R for reactor):

$$n = \frac{P_s V_R}{RT_R} = \frac{100 \text{ ppm} \times (1/10^6) \times 760 (\text{torr}) \times (1 (\text{atm})/760 (\text{torr}) \times 0.048(L)}{0.08206 \text{ atm}L/\text{molK} \times 298\text{K}} \times$$

$$\frac{(10^9 \text{ nanomol})}{1 \text{ mol}} = 1.971 \text{ nanomol of } CH_4$$

$$e^- \text{flux} = 1.971 \times (8 \text{ electron}/1 \text{ nanomol } CH_4) \times (1 \text{ μmol}/10 \text{ nanomol}) \times$$

$$(1/30 \text{ min}) \times (60 \text{ min}/1 \text{ h}) \times (1/0.78 \text{ cm}^2) = 4.043 \, e^- \text{ μmol cm}^{-2} \text{h}^{-1}$$

Quantum Yield

The quantum yield is determined by dividing the total sum of electron used to produce hydrogen and hydrocarbons, by the photon irradiation. The photon irradiation threshold is defined by the Titanium dioxide energy bandgap. Since higher energy electrons, or "hot-electrons" form different (higher energy or molecules with higher reduction potential) products or solar fuels, the energy of the photon corresponds well to the energetic threshold required to produce the reduced fuel product.

Calibration of acetaldehyde: Pure acetaldehyde sample were diluted to a 15,265 ppm concentration using chloroform as balance, and 1 microLiter was injected and followed a similar method as with gas species.

SQUID measurements: The magnetic properties were studied by a Superconducting Quantum Interference Device magnetometer (SQUID). Magnetization measurements were performed using Quantum Design SQUID-VSM (Vibrating Sample Magnetometer), and magnetization (M) was measured as a function of applied field (H) and temperature (T) in the magnetic field range −7 to 7 Tesla and a temperature range of 1.8 to 300 K. Temperature dependent magnetization (M-T) measurement was performed at applied magnetic field 1000 Oe. TiO$_2$ nanotube materials for SQUID studies were collected from the surface of Ti sheet after growth. The field-cooled (FC) and zero-field-cooled (ZFC) magnetization measurements are performed from 5 to 300 K. The FC results are obtained by measuring the magnetic moment of the sample in a magnetic field of 1000 Oe during cooling. The ZFC results are obtained by first cooling the sample to 5 K in zero fields and then warming it in the same field as that of the FC measurement. Extreme precautions were taken during these and other procedures to avoid any contamination of the samples with possible magnetic dopants. Magnetization of the sample holder was also measured and subtracted from that of TiO$_2$ nanotube samples to calculate pure magnetization of doped and undoped TiO$_2$ nanotubes.

Resistivity measurements: Sheet resistance of nanotubes R was calculated from measurements using Ohm's law I=V/R. Then, resistivity was calculated using equation R=ρ(L/A), where L is nanotube length, and A—total nanotube cross-section area. Cross-section area A was estimated using density of nanotubes, thickness of nanotube wall, and inner and outer diameters of nanotube, which were measured using SEM images.

Charge carrier concentration in TiO$_2$ nanotube samples were calculated using equation:

$$\ln(I)=\ln(S)+e(1/(kT)-1/E_0)V+\ln(J_s)$$

The slope for I-V is equal to $e(1/(kT)-1/E_0)$, where $E_0=E_{00}\coth(E_{00}/kT)$, and $E_{00}=(h e/2)(n/m^*\Pi)^{1/2}$. Thus, from the slope of the ln(I) vs V plot at higher voltages, carrier concentration was calculated using equation slope=$e(1/(kT)-1/E_0)$, where e—elementary charge, h—Plank constant, $\Pi_0$—vacuum permittivity, $\Pi=31\Pi_0$—dielectric constant for TiO$_2$, k—Boltzmann constant, $m^*=m_0$ electron effective mass.

sample was 9.92 Ω·cm. As grown undoped TiO$_2$ nanotubes are of n-type conductivity due to oxygen vacancies acting as shallow donors. The n-type conductivity of as-grown TiO$_2$ nanotubes is seen from STM spectrum (FIG. 16C), where density of states (DOS) is seen near the conduction band and the Fermi energy is also close to the conduction band. Nb doped samples revealed the lowest resistivity 0.2 Ω·cm. The increased conductivity of Nb-doped TiO$_2$ nanotubes can be explained by replacement of Ti atoms by Nb atoms in crystal lattice. Nb is known as a good shallow donor in TiO$_2$ crystal lattice, with activation energy in the range 10-50 meV. Presence of shallow donor states near conduction band (CB) of Nb doped TiO$_2$ nanotubes samples was confirmed by scanning tunneling microscopy (STM) spectrum, which showed high density of states near the conduction band (FIG. 32). Iron (Fe)-doped TiO$_2$ sample also increased the conductivity, compared to undoped sample, which indicates donor-like substitution of this dopant ion. This effect of Fe is less dramatic compared to Nb, which can be explained by higher activation energy (0.097 eV) compared to Nb (0.018 eV).

The resistivity of nitrogen (N)-doped samples (and other p-type dopants like interstitial Cu ions) increases initially (FIG. 38A-D), and can be explained by of creation acceptors centers that compensate for background impurity donors in nominally undoped sample. Nitrogen is known to be a good acceptor in TiO$_2$ with energy position 0.14 eV above the top of valence band. The acceptor nature of N-dopant is confirmed from STS studies, the spectrum of which shows that Fermi level shifts toward valence band indicating p-type effect of these dopants (as a result of mixing its p states with O 2 p states in TiO$_2$). Copper dopant also behaviors like acceptor, leading to initial enhancement of resistivity of Cu doped TiO$_2$ nanotubes. There have been few reports on

TABLE I

Summary of electrical parameters of doped TiO$_2$ nanotubes

|  | undoped | Fe | Nb | Cu | N | Cu—N |
|---|---|---|---|---|---|---|
| Resistivity, ρ, Ω cm | 6.92 | 2.97 | 0.201 | 906 | 2300 | 4.4 × 10$^6$ |
| Carrier concentration, n, cm$^{-3}$ | 8.9 × 10$^{17}$ | 2.5 × 10$^{18}$ | 5 × 10$^{19}$ | 1.6 × 10$^{16}$ | 2.8 × 10$^{16}$ | 1.3 × 10$^{15}$ |
| Mobility, μ, cm$^2$/V s | 4.3 | 2.7 | 3.8 | 0.3 | 0.097 | 0.002 |

This table summarizes resistivity, carrier concentration, and mobility for doped, co-doped, and undoped samples. The resistivity ρ of the samples was calculated using sheet resistance R as described above. There was a great effect of dopants on electrical properties and the resistivity ranged from 6×10$^4$ to 3×10$^6$ Ω·cm. The resistivity of undoped electrical properties of Fe-doped TiO$_2$ nanotubes and the available reports indicate that substitutional Fe produce n-type conductivity. Roldan et al. showed from periodic density functional calculations that Fe-dopant stimulates generation of oxygen vacancies that act like shallow donors.

Correlating the shifts in Fermi-level (using STM measurements) with the measured carrier densities.

TABLE II

Summary of estimated carrier concentration from STM data

|  | undoped | Nb | Cu | N | Cu—N |
|---|---|---|---|---|---|
| Type of doping | n-type | n-type | p-type | p-type | p-type |
| Shift in Fermi-level, using STM, meV | — | 100 | — | 20 | 100 |
| Estimated carrier concentration (from Fermi-level shifting), n, cm$^{-3}$ | 8.9 × 10$^{17}$ | 4.9 × 10$^{19}$ | 5.3 × 10$^{16}$ | 2.38 × 10$^{16}$ | 9.71 × 10$^{14}$ |

The intrinsic carrier concentration in wide-bandgap semiconductors is negligible, $$n_i = N_s \exp\left(-\frac{E_g}{2k_B T}\right)$$

where $n_i$ is the intrinsic carrier concentration, $N_s$ is the number of available states, $E_g$ is the bandgap, and $k_B$ is the Boltzmann constant. Therefore, the doped carrier concentrations can be estimated using the shifts in Fermi-energy (monitored by the STM data, FIG. 16C). As shown in Table II, we used the undoped and copper-doped $TiO_2$ nanotubes as n- and p-"standards" respectively, and estimated the carrier concentrations of Nb, N and Cu—N co-doped nanotubes, using the STM data. The shift in Fermi-energies is given as:

$$E_f - E_c = k_B T \ln\left(\frac{n_d}{n_i}\right)$$

$$E_v - E_f = k_B T \ln\left(\frac{p_a}{n_i}\right)$$

for n-type donor and p-type acceptors respectively. These values obtained are in reasonable agreement with the estimates obtained from current-voltage CS-AFM spectroscopy, as summarized in table I.

The New Figure of Merit

For a more detailed analysis of photoconductance data, instead of the simple $\ln(I/V^2)$ vs $(1/V)$ functional form used in F—N plots, we developed a new figure of merit for photogenerated charges. Using the functional form of the Fowler-Nordheim equation, $$I = V \exp\left[-\frac{q}{kT}\left(\phi - V^{1/2}\sqrt{\frac{q}{\pi \varepsilon_i}}\right)\right] \text{(Fowler-Nordheim equation)}$$

$V \times \ln(I/V^2)$ is proportional to the activation barrier for charge transport. However, this equation was developed for electrically injected charges, where for the same applied bias, same number of charges can be injected for a given barrier. Since we wanted to analyze optically injected charge carriers, we normalized the number of charges by the incident light intensity, and the absorbance in single nanoparticle constructs or thin films. We plotted:

$$V \times \ln\left(\frac{I_{PR}}{V^2 \times P \times Abs}\right)$$

vs. photon energy, to understand the conduction pathway for photogenerated charges (FIG. 18B). This new figure of merit represents the activation energy for charge transport of photogenerated charges, as a function of incident photon energy (FIG. 18B). The step-like change at the band edge gives a clear threshold for energy states (donor and acceptor states) involved in photogeneration and charge conduction in these indirect bandgap semiconductors. This data, along with the STM measurements, was used to study doping in these wide-bandgap nanotubes (Rayleigh scattering and indirect bandgap of anatase $TiO_2$ makes exact determination of bandgap and energy states difficult using simple optical measurements).

Figure 19D:
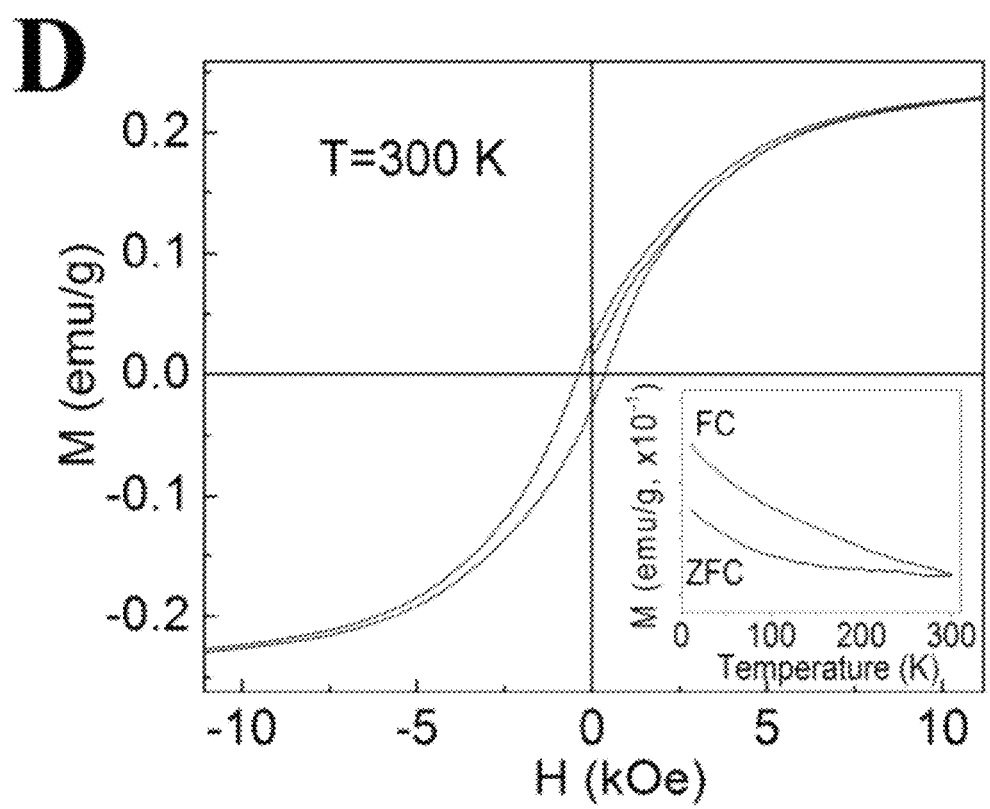

Magnetic properties of Fe-doped $TiO_2$ nanotubes samples were studied as Fe is a frequently chosen as magnetic dopant when pursuing magnetic semiconductors. FIG. 19D presents the magnetization vs magnetic field dependence (M-H) measured at 300 K after subtracting the diamagnetic background. The well-defined hysteresis loop is observed as typical to ferromagnetic materials. The saturation magnetization (Ms), coercive field (Hc), and remnant magnetization were extracted to be 0.22 emu/g, 402 Oe, and 0.028 emu/g, respectively. The temperature dependence of magnetization (M-T) was measured both at field cooled (FC) and zero field cooled (ZFC) conditions in order to better understand the origin of the ferromagnetism in Fe-doped $TiO_2$ nanotubes. (b) presents resulting M-T curve. The ZFC and FC curves are separated below 300 K and ZFC magnetization shows stronger temperature dependence compared to FC curve. The divergence between the FC and ZFC curves and the lack blocking temperature peaks indicate intrinsic magnetism of $TiO_2$ nanotubes resulting from substitution of Ti atoms with Fe atoms, not from clusters of Fe atoms. As was mentioned above, XRD studies revealed no traces of secondary phases. Also it should be mentioned that the M-H and M-T dependence of our Fe-doped $TiO_2$ nanotubes are similar to those in many other reports on Fe-doped $TiO_2$ films, nanoparticles, and bulk crystals. These all together strongly suggest that the ferromagnetic signal from our Fe-doped $TiO_2$ nanotubes samples is intrinsic resulting from Fe atoms substituting Ti atoms.

Nanoscaled Semiconductors as Artificial Photosystems I and II for Selective Photocatalysis In this work, we utilized quantum-confined semiconductor nanostructures, with varying energy bandgap and energetic levels (to produce different chemical fuels, FIGS. 44a-b) for reduction reactions (photosystem I), and doped widebandgap semiconductor oxide nanotube membranes for photocatalyzed oxidation reactions (photosystem II). The doping of hollow widebandgap nanotubes modulates it's Fermi-level, and hence transfer of photogenerated charge carriers with semiconductor nanostructures coated on high surface nanotube walls (FIG. 44a). We utilized titanium dioxide nanotubes ($TiO_2$NTs) because it's energy levels are well-aligned with redox potentials for variety of photoelectrochemical and photocatalytic reactions, and because of easily functionalizable oxide surface which provides an excellent platform for attachment of other semiconductor nanostructures.

We doped $TiO_2$ NT membranes with varying amounts of electronic dopant to modulate the Fermi-level (FL), and select the photogenerated charge carriers transferred to the NTs. Using nitrogen as a hole dopant, we started with nominally undoped NTs which exhibit n-type conductivity, and increased the doping amount of nitrogen to achieve p-type conduction (FIG. 45a, and see methods). Using scanning tunneling spectroscopy (STS), we measured the FL of the $TiO_2$ NTs using the energetic position of the Pt—Ir tip (0 V, FIG. 45b). Nominally undoped NTs showed FL closer to the conduction band (CB) indicating a n-type behavior. This was also confirmed by current sensing (CS-AFM) measurements of the conductivity and charge carrier concentration of individual nanotubes (FIG. 45c). On increasing the concentration of the nitrogen dopant, the carrier concentration decreases (intrinsic, FIGS. 45b-c), and using high doping (6.2 wt % nitrogen dopant) FL moves closer to the valence band (VB) position and nanotubes show p-type electronic conductivity (FIG. 45a-c). On increasing the concentration of dopant further, the FL position remains unchanged as it is pinned by the energetic position of the nitrogen dopant in TiO$_2$ lattice. Therefore, we utilized the FL positions and the charge carrier concentrations of nominally undoped (0 wt %, n-type), 1.2 wt % (closer to intrinsic), and 6.2 wt % (p-type) nitrogen dopant to change the majority carrier and the photogenerated charge transferred to the nanoscaled artificial photosystem of TiO$_2$ NT hollow membrane.

Figure 46A:
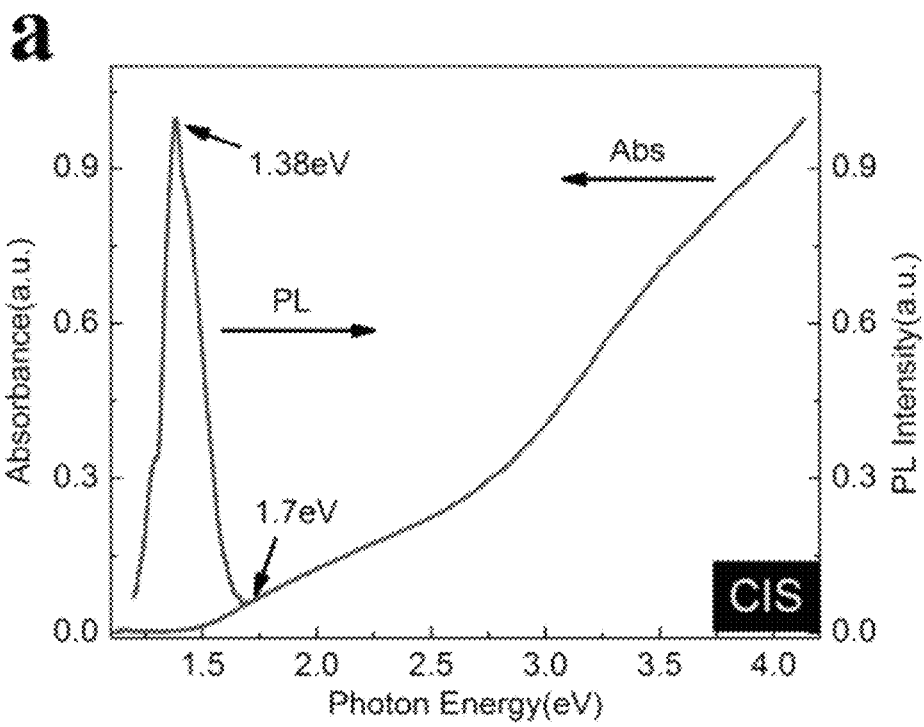
Figure 46B:
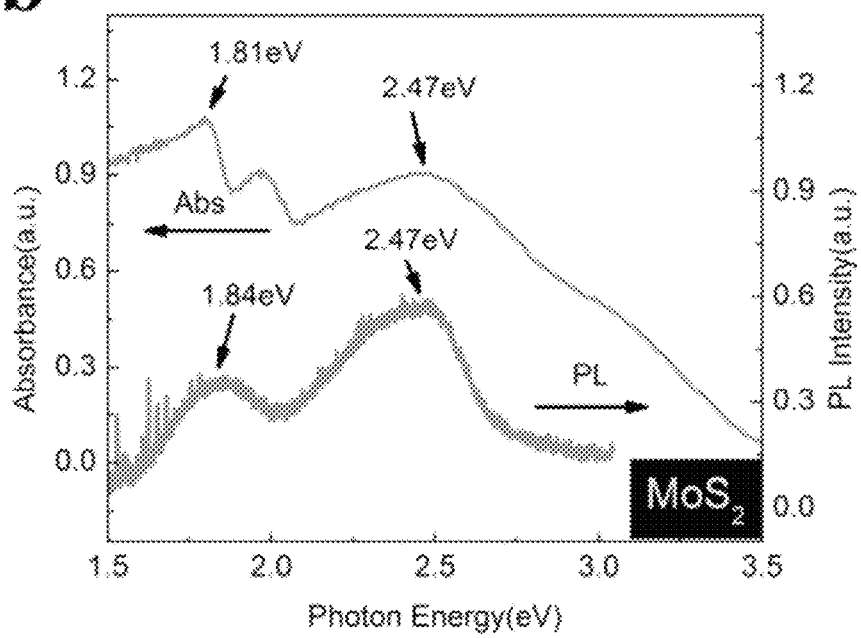
Figure 46C:
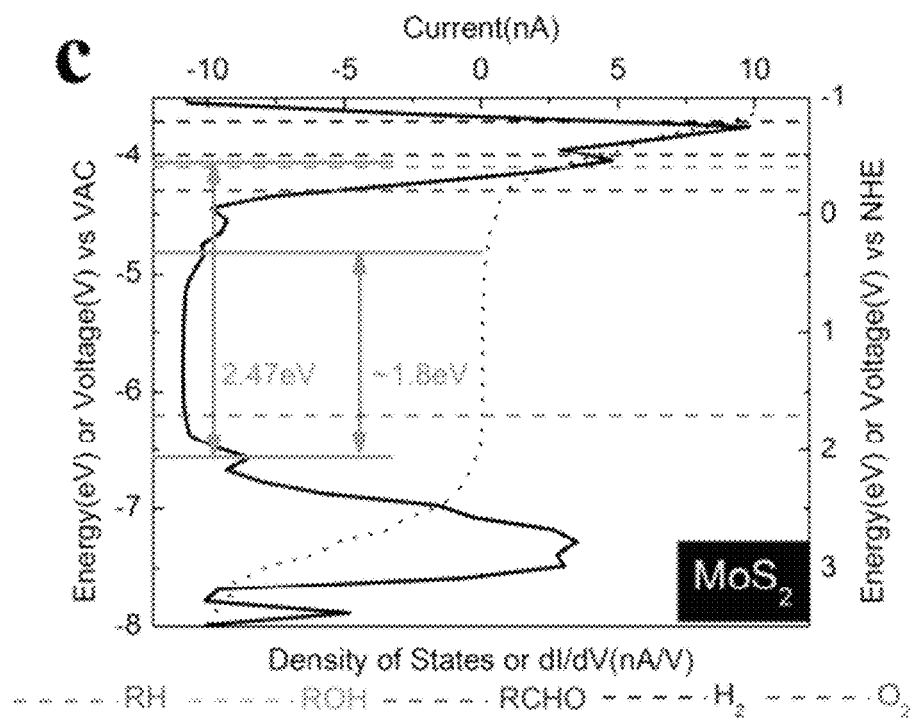
Figure 46D:
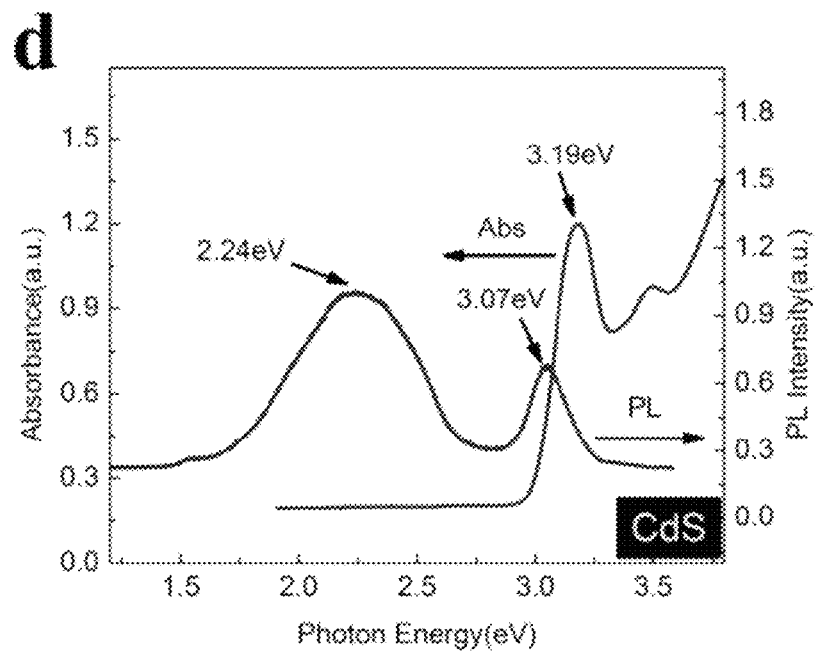
Figure 46E:
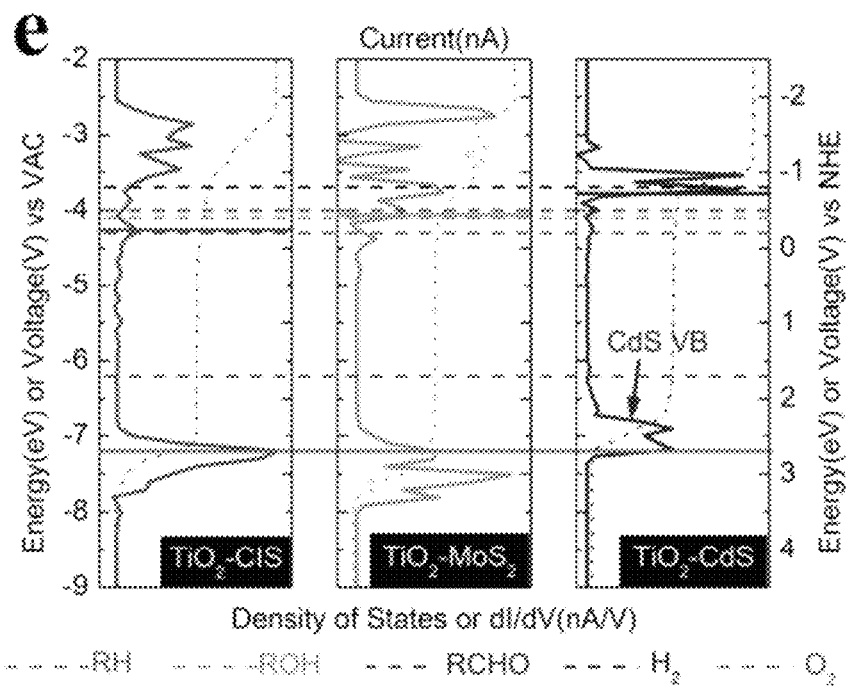
Figure 46F:
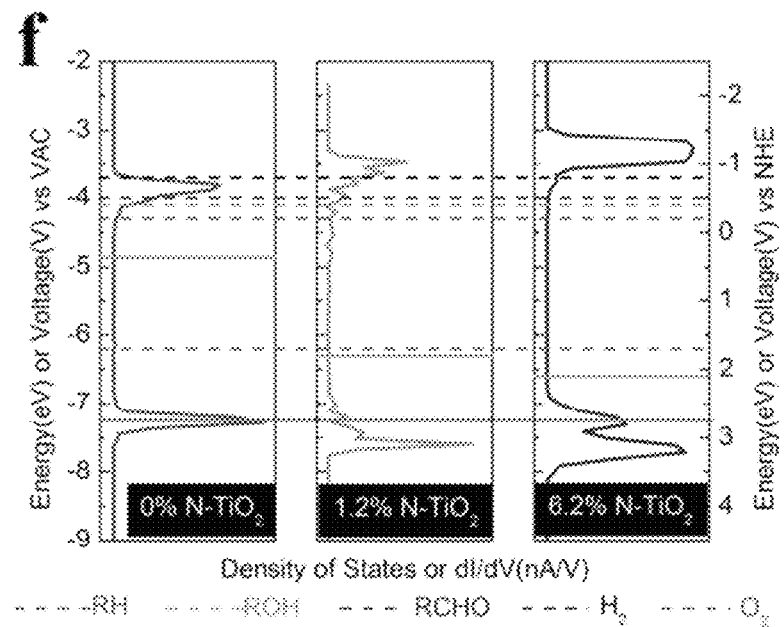

In this work, we utilized three different nanostructured semiconductors: copper-indium sulfide (CIS) nanocrystals (bandgap 1.7 eV, FIG. 46a), molybdenum disulfide (MoS$_2$) nanosheets (two exciton peaks at 1.8 and 2.4 eV, FIG. 46b-c), and cadmium sulfide (CdS) nanocrystals (bandgap 3.07 eV, FIG. 46d) coated on TiO$_2$ NT membranes. Electronic coupling of these two nanoscaled photosystems led to coupled electronic density of states (DOS), as shown in FIG. 46e. While the conduction band states of respective quantum-confined semiconductor nanostructure (CIS, MoS$_2$, and CdS) forms the lowest unoccupied electronic states and likely determines the product of the reduction reaction using photogenerated electron (CB levels of CIS, MoS$_2$ (2.4 eV exciton, FIG. 46c) and CdS match the reduction potentials of alkane, alcohol and aldehyde respectively, FIGS. 46c,e), photogenerated hole likely transfers to the VB level of TiO$_2$ semiconductor, except for CdS—TiO$_2$. While this forms a well-aligned artificial photosystem I and II for photocatalyzed redox reaction of CO$_2$—H$_2$O reaction to form solar fuels, excess electron carriers in nominally undoped TiO$_2$ NTs can lead to strong non-radiative recombination of photogenerated hole and excess electrons in TiO$_2$, leading to lower photocatalytic activity (FIGS. 46f, 45c). Therefore, we used different nitrogen doping in TiO$_2$ NT membranes to study the effect on photocatalyzed CO$_2$—H$_2$O redox reaction.

Using gas-phase reaction between CO$_2$—H$_2$O with AM1.5 simulated solar irradiation, we measured the photocatalytic activity of respective coupled photosystem I and II systems (FIG. 47a-c). Since different photocatalytic products require different number of photogenerated electrons, we normalized their respective concentrations to number of electron moles, to compare different artificial photosystems and their products. All coupled photosystems produced highly selective redox products, with CIS, MoS$_2$ and CdS semiconductor nanostructures selectively producing ethane, ethanol, and acetaldehyde, respectively (FIG. 47a-c), as expected from the alignment of their "molecule-like" quantum-confined energy levels with respective reduction potentials of these redox reactions (FIG. 46e). Moreover, changing the doping of the TiO$_2$ NTs and hence it's FL produced interesting changes in the catalytic activity of respective coupled photosystems. While all semiconductor nanostructures showed highest catalytic activity with nominally undoped TiO$_2$ NTs (0 wt % nitrogen doping, n-type), CIS and CdS nanocrystals demonstrated varying degree of reduction in photocatalytic activity whereas MoS$_2$ nanosheets show higher activity for n-doped and p-doped TiO$_2$ NTs. To further analyze the observed trends in their respective photocatalytic yields, we analyzed the energy level alignment and location of photogenerated electron and holes mediating the redox reaction.

Using CIS nanocrystals and TiO$_2$ NTs as photosystems for CO$_2$—H$_2$O redox reaction, the CB of CIS aligns well with CO$_2$ reduction to ethane but the VB for CIS does not have sufficient energy to mediate oxygen formation from H$_2$O (FIG. 48a). Therefore, photogenerated hole in TiO$_2$ NTs mediate oxidation reaction, whereas photogenerated electron in either CIS or TiO$_2$ can cause reduction of CO$_2$ to ethane or acetaldehyde, respectively (FIGS. 47a, 48a). Therefore, increase in nitrogen doping (from n- to p-type NTs) results in small decrease in acetaldehyde production, likely due to increased recombination of photogenerated electron-hole pairs in TiO$_2$. However, similar shift in electronic nature of TiO$_2$ results in a sharp decrease in ethane production, since the excess electrons (trapped in surface states ~0.5-1 eV below the CB) in nominally undoped TiO$_2$ are depleted resulting in transfer of photogenerated electrons from CIS to TiO$_2$ traps and likely non-radiative recombination. Similar shift in electronic states for photosystems in TiO$_2$ NTs-CdS nanocrystals (CB of TiO$_2$ and CdS are matched) on increasing nitrogen doping results in a small decrease in acetaldehyde evolution, since the CdS semiconductor CB-VB are well aligned to carry out photocatalyzed redox of CO$_2$—H$_2$O. Therefore, emptying the TiO$_2$ trap states (or surface states) results in a small increase in trapping of photogenerated charges and hence the observed drop in catalytic activity. Using MoS$_2$ 2D nanosheets-TiO$_2$ NTs as charge separated photosystems results in high catalytic yields for nominally undoped (n-type) and 6.2 wt % nitrogen doped (p-type) TiO$_2$ since photogenerated electrons in MoS$_2$ mediate photocatalytic reduction of CO$_2$ selectively into ethanol. Since MoS$_2$ CB is lower than TiO$_2$ semiconductor, photogenerated charges in n-type TiO$_2$ transfers to MoS$_2$, whereas p-type TiO$_2$ VB (pinned by nitrogen dopant) is matched well to VB state of MoS2 (both semiconductors can catalyze oxidation reaction). However, 1.2 wt % nitrogen (or intrinsic TiO$_2$) results in likely trapping of photogenerated charges and recombination, resulting in a sharp drop in photocatalytic activity of the energetically coupled photosystems. Therefore, measurements of energetic DOS and band alignment of respective energy levels can explain the observed photophysics and the resultant photocatalytic redox reactions in artificial photosystems I and II.

In summary, we have successfully developed charge separated photosystem I and II using widebandgap TiO$_2$ NT membranes and CdS, MoS$_2$ and CIS semiconductor nanostructures. Careful alignment of respective quantum-confined energy states in these semiconductor nanostructures with respective photocatalyzed redox reactions leads to highly selective generation of solar fuels from CO$_2$—H$_2$O redox reactions (acetaldehyde, ethanol, and ethane respectively), with decent photocatalytic yields. Tuning the FL of TiO$_2$ NTs, using p-type doping with nitrogen, leads to change in photophysics and resulting change in photocatalytic yields of respective energetically coupled photosystems. The change in photophysics can be explained using the measurements of electronic DOS in respective photosystems and the energetically couples semiconductors. Together, these results point to development of nanoscaled semiconductors as charge separated artificial photosystems, with well-aligned energy levels and reduced charge recombination, to selectively catalyze different redox reactions.

Methods

TiO$_2$ Nanotube growth: TiO$_2$ Nanotubes were grown through electrochemical oxidation (anodization) using Titanium metal sheets (0.5 in*0.5 in) as anode (working electrode) and Platinum coated electrode as cathode. Ethylene Glycol (EG) with 1% NH$_4$F (etchant) was used as electrolyte. 30V Voltage was applied to the cell and the growing is carried out overnight. Doping with different elements can be easily done with correspondent precursors. For anion (Nitrogen here) doping, Hexamethylenetetramine was added to the electrolyte as the nitrogen precursor.

CdS nanoparticles: CdS nanocrystals with small diameter (~3 nm) were synthesized. Using standard airfree procedure on a Schlenk line, a mixture of cadmium oxide (45 mg, 0.34 mmol) and oleic acid (0.9 mL, 2.85 mmol) in 1-octadecene (6 mL) was degased with $N_2$ gas for 1 h at 150° C. before heating to 300° C. The formation of cadmium-oleate complex at elevated temperature was observed by color change of the solution from red and opaque to colorless and clear. Separately, sulfur precursor solution was made by dissolving elemental sulfur (10 mg, 0.31 mmol) in 4 mL of 1-octadecene under sonication. After removing the heating mantle, the sulfur solution was injected into the reaction flask with rigorous stirring for 45 seconds. The reaction was quickly cooled down to room temperature, and the resulting nanocrystal solution was cleaned using precipitation with ethanol, and re-dispersing the suspension in chloroform.

Copper indium sulfide (CIS) nanoparticles: In a three-necked flask, a mixture of indium acetate (0.292 g, 1 mmol), copper(I) iodide (0.190 g 1 mmol) and 1-dodecanethiol (DDT, 5 ml) was degassed and purged with nitrogen gas alternatively for three times. The reactants were preheated at 100□ for 10 min and raised to 230□. The color of the reaction solution changes from yellow, green, red and finally black. The viscous black solution was precipitated with acetone and centrifuged under 5000 rpm for 5 min. The precipitate was cleaned with acetone before redispersed in hexane.

Molybdenum disulfide ($MoS_2$) nanosheets: $MoS_2$ nanosheets were prepared based on the chemical exfoliation of micrometer size particles under high power tip sonication, with the surfactant sodium dodecyl sulfate (SDS) as stablizer. The mixture containing 2 g $MoS_2$ and 0.12 g SDS in 200 ml D.I. water was ultra-sonicated for 2 hours at a minimum power of 20 W. After removing all the water, the precipitate was washed with 1:1 (volume) mixture of hexane and ethanol and centrifuged under 5000 rpm for 5 minutes to remove some of the unbounded SDS. The nanosheets were redispersed in pure ethanol.

STM and STS measurements: Scanning Tunneling Microscope images were obtained using a customized Molecular Imaging PicoScan 2500 setup (with PicoSPM II controller). An STM nosecone (N9533A series, Agilent Technologies) was used for scanning and spectroscopy using chemically etched Pt—Ir tips (80:20) purchased from Agilent Technologies, USA. The measurements were done at room temperature under atmospheric conditions. Tunneling junction parameters were set at tunneling currents ranging between 100 and 500 pA and sample bias voltage between −5 and +5 V. Spectroscopy measurements were obtained at a scan rate of 1 V/s with previous junction parameters. For STM measurements, the pre-amp sensitivity set to 1 nA/V. The tunneling current as a function of applied bias voltage (STS) was recorded at multiple positions on the sample at room temperature and atmospheric pressure. $TiO_2$ nanotubes were scratched from the metal sheet with sharp blade and dissolved in little amount of ethanol. Indium Tin Oxide coated glass was used as the substrate.

Current sensing AFM (CSAFM) measurements: CSAFM measurements were done using modified Molecular Imaging PicoSPM II setup. The CSAFM tips used were coated in-house using thermal evaporator with 5 nm of 99.99% Cr and 15 nm of 99.99% Au, both purchased from Kurt J. Lesker Company. The silicon nitride tips for contact mode imaging and spectroscopy were obtained from NanoDevices Inc. Contact force was set to soft contact (deflection set point between −1 and −3V). Multiple topography and current scans were taken at different bias voltage ranging from −200 to +200 mV with steps of 50 mV. The scan area was set to 1 $\mu m^2$ at a scan rate of 1line per second and 512 points/line. All samples were prepared by drop casting dilute solutions on cleaned ITO coated substrate. The sample stage was modified by creating a transparent light path for illuminating the samples from the bottom. The sample placed on a transparent ITO substrate was connected using a wire attached to the ITO using conductive silver paste.

Gas-phase reduction of $CO_2$ and $H_2O$: Twenty to thirty mg of the nanotube scratched from metal sheet was deposited in a rounded glass vial cut in half with a 0.64 $cm^2$ cross sectional area. The vial was then enclosed in a 48-mL reactor and purged for 45 minutes with $CO_2$ (75 $cm^3$ $min^{-1}$) humidified in a bubbler filled with D.I. water. After purging, the reactor was closed and irradiated with 1 SUN (100 mW $cm^{-2}$) through a glass window using a solar simulator (ABET Technologies). One-milliliter samples were extracted from the reactor and injected into a gas chromatograph (GC) equipped with a thermal conductivity detector (TCD) and a flame ionization detector (FID) for measuring concentrations. Separation of the hydrocarbons was done with a Hayesep D column or with Silica-gel column. Reported data of photocatalytic rate and quantum yield were calculated based on the electron flux ($\mu mol$ $cm^{-2}$ $h^{-1}$) used to form $H_2$, $CH_4$, $C_2H_6$, hydrocarbons and others.

Irradiance measurement and calibration: A solar simulator (ABET technologies) was used for measurements of photocatalysis using simulated sunlight irradiation. The light source (especially for high sun measurements) was measured using a calibrated power meter (1918-R, Newport Corporation) equipped with a 818-UV silicon detector. A calibration of the light source was done using a silicon photodiode (S1787-12, Hamamatsu Photonics).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A composition comprising uniformly doped wide-bandgap semiconductor nanotubes.

2. The composition of claim 1, wherein the uniformly doped wide-bandgap semiconductor nanotubes lack secondary phase diffraction peaks when subjected to energy dispersive x-ray spectroscopy.

3. The composition of claim 1, wherein the dopant is anionic.

4. The composition of claim 1, wherein the dopant is cationic.

5. The composition of claim 1, wherein the nanotubes are mono-doped.

6. The composition of claim 1, wherein the nanotubes are co-doped.

7. The composition of claim 1, wherein the nanotubes comprise titanium dioxide.

8. The composition of claim 1, wherein the nanotubes comprise tungsten oxide.

9. The composition of claim 1, wherein the nanotubes are n-type doped wide-bandgap semiconductor nanotubes.

10. The composition of claim 1, wherein the nanotubes are p-type doped wide-bandgap semiconductor nanotubes.

11. The composition of claim 1, wherein the nanotubes are doped with one of copper, copper-nitrogen, nitrogen, niobium-nitrogen, iron, and niobium.

12. The composition of claim 1, wherein the nanotubes are doped with one of: copper, wherein the nanotubes form a p-type semiconductor; nitrogen, wherein the nanotubes form a p-type semiconductor; niobium; copper indium sulfide nanoparticles having a diameter of 3 nm to 4.6 nm, wherein the copper indium sulfide nanoparticles are attached to a surface of the nanotubes; molybdenum disulfide nanosheets, wherein the nanotubes are coated by the molybdenum disulfide nanosheets; and cadmium sulfide nanoparticles having a diameter of about 3 nm to about 5 nm.

13. The composition of claim 1, wherein the nanotubes comprise about 0.1% by weight of dopant to about 10% by weight of dopant.

14. The composition of claim 1, wherein the nanotubes comprise about 1% by weight of dopant.

15. A device comprising the composition of claim 1.

16. The device of claim 15, wherein the device is one of a photovoltaic device, a display device, a photocatalytic device, an optoelectronic device, a light emitting diode, a thermoelectric device, and a spintronic device.

17. A method of making uniformly doped wide-bandgap semiconductor nanotubes comprising:
  growing nanotubes by electrochemical oxidation using an electrochemical cell, the electrochemical cell including a first portion having a first electrode and a second portion having a second electrode, the first portion and the second portion separated by a porous membrane, the first portion including an electrolyte free of dopant, the second portion including an electrolyte having a dopant precursor; and
  doping the nantotubes during the growing step to make uniformly doped wide-bandgap semiconductor nanotubes.

18. The method of claim 17, wherein the first electrode and the second electrode are coupled to an alternating current voltage source.

19. The method of claim 18, wherein alternating current voltage source applies rectangular shaped power pulses.

20. The method of claim 17, wherein the first electrode comprises platinum.

21. The method of claim 17, wherein the second electrode comprises titanium.

22. The method of claim 17, wherein growing nanotubes by electrochemical oxidation includes changing one of an anode voltage and a growth time to tune one of a diameter, a thickness, and a length of the nanotubes.

23. The method of claim 17, wherein doping the nanotubes to make doped wide-bandgap semiconductor nanotubes includes changing an amount of dopant to proportionally change a conductivity of the nanotubes.

24. The method of claim 17, wherein doping the nanotubes to make doped wide-bandgap semiconductor nanotubes includes incorporating shallow niobium donors to make highly transparent oxide nanotubes.

25. The method of claim 17, wherein doping the nanotubes to make doped wide-bandgap semiconductor nanotubes includes co-doping the nanotubes to increase absorption of infrared light by the nanotubes.

26. The method of claim 17, wherein doping the nanotubes to make doped wide-bandgap semiconductor nanotubes includes changing the magnetic properties of the nanotubes.

27. The method of claim 17, wherein doping the nanotubes to make doped wide-bandgap semiconductor nanotubes includes changing an amount of dopant precursor to control an amount of doping.

* * * * *